(12) United States Patent
Uberti

(10) Patent No.: US 12,361,262 B1
(45) Date of Patent: Jul. 15, 2025

(54) TENSOR OPERATIONS IN AI MODELS

(71) Applicant: ETCHED.AI INC., San Jose, CA (US)

(72) Inventor: Gavin Uberti, Kirkland, WA (US)

(73) Assignee: ETCHED.AI INC., San Jose, CA (US)

(*) Notice: Subject to any disclaimer, the term of this patent is extended or adjusted under 35 U.S.C. 154(b) by 0 days.

(21) Appl. No.: 18/922,984

(22) Filed: Oct. 22, 2024

(51) Int. Cl.
*G06N 3/0455* (2023.01)

(52) U.S. Cl.
CPC ................. *G06N 3/0455* (2023.01)

(58) Field of Classification Search
CPC ...... G06F 15/8046; G06F 17/16; G06F 9/544; G06F 15/8092; G06F 2212/454; G06F 9/5061; G06V 10/82; G06T 2207/20081; G06T 2207/20084; G06T 3/4046; G06T 5/60; G06N 3/02; G06N 20/10; G06N 20/00; G06N 3/04
See application file for complete search history.

(56) References Cited

U.S. PATENT DOCUMENTS

| | | | | |
|---|---|---|---|---|
| 9,779,786 | B1* | 10/2017 | Wu | G06V 10/955 |
| 10,956,500 | B2* | 3/2021 | Brevdo | G06N 20/00 |
| 12,182,687 | B2* | 12/2024 | Arthur | G06N 3/04 |
| 2019/0130276 | A1* | 5/2019 | Shiring | G06N 3/04 |
| 2019/0356394 | A1* | 11/2019 | Bunandar | G06F 17/16 |
| 2019/0370652 | A1* | 12/2019 | Shen | G06E 3/006 |
| 2020/0034710 | A1* | 1/2020 | Sidhu | G06F 9/45504 |
| 2020/0042875 | A1* | 2/2020 | Shazeer | G06F 16/9024 |
| 2020/0117999 | A1* | 4/2020 | Yoon | G06N 3/10 |
| 2020/0242189 | A1* | 7/2020 | Chatterjee | G06F 8/447 |
| 2020/0250518 | A1* | 8/2020 | Khoury | G06N 3/08 |
| 2021/0182077 | A1* | 6/2021 | Chen | G06F 40/263 |
| 2022/0012575 | A1* | 1/2022 | Fok | G06F 9/3838 |
| 2022/0044096 | A1* | 2/2022 | Asad | G06N 3/0442 |
| 2022/0121903 | A1* | 4/2022 | Zhang | G06F 15/80 |
| 2022/0121914 | A1* | 4/2022 | Huang | G06N 3/08 |
| 2022/0366006 | A1* | 11/2022 | Zhang | G06F 7/533 |
| 2022/0405552 | A1* | 12/2022 | Lichtenau | G06N 3/048 |
| 2022/0405598 | A1* | 12/2022 | Lichtenau | G06N 3/0442 |
| 2023/0023101 | A1* | 1/2023 | Su | G06F 17/16 |
| 2023/0297643 | A1* | 9/2023 | Shivam | G06F 17/16 |
| | | | | 708/503 |
| 2023/0385077 | A1* | 11/2023 | Wang | G06F 7/5443 |

(Continued)

OTHER PUBLICATIONS

Shail Dave et al., "Hardware Acceleration of Sparse and Irregular Tensor Computations of ML Models: A Survey and Insights," Sep. 20, 2021, Proceedings of the IEEE, vol. 109, No. 10, Oct. 2021, pp. 1706-1734.*

(Continued)

*Primary Examiner* — Omar S Ismail

(74) *Attorney, Agent, or Firm* — Maschoff Brennan

(57) ABSTRACT

A method of performing computations for artificial intelligence models may include obtaining an input tensor based on an input to an artificial intelligence model and loading the input tensor into multiple processing devices. The input tensor may be split into multiple input tensor tiles that are distributed among the processing devices such that each of the processing devices does not include an entirety of the input tensor. The method may also include performing multiple tensor operations according to the artificial intelligence model to generate multiple intermediate tensors and an output tensor, one or more of the tensor operations performed using the input tensor.

21 Claims, 15 Drawing Sheets

(56) References Cited

U.S. PATENT DOCUMENTS

| | | | |
|---|---|---|---|
| 2024/0095493 A1* | 3/2024 | Lin | G06F 7/50 |
| 2024/0135572 A1* | 4/2024 | Singh | G06N 3/09 |
| 2024/0256475 A1* | 8/2024 | Chen | G06F 13/28 |
| 2024/0346108 A1* | 10/2024 | Insalata | G06F 17/153 |
| 2024/0348703 A1* | 10/2024 | Byadgi | H04L 69/321 |
| 2024/0412334 A1* | 12/2024 | Sarokin | G06T 1/20 |
| 2024/0428576 A1* | 12/2024 | Jiang | G06V 10/82 |

OTHER PUBLICATIONS

Size Zheng et al.,"FleXTensor: An Automatic Schedule Exploration and Optimization Framework for Tensor Computation on Heterogeneous System," Mar. 13, 2020, ASPLOS '20: Proceedings of the Twenty-Fifth International Conference on Architectural Support for Programming Languages and Operating Systems,pp. 167-175.*

Dong He et al.,"Query Processing on Tensor Computation Runtimes," Feb. 10, 2023, arXiv:2203.01877,pp. 1-10.*

Minjie Wang et al.,"Unifying Data, Model and Hybrid Parallelism in Deep Learning via Tensor Tiling," May 10, 2018, arXiv: 1805.04170v1,pp. 1-8.*

Dennis Abts et al.,"Think Fast: A Tensor Streaming Processor (TSP) for Accelerating Deep Learning Workload," Jul. 13, 2020, 2020 ACM/IEEE 47th Annual International Symposium on Computer Architecture (ISCA),pp. 145-156.*

Yaoyao Ding et al.,"Hidet: Task-Mapping Programming Paradigm for Deep Learning Tensor Programs," Jan. 30, 2023, ASPLOS 2023: Proceedings of the 28th ACM International Conference on Architectural Support for Programming Languages and Operating Systems, vol. 2,pp. 370-380.*

Sergio Moreno-Alvarez et al.,"Heterogeneous model parallelism for deep neural networks," Feb. 23, 2021, Neurocomputing 441( 2021) , pp. 1-8.*

Noam Shazeer et al.,"Mesh-TensorFlow: Deep Learning for Supercomputers," Dec. 2-8, 2018, 32nd Conference on Neural Information Processing Systems (NeurIPS 2018), Montréal, Canada,pp. 1-7.*

Shoeybi et al. Megatron-LM: Training Multi-Billion Parameter Language Models Using Model Parallelism, arXiv:1909.08053v4 [cs. CL], 15 pages, Mar. 13, 2020.

* cited by examiner $$B = \begin{bmatrix} b_{00} & \cdots & b_{M0} \end{bmatrix} \cdots \begin{bmatrix} b_{0L} & \cdots & b_{ML} \end{bmatrix} = \begin{bmatrix} b_{00} & \cdots & b_{M0} \\ \vdots & \vdots & \vdots \\ b_{0J} & \cdots & b_{0J} \end{bmatrix} \begin{bmatrix} b_{0(J+1)} & \cdots & b_{M(J+1)} \\ \vdots & \vdots & \vdots \\ b_{0L} & \cdots & b_{ML} \end{bmatrix}$$

$$C \qquad\qquad D$$

FIG. 2

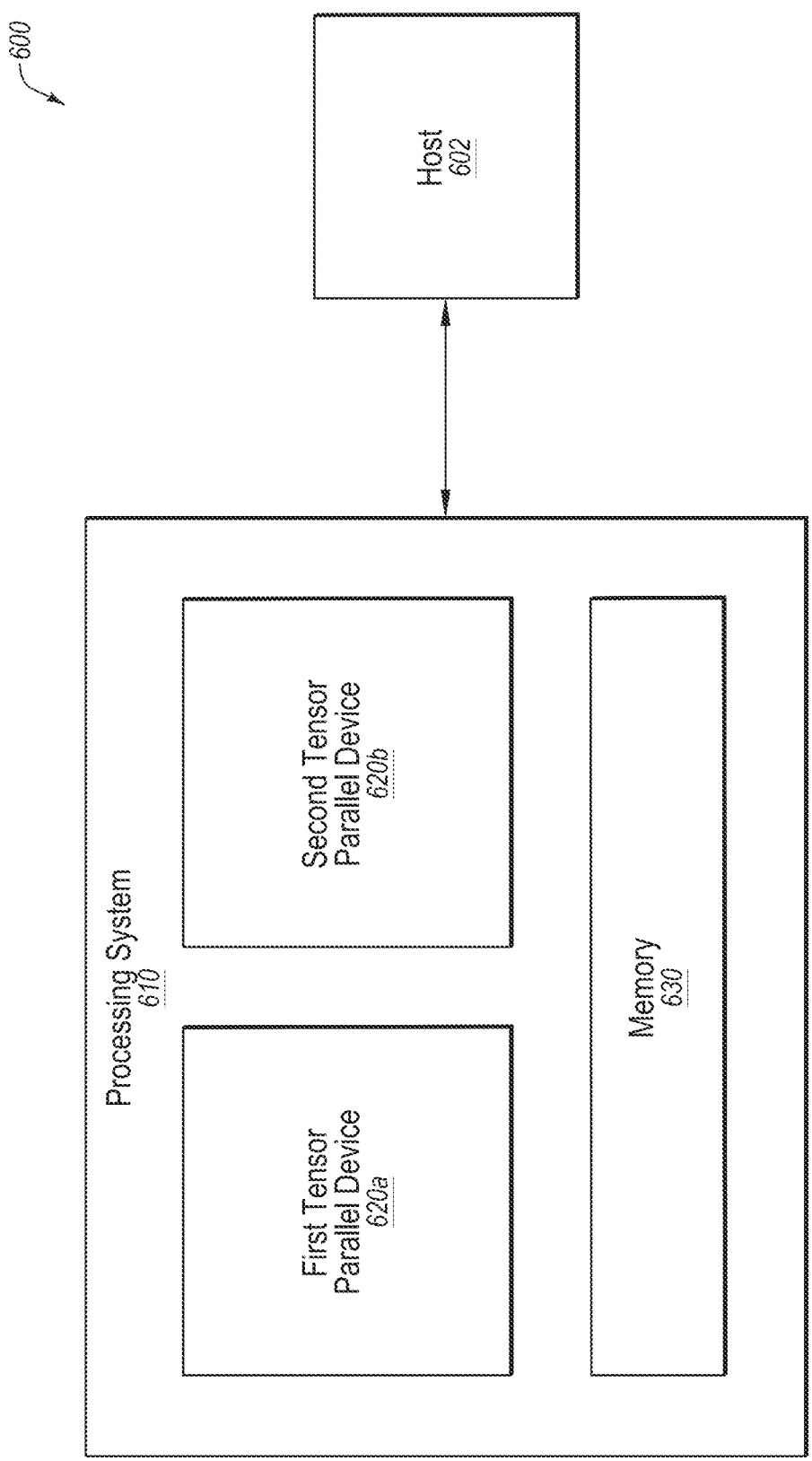

TENSOR OPERATIONS IN AI MODELS

FIELD

The embodiments discussed herein are related to tensor operations in AI models.

BACKGROUND

Tensor parallelism may include a technique used in parallel computing to distribute tensor operations across multiple processing devices. Tensor parallelism may be useful in deep learning models, where large tensors (multi-dimensional arrays) are common. In some situations, the goal of tensor parallelism is to improve computational efficiency and/or reduce memory bottlenecks by dividing the work involved in tensor operations.

The subject matter claimed herein is not limited to embodiments that solve any disadvantages or that operate only in environments such as those described above. Rather, this background is only provided to illustrate one example technology area where some embodiments described herein may be practiced.

SUMMARY

A method of performing computations for artificial intelligence models may include obtaining an input tensor based on an input to an artificial intelligence model and loading the input tensor into multiple processing devices. The input tensor may be split into multiple input tensor tiles that are distributed among the processing devices such that each of the processing devices does not include an entirety of the input tensor. The method may also include performing multiple tensor operations according to the artificial intelligence model to generate multiple intermediate tensors and an output tensor, one or more of the tensor operations performed using the input tensor.

BRIEF DESCRIPTION OF THE DRAWINGS

Example embodiments will be described and explained with additional specificity and detail through the use of the accompanying drawings in which:

FIG. 2 illustrates an example of tensor splitting;

FIG. 6 illustrates an example environment for performing tensor operations;

DESCRIPTION OF EMBODIMENTS

Figure 1:
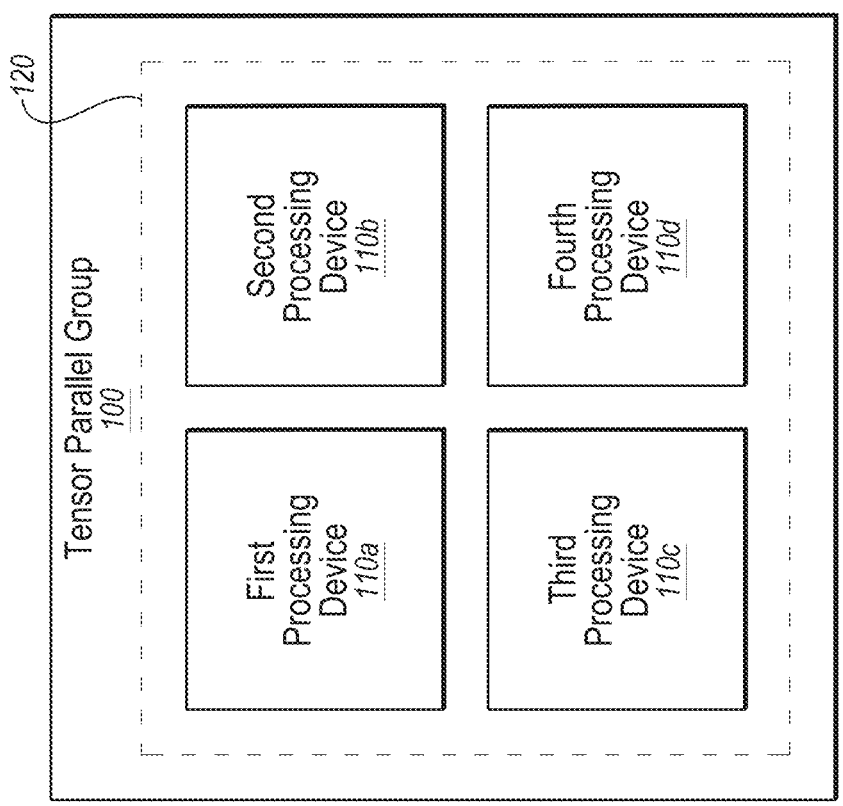
FIG. 1 illustrates an example tensor parallel group for performing tensor operations.

A tensor is an array of zero or more dimensions that may represent concepts of scalars, vectors, and matrices. For example, a scalar is a zero-dimensional tensor representing a single value, a vector is a one-dimensional tensor representing a sequence of values, and a matrix is a two-dimensional tensor representing a grid of values. Tensors may be used to store and process data such as images, audio signals, and model parameters, including model parameters used in artificial intelligence (AI) models. A variety of operations may be performed with tensors including addition, subtraction, multiplication, division, among others.

In some situations, tensors may be large enough that processing of the tensors in a typical manner using a single processor may be difficult. In these and other embodiments, a technique referred to as tensor parallelism may be used. In tensor parallelism, a tensor may be split into smaller tensor tiles. Each of the tensor tiles may be assigned to a different processing device for processing of the tensor tiles. The processing of the tensor tiles may allow for simultaneous execution of operations on the tensors tiles. The parallel execution may significantly accelerate the operations performed on the tensor.

The present disclosure provides example methods and systems for performing tensor operations when a tensor is split into tensor tiles and operations are performed by multiple processing devices on the tensor tiles. In these and other embodiments, the present disclosure provides example methods and systems for performing multiple tensor operations in sequence. For example, the present disclosure provides example methods and systems for performing a tensor multiplication operation with N number of tensors being multiplied together using multiple processing devices. For example, the tensor multiplication operation may be T1×T2×T3×TN, where each of T1, T2, T3, . . . TN is a separate tensor. In these and other embodiments, an example method may include loading two of the N tensors into multiple processing devices. The two of the N tensors may each be split into multiple tensor tiles that are distributed among the processing devices. After distribution of the multiple tensor tiles, a first tensor multiplication may be performed with the two of the N tensors using the processing devices to generate a solution tensor. The solution tensor may be split in multiple solution tensor tiles that are distributed among the processing devices. The solution tensor may be an intermediate solution of the operation. For example, the tensor multiplication operation T1×T2×T3×TN may be solved by performed T1×T2 to generate the solution tensor ST that is then multiplied with T3 to generate another solution tensor that is then multiplied with T4, etc. In these and other embodiments, a tensor multiplication of T1×T2 may be defined as follows when T1 is (m×n) matrix and T2 is a (n×p) matrix and the result is a solution tensor TS that is a (m×p) matrix such that:

$$TS_{ij} = T1_{i1}T2_{1j} + T1_{i2}T2_{2j} + \ldots + T1_{in}T2_{nj} = \sum_{k=1}^{n} T1_{ik}T2_{kj}$$

where i=1, . . . , m and j=1, . . . , p.

The method further includes after performing the first tensor multiplication, transferring one or more of the solution tensor tiles amongst one or more of the processing devices such that none of the processing devices including the entire solution tensor. While none of the processing devices including the entire solution tensor, performing a second tensor multiplication with the solution tensor ST and another of the N tensors (e.g., ST×T3). The tensor T3 may be split into multiple tensor tiles that are distributed among the processing devices before the second tensor multiplication. The second tensor multiplication may generate another solution tensor ST1. The steps of transferring and performing the second tensor operation may be repeated for each tensor remaining of the N tensors.

Figure 7A:
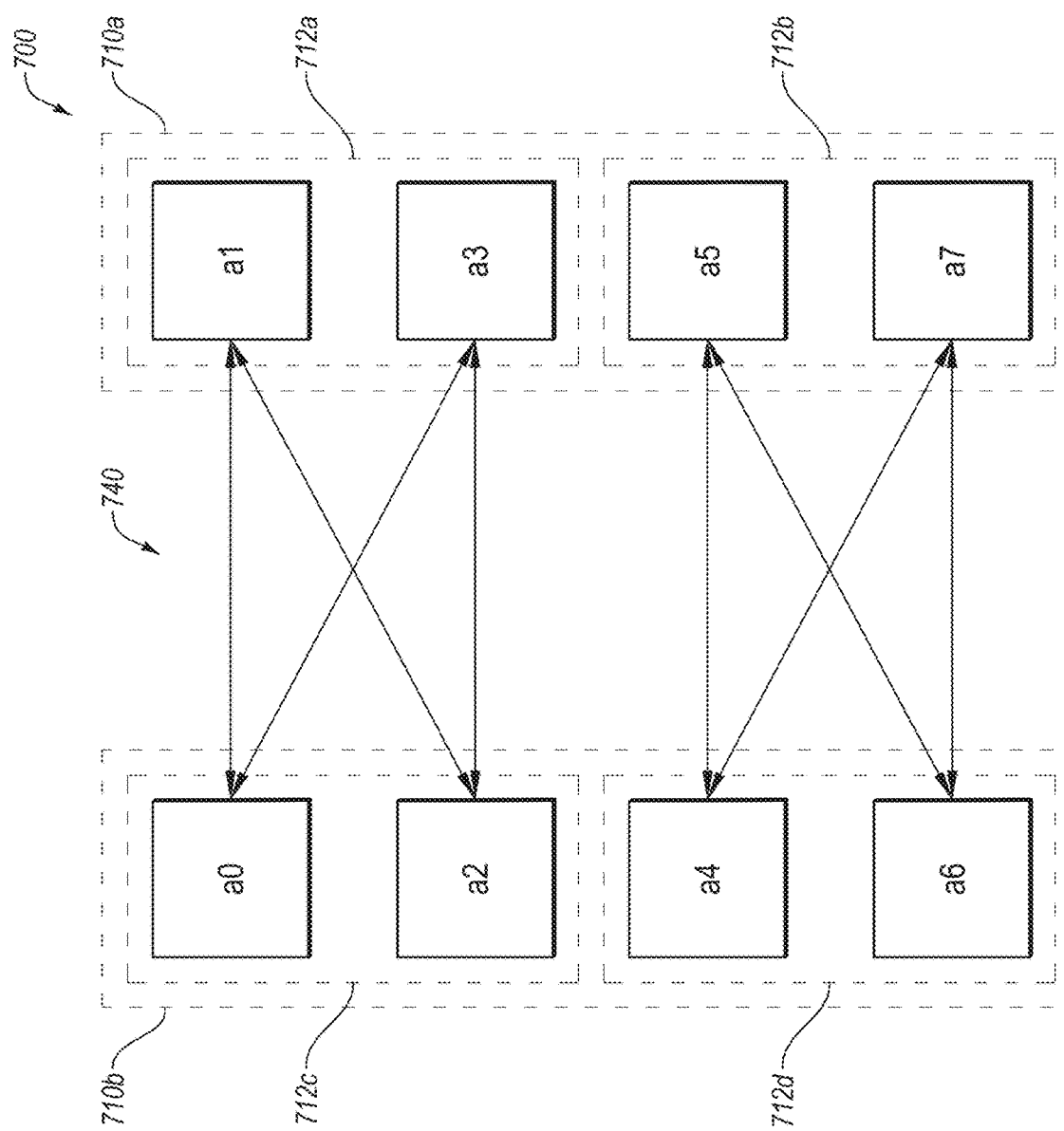
FIGS. 7A and 7B illustrate example sub-graph connections between processing devices of a tensor parallel group.
Figure 7B:
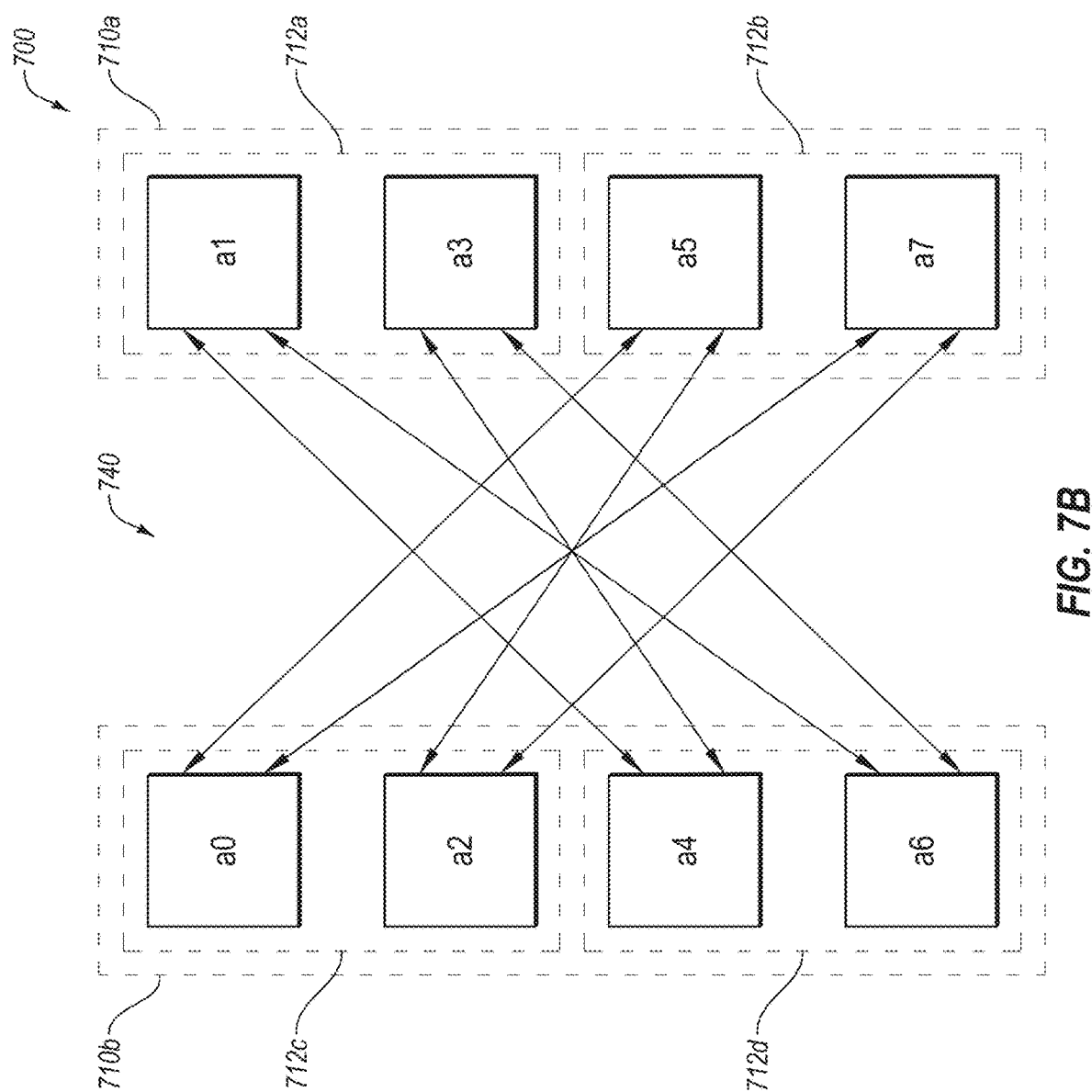

Note that the tensor operations may be performed using any type of processing system, such as a system with a fixed topology or a data switch that allows data to be shared between the processing devices during the tensor operations. In some circumstances, a data switch that allows sharing of data amongst different processing device may be expensive to include in a system that performs tensor operations. The present disclosure also provides example methods and systems for a processing system with a fixed topology that may be used to perform tensor operations. FIGS. 7A and 7B illustrates an example of the fixed topology provided by the present disclosure. In these and other embodiments, the tensors on which operations may be performed may be divided amongst the processing devices in the fixed topology in a particular manner to reduce data sharing between the processing devices and thereby help to reduce a processing time for the tensor operations. An example of how tensors may be split into tensor tiles and divided amongst the processing devices to perform tensor operations is provided with respect to FIGS. 8A and 8B.

In some circumstances, tensor parallelism may be useful during execution of AI models. For example, AI models may include large tensor that may be multiplied together. FIGS. 9-12 described system and methods that disclose how tensor operations may be performed during different AI model operations. In these and other embodiments, one or more of the concepts described with respect to tensor operations and fixed topologies described in FIGS. 1-8 may be used to perform the tensor operations during the different AI model operations.

Turning to the figures, FIG. 1 illustrates an example tensor parallel group 100 for performing tensor operations. The tensor parallel group 100 may be arranged in accordance with at least one embodiment described in the present disclosure. The tensor parallel group 100 may include a first processing device 110a, a second processing device 110b, a third processing device 110c, and a fourth processing device 110d, referred to collectively, as the processing devices 110. Each of the processing devices 110 may operate to perform one or more tensor operations. In some embodiments, the processing devices 110 may operate together to perform one or more tensor operations.

In some embodiments, each of the processing devices 110 may include one or more systolic arrays that may each include multiple processing elements that are coupled together. For example, one or more of the processing devices 110 may include an output stationary systolic array. In these and other embodiments, in an output stationary systolic array, outputs generated by the output stationary systolic array may remain at the processing elements of the output stationary systolic array and inputs and/or weights may be passed between the processing elements. Alternately or additionally, one or more of the processing devices 110 may include a weight and/or input stationary systolic array. In these and other embodiments, in a weight and/or input stationary systolic array, weights and/or inputs may remain at the processing elements of the output stationary systolic array and outputs may be passed between the processing elements. In some embodiments, one or more of the processing devices 110 may include both an output stationary systolic array and a weight and/or input stationary systolic array.

In some embodiments, each of the processing elements may be configured to perform operations on data in the systolic array. In these and other embodiments, each of the processing elements may perform a specific operation on a small portion of the data the processing elements receive and then pass the result or other data along to a neighboring processing elements. By coordinating the operations of all the processing elements in a systolic array, the systolic array can efficiently perform complex computations in parallel. In these and other embodiments, the processing elements in the local systolic array may be interconnected in a structured manner, often resembling a regular grid or mesh topology. The organization in a structured manner may allow for the flow of data through the local systolic array that may perform operations in an efficient manner.

In some embodiments, the processing elements in the systolic array may include one or more processing circuits. For example, a processing element may include an arithmetic logic unit (ALU) that may be configured to perform arithmetic and logical operations, such as addition, subtraction, multiplication, division, bitwise operations, comparisons, and more on data obtained by the processing element. Depending on the operations to be performed by the systolic array that includes the processing element, the ALU may be configured to perform only the specific operations for the systolic array. In these and other embodiments, the processing elements may include one or more other elements such as memory elements, including registers, data paths, control logic, memory interfaces, or other circuit elements that may be configured to allow the processing elements to perform the operations for the systolic array of the processing devices 110.

In some embodiments, each of the processing devices 110 may be configured to independently generate results using the individual systolic arrays. In these and other embodiments, one or more of the processing devices 110 may be coupled together. For example, in some embodiments, the processing devices 110 may be coupled together using a networking switch that enables communication between any one of the processing devices 110 with any other one of the one of the processing devices 110. Alternately or additionally, the processing devices 110 may be coupled together using bidirectional or unidirectional data flows. In these and other embodiments, one or more of the processing devices 110 may be coupled to other of the processing devices 110. In these and other embodiments, all the processing devices 110 may be coupled together or some of the processing devices 110 may be coupled to a first subset of the processing devices 110 and not coupled to a second subset of the processing devices 110.

In some embodiments, the individual systolic arrays of the processing devices 110 that are coupled together may be considered as a group systolic array 120. In these and other embodiments, the group systolic array 120 may be configured to perform operations, such as tensor operations. When the group systolic array 120 is configured to perform operations on a tensor that is larger than an individual systolic array of one of the processing devices 110, tensor parallelism may be applied to perform the operations on the tensor across the processing devices 110.

In some embodiments, to perform tensor parallelism, a tensor may be split into two or more tensor tiles. The tensor tiles may be provided to the group systolic array 120 for operations to be performed. For example, each of the tensor tiles may be provided to one or more of the processing devices 110 for processing.

FIG. 2 illustrates tensor splitting 200 of a tensor B. The tensor B may include elements $b_{00}$ to $b_{ml}$, where m and l are numbers that are greater than 1. The tensor B may be split into tensor tiles C and D. The tensor tile C may include a portion of the elements of tensor B and tensor tile D may include the other portion of the elements of tensor B. For example, tensor tile C may include elements $b_{00}$ to $b_{mj}$ and tensor tile D may include elements $b_{0(j+1)}$ to $b_{ml}$. As an example, when the elements of tensor B are split into tensor tiles C and D, each of the tensor tile C and the tensor tile D may only be processed using a different one of the processing devices 110. For example, the first processing device 110a may be configured to process the tensor tile C and the second processing device 110b may be configured to process the tensor tile D. As another example, when the elements of tensor B are split into tensor tiles C and D, each of the tensor tile C and the tensor tile D may be processed by multiple of the processing devices 110. For example, the first processing device 110a may be configured to process the tensor tile C and D and the second processing device 110b may be configured to process the tensor tile C and D.

In some embodiments, when a tensor is split amongst the processing devices 110 and an operation performed on the tensor, data may be shared between the processing devices 110 to perform the operation. In some embodiments, data sharing between the processing device 110 may include a data reduction process and/or a data gather process.

In a data reduction process, data may be generated by the processing devices 110. The data generated by the processing devices 110 may not be a final result of the operation. The data generated by the processing devices 110 may be a sub-result of the operation. In these and other embodiments, the sub-results stored on the processing devices 110 may be shared amongst the processing devices 110 and combined to generate the final result of the operation. For example, during a multiplication operation of two tensors, each of the processing devices 110 may generate sub-results of the multiplication operation by generating sub-results of elements of the two tensors that are included in each of the processing device 110. For example, a first processing tile may have a first tile and a second tile. The first processing device may perform a tensor multiplication of the first tile and the second tile to generate first sub-results. A second processing device may have the first tile and a third tile. The second processing device may perform a tensor multiplication of the first tile and the third tile to generate second sub-results. The multiplication operation of the two tensors may also include a summation of the first and second sub-results. In these and other embodiments, the processing devices 110 may share the sub-results and sum the sub-results to generate the final result of the matrix multiplication. For example, the first processing device 110a may provide sub-results from a multiplication operation to the second processing device 110b. The second processing device 110b may sum the sub-results from the first processing device 110a to the sub-results from the second processing device 110b to generate the final results of the multiplication operation.

For example, an operation between a first tensor of size b×d and a second tensor of size d×m to generate an output tensor may be performed using tensor parallelism using the data reduction process. To use the data reduction process, the first tensor may be split into n tiles where n is the number of processing devices performing the tensor parallelism such that each processing device includes a b×d/n tile of the first tensor and a d/n×m tile of the weight matrix. Each processing device performs a tensor operation that results in b×m sub-results, where the sum of all the sub-results is the solution tensor. Each of those sub-results are divided into b×m/n tiles, and each tile is sent to a processing device to be summed, leaving each processing device with a b×m/n slice of the output tensor.

In some embodiments, in a data gather process, data is copied between the processing devices 110. For example, the first processing device 110a may provide the results from a matrix multiplication to the second processing device 110b. The second processing device 110b may store the results from the first processing device 110a such that the second processing device 110b has a copy of the results generated by the first processing device 110a.

For example, an operation between a first tensor of size b×d and a second tensor of size d×m to generate an output tensor may be performed using tensor parallelism using the data gather process. To use the data gather process, the first tensor may be copied onto each of n number of processing devices performing the tensor parallelism. Each processing device may also include a d×m/n tile of the second tensor. Each processing device performs the tensor operation, leaving a b×m/n tile of a solution tensor on each processing device. Each of the tiles may be copied to all the n processing devices such that each of the processing devices include an entirety of the solution tensor.

In some embodiments, tensor operations may be performed that may include multiple number of tensors, such as N number of tensors, to generate a solution tensor. For example, tensor operations may include the multiplication of N number of tensors such as T1×T2×T3 . . . ×TN to generate a solution tensor, where N is three or more. Note that the dimensions of the tensors may be the same or different. For example, some or all the tensors may have the same dimensions or none of the tensors may have the same dimensions. In these and other embodiments, the dimensions of the tensors may be such that operations between the tensors may be performed.

In some embodiments, to perform the tensor operations of N number of tensors, each of the operations may be performed between two tensors. A first operation may be performed between two tensors of the N tensors. The first operation between the two tensors of the N tensors may result in a partial-solution tensor. A second operation may be performed between the partial-solution tensor and another tensor of the N tensors to generate another partial-solution tensor. The procedure may continue until an operation is performed with each of the N tensors. For example, N may be 4 such that there are tensors T1, T2, T3, and T4. A first operation may be performed between T1 and T2 to generate partial-solution tensor ST1. A second operation may be performed between ST1 and T3 to generate partial-solution tensor ST2. A third operation may be performed between ST2 and T4 to generate a solution tensor for the operation that includes the tensors T1, T2, T3, and T4. In these and other embodiments, the operations performed between the tensors may be the same or different.

To perform a first operation for N number of tensors, each of the first and second tensors may be split into two or more tiles. In some embodiments, each of the tiles of the first and second tensors may be unique sets of elements. For example, the elements in a first tile of the first tensor may not be found in any of the other tiles of the first tensor. Alternately or additionally, one or more of the tiles of the first and second tensors may not be unique sets of elements and one or more of the of the tiles of the first and second tensors may be unique sets of elements. For example, one or more of the elements in a first tile of the first tensor may be found in one or more of the other tiles of the first tensor. In some embodiments, some or all the tiles of the first tensor may include a same or different dimension and some or all the tiles of the second tensor may include a same or different dimension. For example, the first tensor may have a dimension of b×d and all of the tiles of the first tensor may have a dimension of b×d/n. In these and other embodiments, the dimensions of the tiles of the first tensor may be the same or different than the dimensions of the tiles of the second tensor.

In some embodiments, each of the two or more tiles of the first and second tensors may be distributed among the processing devices 110 for performing the operation. In these and other embodiments, the tiles of the first and second tensors may be distributed such that some or all the processing devices 110 may include one or more tiles of the first tensor and one or tiles of the second tensor. For example, some of the processing devices 110 may not include tiles of either of the first tensor or the second tensor or all the processing devices 110 may include tiles from the first tensor and tiles from the second tensor.

In some embodiments, each of the processing devices 110 that include a tile may include a same number of tiles or a different number of tiles. For example, the first processing device 110a may include one tile of the first tensor and the second processing device 110b may include one tile of the first tensor. In these and other embodiments, the tiles of the first tensor may be equally distributed among the processing devices 110 such that each of the processing devices 110 includes a same number of tiles of the first tensor. Alternately or additionally, the first processing device 110a may include two tiles of the first tensor and the second processing device 110b may include one tile of the first tensor. In these and other embodiments, the tiles of the first tensor may not be equally distributed among the processing devices 110 such that each of the processing devices 110 does not include a same number of tiles of the first tensor.

In some embodiments, the tiles of the first tensor and/or the second tensor may be distributed such that no duplication of the tiles exists among the processing devices 110. For example, if the first tensor included four tiles, each of the processing devices 110 may include one of the four tiles and no copies of the tiles may exist among the processing devices 110. Alternately or additionally, the tiles of the first tensor and/or the second tensor may be distributed such that duplication of the tiles exists among the processing devices 110. For example, a first tile of the first tensor may be distributed to the first processing device 110a and the second processing device 110b.

In some embodiments, the tiles of the first tensor may be distributed in a first manner and the tiles of the second tensor may be distributed in a second manner. In some embodiments, the second manner may be different than the first manner. For example, the first tensor may include third and second tiles and the second tensor may include third, fourth, fifth, and sixth tiles. In these and other embodiments, the first and second tiles may be distributed such that multiple of the processing devices 110 include the first tile, multiple of the processing devices 110 include the second tile, and each of the processing devices 110 include one of the third, fourth, fifth, and sixth tiles. Alternately or additionally, the second manner may be the same as the first manner.

After the tiles of the first and second tensors are distributed among the processing devices 110, the tensor parallel group 100 may perform the operation using the tiles of the first and second tensors. The operation may result in an intermediate tensor, such as a partial-solution tensor discussed above.

In some embodiments, the operation may be accomplished without sharing data between the processing devices 110. For example, each of the processing devices 110 may include all the data to generate the intermediate tensor. Alternately or additionally, the operation may include sharing data between the processing devices 110. For example, the processing devices 110 may perform one or more first sub-operations of the operation using the tiles of the first and second tensors to generate sub-results on the processing devices 110. The processing devices 110 may share sub-results and perform one or more second sub-operations of the operation using the sub-results to generate the intermediate tensor.

For example, the operation may be a tensor multiplication. In these and other embodiments, the processing devices may perform a dot-product operation using the tiles of the first and second tensors to generate multiple products. In these and other embodiments, a data reduction process may be performed among the processing devices 110. For example, at least one of the processing devices 110 may transfer the product of the at least one of the processing devices 110 to another of the processing devices 110 to perform a summation of the products to generate the intermediate tensor. Thus, two or more of the products on which the data reduction process is performed may be generated by different ones of the processing devices 110 such that one of the products is transferred between the different ones of the processing devices 110 for summation.

In some embodiments, the intermediate tensor may be generated such that the intermediate tensor is split into tiles that are distributed among the processing devices 110. For example, the first processing device 110a may generate elements of the intermediate tensor that form a first tile of the intermediate tensor and the second processing device 110b may generate elements of the intermediate tensor that form a second tile of the intermediate tensor. As such, the intermediate tensor may not be found on a single one of the processing devices 110 but may be split into tiles that are distributed among the processing devices 110. Note that the intermediate tensor may be generated without sharing of data between the processing devices 110, such as a data gather processes, by other than the data reduction process discussed above.

After generating the intermediate tensor, the tiles of the intermediate tensor may be distributed among one or more of the processing devices 110. In some embodiments, the tiles of the intermediate tensor may be distributed such that none of the processing devices 110 include the entire intermediate tensor. In these and other embodiments, the tiles of the intermediate tensor may be distributed among the processing devices 110 such that each of the processing devices 110 includes a unique sub-set of the tiles and the tiles are equally distributed among the processing devices 110. In these and other embodiments, a unique sub-set of the tiles may indicate that there are no copies of the tiles, and each tile is found on only one of the processing devices 110. The tiles being equally distributed may indicate that each of the processing devices 110 includes an equal number of tiles of the intermediate tensor. Alternately or additionally, the tiles may not be equally distributed among the processing devices 110. Alternately or additionally, copies of the tiles may exist on two or more of the processing devices 110.

After distribution of the tiles of the intermediate tensor, the tensor parallel group 100 may perform another operation using the intermediate tensor and a third tensor. Before the operation is performed using the intermediate tensor and a third tensor, the third tensor may be split into tiles. In some embodiments, the third tensor may be split into tiles in a similar manner as either the first tensor, the second tensor, or the immediate tensor. Alternately or additionally, the third tensor may be split into tiles in a manner unique from the first tensor, the second tensor, or the immediate tensor.

In these and other embodiments, the tiles of the third tensor may be distributed among the processing devices 110. In some embodiments, the tiles of the third tensor may be distributed such that none of the processing devices 110 include the entire third tensor. In these and other embodiments, the tiles of the third tensor may be distributed among the processing devices 110 such that each of the processing devices 110 includes a unique sub-set of the tiles and the tiles are equally distributed among the processing devices 110. Alternately or additionally, the tiles may not be equally distributed among the processing devices 110. Alternately or additionally, copies of the tiles may exist on two or more of the processing devices 110.

The operation performed using the intermediate tensor and a third tensor may result in a fourth tensor. In some embodiments, the operation may be accomplished without sharing data between the processing devices 110. Alternately or additionally, the operation may include sharing data between the processing devices 110, such as discussed above with respect to the intermediate tensor.

In some embodiments, the fourth tensor may be generated such that the fourth tensor is split into tiles that are distributed among the processing devices 110. After generating the fourth tensor, the tiles of the fourth tensor may be distributed among one or more of the processing devices 110. In some embodiments, the fourth tensor may be distributed among the processing devices 110 in a same manner as the tile of the first tensor are distributed among the processing devices 110.

When there are no more tensor operations to be performed, the fourth tensor may be a solution tensor of the tensor operations. When there are more tensor operations to be performed, the fourth tensor may be a partial solution tensor. In these and other embodiments, another operation may be performed between the fourth tensor and a fifth tensor to generate another partial solution tensor. The operations of generating partial solution tensors as discussed and distributing tiles of the newly generated partial solution tensors among one or more of the processing devices 110 may continue until there are no more tensor operations to be performed.

In some embodiments, when performing the tensor operations of N number of tensors, how the tensors are split into tiles and how the tiles are distributed among the processing devices 110, referred to as tensor preparation, may affect how data is shared between the processing devices 110 when performing the tensor operations. For example, tensor preparation may affect which of the processing devices 110 may share data and how much data is shared between the processing devices 110. For example, the tensors may be prepared such that equal amounts of data are shared between the processing devices 110 that share data. For example, the tensors may be prepared such that for a data reduction process during the operations, each of the processing devices 110 transmits and/or receives the same amount of data. Alternately or additionally, the tensors may be prepared such that for a data gather process during the operations, each of the processing devices 110 transmits and receives the same amount of data. Alternately or additionally, the tensors may be prepared such that for a data gather processes and a data reduction processes, each of the processing devices 110 transmit and receive the same amount of data for each of the processes. For example, a first amount of data may be transmitted for each data gather process, a second amount of data may be transmitted for each data reduction process, and the first amount of data may be equal to the second amount of data.

In some embodiments, the tensor preparation may be adjusted based on a characteristic of the tensor operations. For example, the tensor preparation may be selected to enhance or optimize a particular characteristic of the tensor operation. For example, tensor preparation may be selected to reduce a total bandwidth of data transfer between the processing devices 110 during the tensor operations. Alternately or additionally, tensor preparation may be selected to reduce a maximum transfer bandwidth of data between the processing devices 110 during a given tensor operation.

In some embodiments, a maximum transfer bandwidth may indicate the most amount of data for a given time period that may be transferred between any two of the processing devices 110 for an operation to be performed. In these and other embodiments, how the tensors are prepared may affect a required maximum transfer bandwidth for a given operation. For example, reducing maximum transfer bandwidth may be given by the following equation:

$$\text{minimize}(\max((n/p+q-2)*4W[0],(n/q+p-2)W[1]))$$

where n is a number of the processing devices, p is the parallelism of the input, q is the parallelism of the output, W[0] is a first matrix and W[1] is a second matrix for multiplication. When the number of processing devices is 8, p=4.35235, q=1.83809. Note that the values of p and n may be selected to be divisors of n, such that when n=8, p=4 and q=2. As such, it is understood to reduce the maximum transfer bandwidth, the input matrix may be split such that an entirety of the input matrix is found on 4 of the 8 processing devices so that the parallelism of the input is 4. In some embodiments, other equations may be generated to enhance or optimize a particular characteristic of the tensor operation. In these and other embodiments, how the tensors are divided may be different for the different characteristics.

For example, in some embodiments, reducing the maximum transfer bandwidth may also result in reducing the total required bandwidth of the system. In these and other embodiments, the configuration for reducing the maximum transfer bandwidth may result in reducing the total required bandwidth that is within a certain percentage of a true reduction of the total required bandwidth. For example, the percentage may be 1, 2, 5, 10, 15, 20, or 25 percent.

An example of performing tensor operations given the tensor preparation to reduce the maximum transfer bandwidth is now provided. The tensor operations may be Y×W_0×W_1, where Y, W_0, and W_1 are tensors and there are N number of processing devices. The tensors may have dimensions of b, c, and d where the dimension of Y may be b×c, the dimension of W_0 may be c×d, and the dimension of W_1 may be d×c. P and q may be divisors of N and may be selected based on N to reduce the maximum transfer bandwidth.

To begin, the tensor Y may be split into q tiles of dimension b×(c/q) and p copies of the tiles of Y are distributed among the processing devices with each copy of the tiles of Y being on a different one of the processing devices. The tensor W_0 may be split into tiles with dimensions of (c/q)×(d/p). To multiply the tensor Y by the tensor W_0, a dot-product of the elements of the tiles of the tensor W_0 and the tiles of the tensor Y may be performed. The dot-product of the elements of the tiles of the tensor W_0 and the tiles of the tensor Y may result in each of the processing devices including tiles of the dot-product results. The tiles of the dot-product results may be added to other of the tiles of the dot-product results to obtain the elements of an intermediate tensor. For example, the elements of the intermediate tensor may be products that collectively have as one of their multiplicands all the tensor Y. Because each of the processing devices includes 1/q of the tensor Y, q number of tiles of the dot-product results may be added together to generate a tile of the intermediate tensor.

After generation of the intermediate tensor, the intermediate tensor may be multiplied by the W_1 tensor. The W_1 tensor may be split into tiles with dimensions of (d/p)×(c/q). To allow the intermediate tensor to be multiplied by the W_1 tensor, the tiles of the intermediate tensor may be copied such that each of the tiles of the intermediate tensor may reside on q number of the processing devices.

To multiply the intermediate tensor by the tensor W_1, a dot-product of the elements of the tiles of the tensor W_1 and the tiles of the intermediate tensor may be performed. The dot-product of the elements of the tiles of the tensor W_1 and the tiles of the intermediate tensor may result in each of the processing devices including tiles of the dot-product results. The tiles of the dot-product results may be added to other of the tiles of the dot-product results to obtain the elements of a solution tensor. For example, the elements of the solution tensor may be products that collectively have as one of their multiplicands all the intermediate tensors. Because each of the processing devices includes 1/p of the intermediate tensor, tiles of the dot-product results from p number of the processing devices may be added together to generate the solution tensor.

After generation of the solution tensor, the solution tensor may include multiple tiles that may not be distributed in the same manner as the tiles of tensor Y. In these and other embodiments, the tiles of the solution tensor may be distributed among the processing devices to have the distribution of the tiles of tensor Y.

Modifications, additions, or omissions may be made to the tensor parallel group 100 without departing from the scope of the present disclosure. For example, in some embodiments, the tensor parallel group 100 may include more or fewer processing devices 110. For example, the tensor parallel group 100 may include 2, 3, 5, 6, 7, 8, 9, 10, 12, 15, 20 or more processing devices 110.

Figure 3:
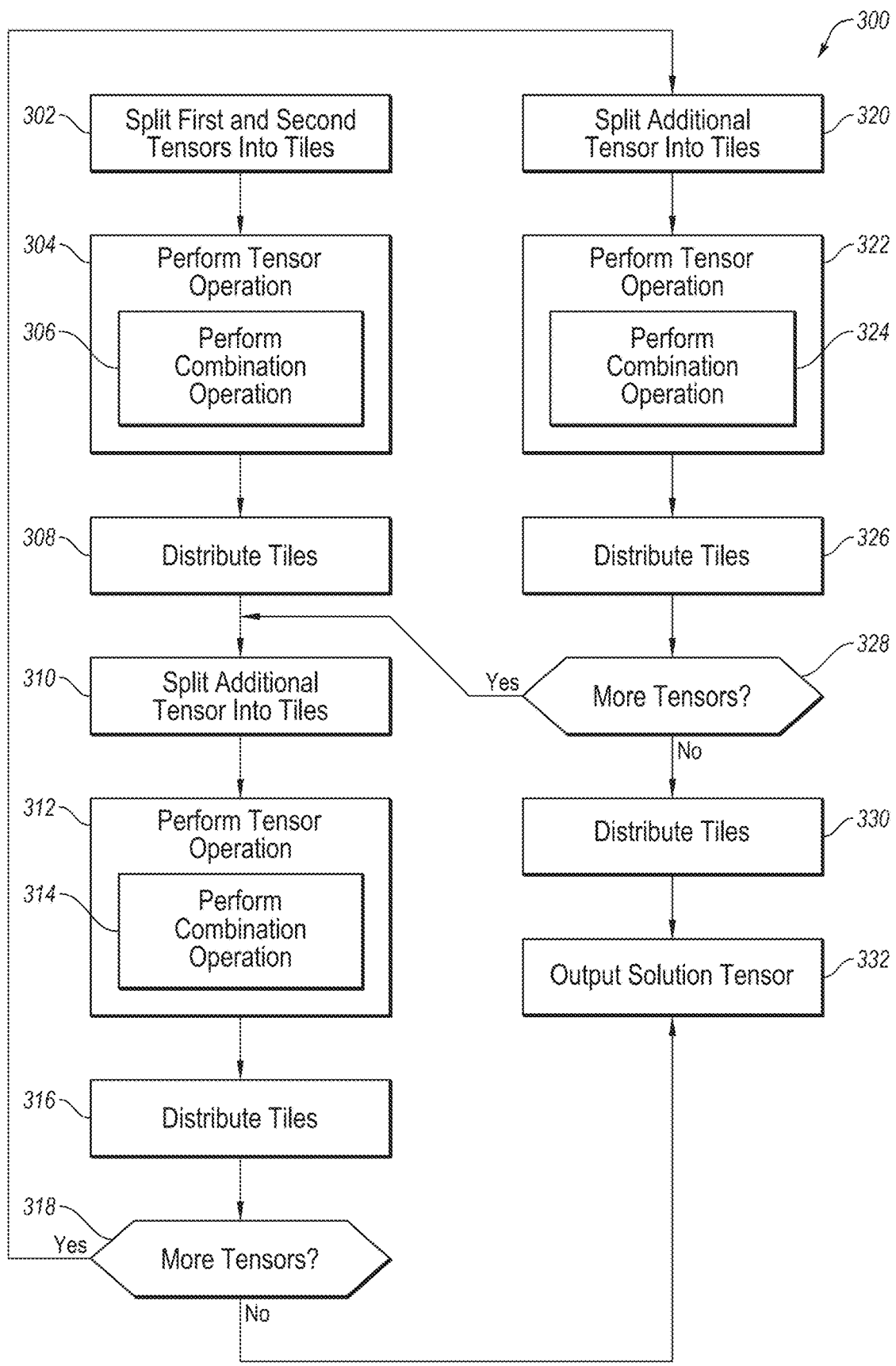
FIG. 3 illustrate a flowchart of an example method to perform tensor operations.

FIG. 3 illustrates a flowchart of an example method 300 to perform tensor operations. The method 300 may be arranged in accordance with at least one embodiment described in the present disclosure. One or more operations of the method 300 may be performed, in some embodiments, by a device or system, such as the tensor parallel group of FIG. 1 or another device or combination of devices. In these and other embodiments, the method 300 may be performed based on the execution of instructions stored on one or more non-transitory computer-readable media. Although illustrated as discrete blocks, various blocks may be split into additional blocks, combined into fewer blocks, or eliminated, depending on the desired implementation.

The method 300 may be configured to perform tensor operations on one or more tensors using tensor parallelism among multiple processing devices. The method 300 may be used for any number of tensor operations, such as addition, subtraction, multiplication, and other tensor operations. For example, the method 300 may be configured to perform tensor operations such as T1×T2×T3×Tn. Note that one or more other operations may be performed between the multiplication operations between the tensors. For example, T1×T2 may generate intermediate tensor T1. Before performing the operation T1×T3, one or more other operations, such as normalization functions and/or other functions may be performed on the T1.

The method 300 may begin at block 302 where first and second tensors may be split into tensor tiles. In some embodiments, the first tensor may be split such that none of the processing devices includes the full first tensor. In some embodiments, the first tensor may be split into fewer tiles than there are processing devices such that copies of the tiles of the first tensor may be divided among the processing devices. For example, for eight processing devices, the first tensor may be split into two tiles and four of the processing devices may receive one of the tiles and the other four of the processing devices may receive the other one of the tiles. As a result, duplication of the tiles of the first tensor may exist among the processing devices.

In some embodiments, the second tensor may be split such that none of the processing devices include the full second tensor. In some embodiments, the second tensor may be split into a number of tiles where the number of tiles is equal to or greater than a number of the processing devices. The tiles of the second tensor may be distributed among the processing device such that no duplication of the tiles of the second tensor exists among the processing devices. As such, the second tensor may be split in a different manner than the first tensor.

At block 304, a tensor operation may be performed by the processing devices using the first and second tensors. The tensor operation may generate an intermediate tensor. In some embodiments, the tensor operation and/or how the first and second tensor are split among the processing devices may be such that no combination operation is necessary to generate the intermediate tensor. For example, an addition operation may not require a combination operation, such as a reduce operation, because the operation depends on elements that are found on a single processing device. Alternately or additionally, the first and second tensors may be split such that the operation depends on elements that are not found on a single processing device. In some embodiments, the tensor operation may be a type such that combination operation may be used to generate the intermediate tensor. For example, a multiplication operation may use a combination operation when dot-product results during the multiplication operation are found on multiple processing devices.

When a combination operation may be used, the method may proceed to block 306. When a combination operation may not be used, the method may proceed to block 308.

At block 306, a combination operation may be performed to generate the intermediate tensor. The combination operation may include sharing data between the processing devices. For example, for a multiplication operation, a dot-product may be performed by the processing device using the elements of the first and second tensors in the processing devices. After the dot-product, a summation of the dot-product results may occur and the dot-product results to be summed may be found on multiple of the processing devices. In these and other embodiments, the results on which an additional operation is to be performed that are not on the same processing device may be shared to allow the operation to be performed. In these and other embodiments, a number of processing devices that may include results that may be combined in the combination operation may depend on how the first and second tensors are split. For example, a number of tiles into which the first tensor is split may indicate how many processing devices include results that may be combined in the combination operation. For example, if the first tensor is split into two tiles, results from two processing devices may be combined in the combination operation.

In some embodiments, the intermediate tensor may be split into tiles amongst the processing devices. In these and other embodiments, the intermediate tensor may be split such that no processing device includes the entire intermediate tensor. Alternately or additionally, the intermediate tensor may be distributed among the processing device such that no duplication of the tiles of the intermediate tensor exists among the processing devices.

At block 308, the tiles of the intermediate tensor may be distributed among the processing devices. In these and other embodiments, the tiles of the intermediate tensor may be distributed such that there is duplication of the tiles of the intermediate tensor among the processing devices. For example, the intermediate tensor may be distributed such that each tile of the intermediate tensor is found on a number of the processing devices where the number is equal to the number of tiles into which the first tensor is split. For example, the intermediate tensor may be distributed such that each tile of the intermediate tensor is found on two of the processing devices. In these and other embodiments, the intermediate tensor may be distributed such that no processing device includes the entire intermediate tensor.

At block 310, an additional tensor may be split into tensor tiles. In some embodiments, the additional tensor may be split such that none of the processing devices includes the full additional tensor. In some embodiments, the additional tensor may be split into a number of tiles where the number of tiles is equal to or greater than a number of the processing devices. The tiles of the additional tensor may be distributed among the processing device such that no duplication of the tiles of the additional tensor exists among the processing devices. In some embodiments, the additional tensor may be split in a different manner than the first tensor and the second tensor.

At block 312, a tensor operation may be performed by the processing devices using the intermediate tensor and the additional tensor. The tensor operation may generate a second intermediate tensor. In some embodiments, the tensor operation and/or how the intermediate tensor and the additional tensor are split among the processing devices may be such that no combination operation is necessary to generate the second intermediate tensor.

When a combination operation may be used, the method may proceed to block 314. When a combination operation may not be used, the method may proceed to block 316.

At block 314, a combination operation may be performed to generate the second intermediate matrix. The combination operation may include sharing data between the processing devices. In these and other embodiments, a number of processing devices that may include results that may be combined in the combination operation may depend on how the intermediate tensor, the additional tensor, the first tensor, and/or second tensor are split. For example, a number of copies made of the tiles of the first tensor may indicate how many processing devices include results that may be combined in the combination operation. For example, if tiles of the first tensor are copied four times, results from four processing devices may be combined in the combination operation.

In some embodiments, the second intermediate tensor may be split into tiles amongst the processing devices. In these and other embodiments, the second intermediate tensor may be split such that no processing device includes the entire second intermediate tensor. Alternately or additionally, the second intermediate tensor may be distributed among the processing device such that no duplication of the tiles of the second intermediate tensor exists among the processing devices.

At block 316, the tiles of the second intermediate tensor may be distributed among the processing devices. In these and other embodiments, the tiles of the second intermediate tensor may be distributed such that there is duplication of the tiles of the intermediate tensor among the processing devices. For example, the second intermediate tensor may be distributed such that the second intermediate tensor has a distribution similar to the distribution of the first tensor. In these and other embodiments, the second intermediate tensor may be distributed such that no processing device includes the entire second intermediate tensor. Note that the process for distribution of the second intermediate tensor may be different than the process for distribution of the intermediate tensor in block 308.

At block 318, it may be determined if there are more tensors on which to perform operations. In response to there not being more tensors, the method 300 may proceed block 332. In response to there being more tensors, the method 300 may proceed to block 320 and continue to perform tensor operations.

At block 320, an additional tensor may be split into tensor tiles. The additional tensor may be split in a similar manner as the second tensor is split.

At block 322, a tensor operation may be performed by the processing devices using the additional tensor and second intermediate tensor. The tensor operation may generate a third intermediate tensor. When a combination operation may be used during the tensor operation of block 322, the method may proceed to block 324. When a combination operation may not be used, the method may proceed to block 326.

At block 324, a combination operation may be performed to generate the third intermediate tensor.

At block 326, the tiles of the third intermediate tensor may be distributed among the processing devices. In these and other embodiments, the tiles of the third intermediate tensor may be distributed in a similar manner as the tiles of the intermediate tensor are distributed in block 308.

At block 328, it may be determined if there are more tensors on which to perform operations. In response to there not being more tensors, the method 300 may proceed to block 330. In response to there being more tensors, the method 300 may proceed to block 310 and continue to perform tensor operations.

At block 330, the tiles of the third intermediate tensor may be distributed among the processing devices. In these and other embodiments, the tiles of the third intermediate tensor may be distributed such that the distribution of tiles of the third intermediate tensor is the same of the distribution of tiles of the second intermediate tensor in block 316.

Note that the distribution of the tiles of the intermediate tensors, such as the intermediate tensor, the second intermediate tensor, and the third intermediate tensor may vary based on the operation being performed. For odd numbered operations being performed, such as distribution after the first, third, fifth, etc. operation, the distribution may be the same as described in block 308. For even numbered operations being performed, such as distribution after the second, fourth, sixth etc. operation, the distribution may be the same as described in block 316. Thus a different process of distribution may be used for distributions after odd numbered operations and even numbered operations.

At block 332, a solution tensor may be output as a solution of the operations performed on the tensors. The solution tensor may be formed by combining tiles of the solution tensor from multiple of the processing devices. For example, the solution tensor may be split in a similar manner as the first tensor is split.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
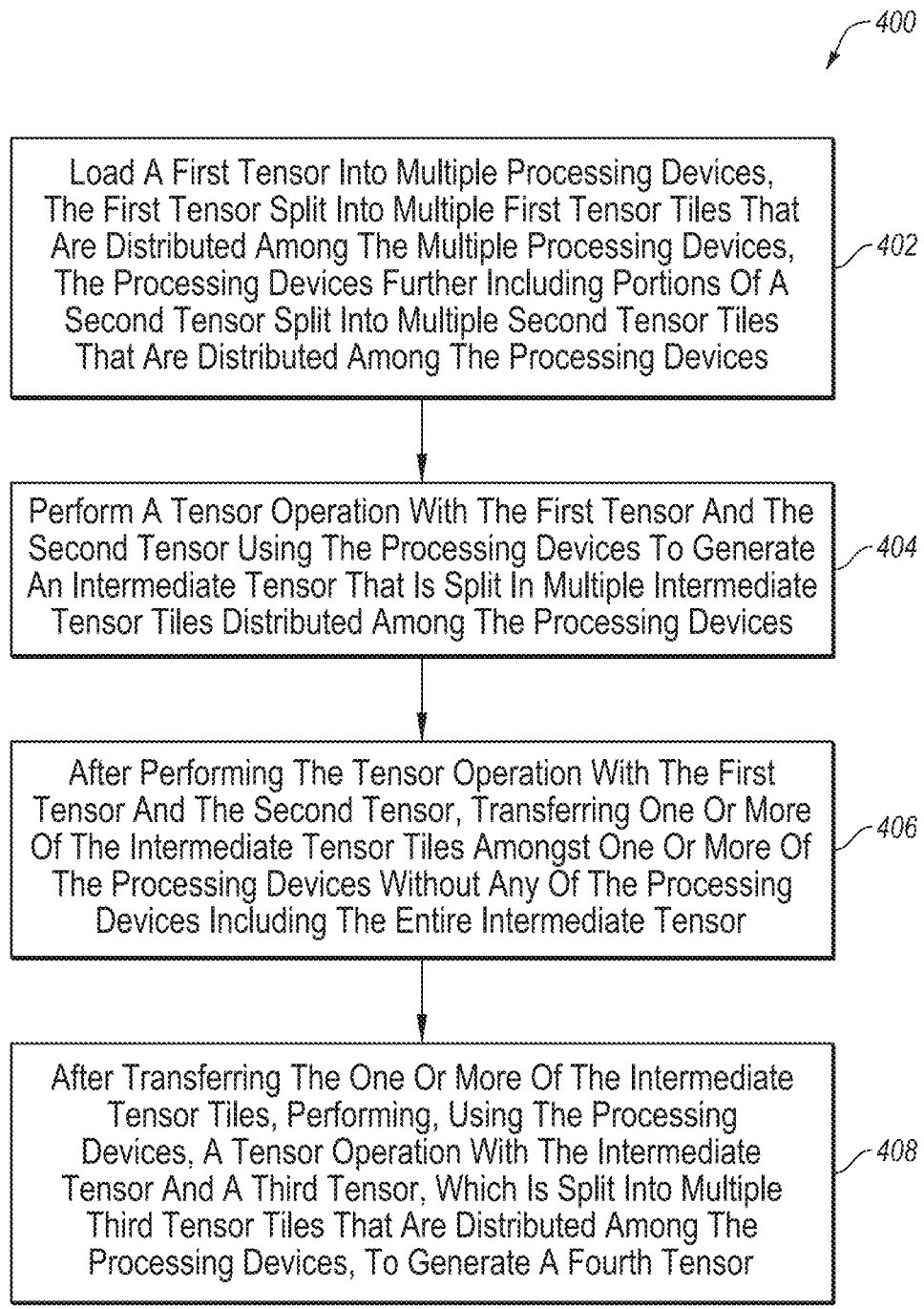
FIG. 4 illustrate a flowchart of another example method to perform tensor operations.

FIG. 4 illustrates a flowchart of an example method 400 to perform tensor operations. The method 400 may be arranged in accordance with at least one embodiment described in the present disclosure. One or more operations of the method 400 may be performed, in some embodiments, by a device or system, such as the tensor parallel group 100 of FIG. 1 or another device or combination of devices. In these and other embodiments, the method 400 may be performed based on the execution of instructions stored on one or more non-transitory computer-readable media. Although illustrated as discrete blocks, various blocks may be split into additional blocks, combined into fewer blocks, or eliminated, depending on the desired implementation.

The method 400 may begin at block 402 where a first tensor may be loaded into multiple processing devices. The first tensor may be split into multiple first tensor tiles that are distributed among the processing devices. The processing devices may further include portions of a second tensor split into multiple second tensor tiles that are distributed among the processing devices. In some embodiments, the first tensor tiles may be distributed among the processing devices such that each of the processing devices includes a different sub-set of the first tensor tiles and no duplication of the first tensor tiles exists among the processing devices. Alternately or additionally, the second tensor tiles may be distributed among the processing devices such that half of the processing devices each include the second tensor tiles.

At block 404, a tensor operation may be performed with the first tensor and the second tensor using the processing devices to generate an intermediate tensor that is split in multiple intermediate tensor tiles distributed among the processing devices. In some embodiments, after the tensor operation with the first tensor and the second tensor, the intermediate tensor tiles are distributed among the processing devices such that each of the processing devices includes a unique sub-set of the intermediate tensor tiles and the intermediate tensor tiles are equally distributed among the processing devices.

In some embodiments, the tensor operation with the first tensor and the second tensor is a tensor multiplication. In these and other embodiments, the tensor multiplication may include multiplying, by the processing devices, elements of the first tensor with elements of the second tensor to generate multiple products. The tensor multiplication may further include a reducing operation that includes transferring one or more of the products amongst one or more of the processing devices and after the transfer, performing an operation with one or more of the products with another of the products to generate an element of the intermediate tensor. The operation may be a summation or some other operation. In these and other embodiments, the performing an operation with the one or more of the products with another of the products to generate an element of the intermediate tensor may include two or more of the products on which the operation is performed being generated by different processing devices.

At block 406, after performing the tensor operation with the first tensor and the second tensor, one or more of the intermediate tensor tiles may be transferred amongst one or more of the processing devices without any of the processing devices including the entire intermediate tensor. In some embodiments, the one or more of the intermediate tensor tiles may be transferred amongst one or more of the processing devices such that each of the intermediate tensor tiles is included in two or more of the processing devices.

At block 408, after transferring the one or more of the intermediate tensor tiles, a tensor operation may be performed with the intermediate tensor and a third tensor using the processing devices. The third tensor may be split into multiple third tensor tiles that are distributed among the processing devices, to generate a fourth tensor. In some embodiments, a number of the third tensor tiles is greater than a number of the first tensor tiles, such as two, four, six, or more times greater. In some embodiments, the third tensor tiles may be distributed among the processing devices such that each of the processing devices includes a different sub-set of the third tensor tiles and no duplication of the third tensor tiles exists among the processing devices.

In some embodiments, the tensors may be matrices. In these and other embodiments, the tensor operations may be matrix multiplications. In some embodiments, each tensor tile of the first tensor tiles may be a unique set of elements of the first tensor, each tensor tile of the second tensor tiles may be a unique set of elements of the second tensor, each tensor tile of the intermediate tensor tiles may be a unique set of elements of the intermediate tensor, and each tensor tile of the third tensor tiles may be a unique set of elements of the third tensor. Alternately or additionally, one or more of the tiles of the first, second, third, and the intermediate tensors may not be unique sets of elements. For example, one or more of the elements in a first tile of the first tensor may be found in one or more of the other tiles of the first tensor.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the method 400 may further include selecting a word for output by the artificial intelligence model based on the multiple second result blocks.

For example, in some embodiments the fourth sensor may be a solution tensor and the method 400 may further include obtaining multiple additional tensors. For example, the multiple additional tensors may be obtained before the method begins. In these and other embodiments, the multiple additional tensors may be tensors that may be multiplied with the solution tensor already generated. In these and other embodiments, after performing the tensor operation with the intermediate tensor and the third tensor, the method 400 may further include transferring one or more of multiple solution tensor tiles of the solution tensor amongst one or more of the processing devices without any of the processing devices including the entire solution tensor. The method 400 may also include after the transferring, performing, using the processing devices, another tensor operation with the solution tensor and one of the additional tensors to generate another solution tensor. In these and other embodiments, the one of the additional tensors may be split into multiple tensor tiles that are distributed among the processing devices. The method may further include repeating the steps of transferring and performing the other tensor operation for each remaining tensor.

In some embodiments, the fourth tensor may be split into multiple fourth tensor tiles distributed among the processing devices. In these and other embodiments, the method 400 may further include after performing the tensor operation with the intermediate tensor and the third tensor, transferring one or more of the fourth tensor tiles amongst one or more of the processing devices such that the fourth tensor tiles are distributed amongst the processing devices in a same manner as the second tensor tiles are distributed among the processing devices.

Figure 5:
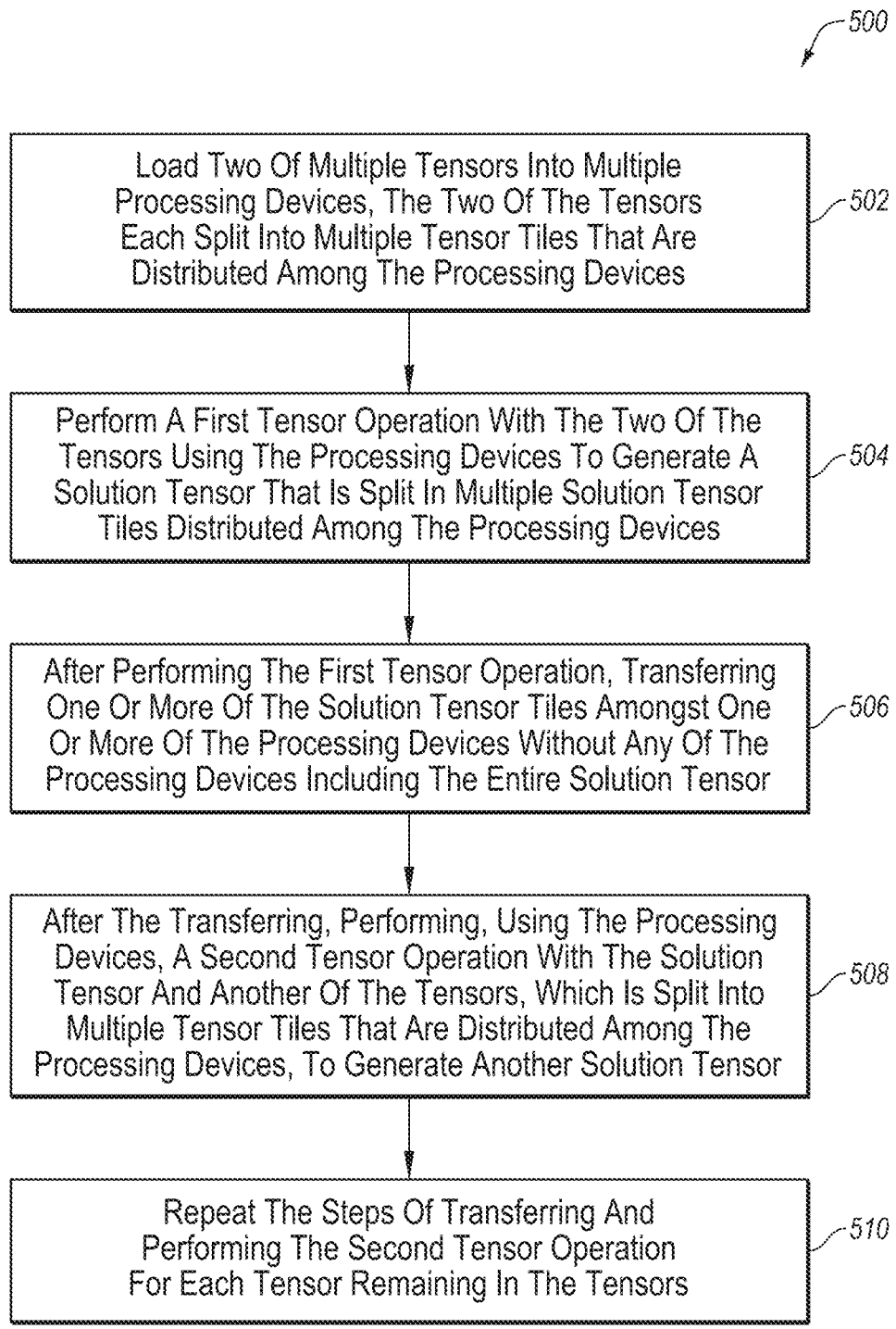
FIG. 5 illustrate a flowchart of another example method to perform tensor operations.

FIG. 5 illustrates a flowchart of an example method 500 to perform matrix operations. The method 500 may be arranged in accordance with at least one embodiment described in the present disclosure. One or more operations of the method 500 may be performed, in some embodiments, by a device or system, such as the tensor parallel group 100 of FIG. 1 or another device or combination of devices. In these and other embodiments, the method 500 may be performed based on the execution of instructions stored on one or more non-transitory computer-readable media. Although illustrated as discrete blocks, various blocks may be split into additional blocks, combined into fewer blocks, or eliminated, depending on the desired implementation.

The method 500 may begin at block 502, where two of multiple tensors may be loaded into multiple processing devices. In these and other embodiments, the two of the tensors may each be split into multiple tensor tiles that are distributed among the processing devices.

At block 504, a first tensor operation may be performed with the two of the tensors using the processing devices to generate a solution tensor that is split in multiple solution tensor tiles distributed among the processing devices.

At block 506, after performing the first tensor operation, one or more of the solution tensor tiles may be transferred amongst one or more of the processing devices without any of the processing devices including the entire solution tensor. In some embodiments, transferring the one or more of the solution tensor tiles amongst the one or more of the processing devices occurs via a first process for a first portion of the tensors and via a second process for a second portion of the tensors. In these and other embodiments, the second process may be different from the first process.

In these and other embodiments, the first process of transferring tiles for the first portion of the tensors may be used during odd numbered iterations of the second tensor operation and the second process of transferring tiles for the second portion of the tensors may be used during even numbered iterations of the second tensor operation. Alternately or additionally, during the first process each of the tensor tiles is included in two or more of the processing devices and during the second process each of the tensor tiles are distributed among the processing devices such that each of the processing devices includes a different sub-set of the tensor tiles and no duplication of the tensor tiles exists among the processing devices.

At block 508, after the transferring, a second tensor operation with the solution tensor and another of the tensors may be performed using the processing devices to generate another solution tensor. In these and other embodiments, the other tensor may be split into multiple tensor tiles that are distributed among the processing devices.

At block 510, the steps of transferring and performing the second tensor operation may be repeated for each remaining tensor. In some embodiments, for odd numbered iterations of the second tensor operation the other of the tensors may be split into the tensor tiles that are distributed among the processing devices in a first manner and for even numbered iterations of the second tensor operation the other of the tensors may be split into the tensor tiles that are distributed among the processing devices in a second manner that is different than the first manner.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the method 500 may further include selecting a word for output by the artificial intelligence model based on the multiple second result blocks.

FIG. 6 illustrates an example environment 600 for performing tensor operations. The environment 600 may be arranged in accordance with at least one embodiment described in the present disclosure. The environment 600 may include a processing system 610 that includes a first tensor parallel group 620a, a second tensor parallel group 620b, referred to collectively as the tensor parallel groups 620, and memory 630. The environment 600 may further include a host 602.

In some embodiments, the processing system 610 may be configured as a special purpose system configured to perform tensor operations. The host 602 may be configured to provide data to and/or provide instructions to the processing system 610. In these and other embodiments, the host 602 may be configured as an interface for the processing system 610. For example, the host 602 may be configured to interface with other systems, such as handling communications, requests, and computations that have small resource requirements. The host 602 may request the processing system 610 to perform operations with more intense resource requirements. For example, the host 602 may execute operations that offloads computation tasks to the processing system 610 and receives the results from the processing system 610 after execution of the tasks.

In some embodiments, the host 602 may include any configuration of one or more systems or hardware, such as processors, servers, and data storages, which are networked together and configured to perform one or more tasks. In these and other embodiments, the host 602 may be deployed in a cloud computing center and networked with the processing system 610 over a network. Alternately or additionally, the processing system 610 and the host 602 may be disposed in the same form factor or at the same physical location.

In some embodiments, the processing system 610 may be an accelerator such as a machine learning (ML)/AI accelerator, crypto-accelerator, digital signal processing accelerator, among other types of accelerators. The processing system 610 may be used to accelerate any function that uses the tensor parallel groups 620 to perform computations. In some embodiments, the tensor parallel groups 620 may be on a same piece of silicon or in a same package or the tensor parallel groups 620 may be separate and networked together to form the processing system 610.

In some embodiments, each of the tensor parallel groups 620 in the processing system 610 may include multiple processing devices. For example, each of the tensor parallel groups 620 may be examples of the tensor parallel group 100 of FIG. 1. Each of the processing devices of the tensor parallel groups 620 may be on same piece of silicon or in a same package or the processing devices may be separate and networked together to form a tensor parallel group.

In some embodiments, each of the tensor parallel groups 620 may include one or more systolic array formed by the processing devices in the tensor parallel groups 620. In these and other embodiments, each of the tensor parallel groups 620 may perform operations using tensor parallelism. The two tensor parallel groups 620 may be used to perform pipeline parallelism. In pipeline parallelism, a task may be divided into sub-tasks and each pipeline may perform one of the sub-tasks in parallel with the other pipelines. In these and other embodiments, the pipelines may or may not need results from another of the pipeline to complete the results.

As such, tensor parallelism may be performed by the first tensor parallel group 620a in a pipeline parallelism with tensor parallelism performed by the second tensor parallel group 620b. For example, a large tensor may be divided into two and split between each of the tensor parallel groups 620. Each of the tensor parallel groups 620 may perform operations as described in this disclosure based on the tensor operations performing multiple operations on data at once. The results from the tensor parallel groups 620 may be combined. Alternately or additionally, each of the tensor parallel groups 620 may be given a tensor for tensor parallelism operations to be performed in overlapping time periods.

The memory 630 may be coupled to the tensor parallel groups 620. In some embodiments, the memory 630 may be formed from one or more memory packages or chips. In these and other embodiments, one or more of the memory packages may be coupled to each of the tensor parallel groups 620 and/or each processing device in each of the tensor parallel groups 620. The memory packages may be configured to provide tensors and other data to the tensor parallel groups 620 for processing. In these and other embodiments, the tensor parallel groups 620 may read from and/or write to the memory 630.

In some embodiments, a size of the tensor parallel groups 620 may be selected based on a size of tensor on which operations may be performed by one or more of the tensor parallel groups 620. For example, when the processing system 610 is configured for an AI model, the size of the tensor parallel groups 620 may have a size that is based on the depth of the AI model. Alternately or additionally, when the processing system 610 is configured for an AI model, a size of each of the tensor parallel groups 620 may be dependent on the size of each tensor operation performed in the AI model. In these and other embodiments, a number of tensor parallel groups and/or a degree of pipeline parallelism may be based on the depth of the model. As a result, the tensor parallel groups 620 may perform operations with respect to the row vectors and the weight tensors associated with the AI model.

Alternately or additionally, the size of the tensor parallel groups 620 may be based on the largest computation that may be performed by the AI model. For example, the size of the tensor parallel groups 620 may be based on the computations performed by the feedforward operations performed by a MLP layer of an AI model. As another example, the size of the tensor parallel groups 620 may be selected to be a sub-multiple of the size of the tensor on which operations may be performed. For example, if a tensor has a dimension of 12288, which is $3*2^{12}$, any size such as 36 or 768 or any sub-multiple of 12288 may be used. Using a sub-multiple may result in reduce quantization efficiency loss of the tensor parallel groups 620.

Modifications, additions, or omissions may be made to the environment 600 without departing from the scope of the present disclosure. For example, in some embodiments, the environment 600 may include more or fewer tensor parallel groups than the tensor parallel groups 620 illustrated. For example, the example environment 600 may include three, four, five, or six tensor parallel groups.

Tensor Parallel Group Topology

As discussed above, tensor operations may be performed using any type of processing system. A tensor parallel group may include multiple processing devices. One or more of the processing devices may be coupled together to distribution tensors, tiles, or other data therebetween. For example, as discussed above, during tensor operations data may be shared between the processing devices. The concepts discussed with respect to FIGS. 1-6 may be used with any connection between the processing devices. For example, the processing devices may be connected using a fixed topology or a data switch. A fixed topology is illustrated using both FIGS. 7A and 7B. In these and other embodiments, FIGS. 7A and 7B each are subgraphs of a fixed topology that may be used to connect eight processing devices A0-A7 of a tensor parallel group 700. Thus, the fixed topology connecting the processing devices A0-A7 may include all the connections of FIGS. 7A and 7B. The fixed topology is divided into the subgraphs illustrated in FIGS. 7A and 7B for ease of illustration and explanation.

In some embodiments, the fixed topology as illustrated in FIGS. 7A and 7B and described in this disclosure may be used to reduce data sharing between the processing devices A0-A7 and thereby help to reduce a processing time for the tensor operations performed by a tensor parallel group 700.

FIGS. 7A and 7B together illustrates all connections between the processing devices A0-A7 of the tensor parallel group 700. The processing devices A0-A7 may be examples of the processing devices of FIG. 1. For example, each of the processing devices A0-A7 may include a systolic array and the tensor parallel group 700 may form a large systolic array from the individual systolic arrays of the processing devices A0-A7.

In some embodiments, the processing devices A0-A7 may be divided into a first set of processing devices 710a and a second set of processing devices 710b, referred to collectively as the sets of processing devices 710. In some embodiments, each of the sets of processing devices 710 may include two or more of the processing devices A0-A7 of the tensor parallel group 700. In these and other embodiments, the processing devices A0-A7 may be divided such that when there are an equal number of the processing devices A0-A7, the processing devices A0-A7 are divided equally between the sets of processing devices 710. As a result, each of the sets of processing devices 710 may include an equal number of processing devices. For example, as illustrated in FIGS. 7A and 7B, there are eight processing devices A0-A7. Half of the processing devices A0-A7 are in the first set of processing devices 710a, namely processing devices A1, A3, A5, and A7 and the other half of the processing devices A0-A7 are in the second set of processing devices 710b, namely processing devices A0, A2, A4, and A6. As such, there may be no intersection of processing devices A0-A7 between the first set of processing devices 710a and the second set of processing devices 710b. In these and other embodiments, the number of the processing devices A0-A7 may be a multiple of two.

Alternately or additionally, when there is an odd number of the processing devices, the processing devices may be divided such that one group has one more processing device than another group. For example, for seven processing devices, one set of processing devices may include three devices and the other set may include four devices.

In some embodiments, the sets of processing devices 710 may be configured such that no processing device in one of the sets of processing devices 710 is directly communicatively coupled with another one of the processing devices in the one of the sets of processing devices 710. For example, none of the processing devices in the first set of processing devices 710a are directly communicatively coupled with another of the processing devices in the first set of processing devices 710a. As a result, there are no direct communication channels between the processing devices in the first set of processing devices 710a and no direct communication channels between the processing devices in the second set of processing devices 710b. A direct communication channel may be a communication channel that directly links two of the processing devices A0-A7 without another one of the processing devices A0-A7 therebetween.

In some embodiments, each of the processing devices in one of the sets of processing devices 710 may be directly communicatively coupled to each of the processing devices in the other of the sets of processing devices 710 via at least one direct communication channel. For example, each processing device in the first set of processing devices 710a may be directly connected to each of the processing devices in the second set of processing devices 710b via a different communication channel. As a result, when there are an even number of processing devices in the tensor parallel group 700, each of the processing devices A0-A7 may be coupled to a same number of processing devices. For example, each of the processing devices A0-A7 may be coupled to four other of the processing devices A0-A7. As a result, each of the processing devices A0-A7 may be coupled to a same number of communication channels.

In some embodiments, the processing devices A0-A7 may be configured and communicatively coupled such that each processing device in one of the sets of processing devices 710 may communicate with another one of the processing devices in the one of the sets of processing devices 710 via one processing device in the other set of the sets of processing devices 710. For example, for the processing device A0 to communicate with the processing device A2 to which the processing device A0 is directly communicatively coupled, the communication passes through one of the processing devices of the first set of processing devices 710a. Thus, each of the processing devices A0-A7 may communicate with each of the other processing devices A0-A7 using at most two communication hops via a first communication channel with a first processing device and a separate communication channel between the first processing device and a second processing device. For example, the processing devices A0-A7 in the first set of processing devices 710a may communicate with each of the processing devices A0-A7 in the second set of processing devices 710b via a single connection or communication hop. The processing devices A0-A7 in the first set of processing devices 710a may communicate with the processing devices A0-A7 in the first set of processing devices 710a via a processing device in the second set of processing devices 710b and two communication channels. Not having every one of the processing devices A0-A7 communicate with each of the other processing devices A0-A7 with a direct communication channel may reduce a number of connections between the processing devices A0-A7 as compared to a point-to-point connection scheme where every processing device is coupled to every other processing device.

In some embodiments, each of the communication channels between the processing devices A0-A7 may be a bi-directional communication channel. As a result, each of the processing devices A0-A7 may receive and send data over the communication channels coupled thereto. In some embodiments, each of the processing devices A0-A7 may be configured to simultaneously transmit data and receive data over different communication channels. For example, the first processing device A0 may receive first data over a first communication channel and transmit second data over a second communication channel simultaneously.

In some embodiments, the communication channels may be of the same data bandwidth. Alternately or additionally, each of the communication channels may have different data bandwidths or some may have the same data bandwidths and others may have different data bandwidths. For example, the different data bandwidths may result from the communication channels have lanes with different speeds and/or a different number of lanes.

In some embodiments, each of the processing devices A0-A7 may be formed on a separate die of a silicon process. Alternately or additionally, the processing devices A0-A7 may be formed on the same die of a silicon process. In these and other embodiments, each of the processing devices A0-A7 may be coupled to one or more memory devices. For example, each of the processing devices A0-A7 may be coupled to one or more memory devices that are shared or are not shared among the processing devices A0-A7.

In some embodiments, the communication channels between the processing devices A0-A7 may be wired communication channels such as a peripheral component interconnect express (PCIe), a serial peripheral interface (SPI), ethernet, universal chiplet interconnect express channels (UCIe), or some other wired communication channel and/or optical channel. Alternately or additionally, the communication channels may be wireless or network communication channels. Alternately or additionally, the communication channels between the processing devices A0-A7 may be formed in silicon when the processing devices A0-A7 are formed as part of the same die of silicon.

FIGS. 7A and 7B further illustrates that the processing devices A0-A7 may be divided into groups of processing devices. For example, the processing devices A0-A7 may be divided into a first group of processing devices 712a, a second group of processing devices 712b, a third group of processing devices 712c, and a fourth group of processing devices 712d, referred to collectively as the groups of processing devices 712.

In some embodiments, each set of processing devices 710 may include two or more of the groups of processing devices 712. For example, the first group of processing devices 712a and the second group of processing devices 712b may be formed from the first set of processing devices 710a and the third group of processing devices 712c and the third group of processing devices 712d may be formed from the second set of processing devices 710b.

In some embodiments, each of the groups of processing devices 712 may include an equal number of the processing devices A0-A7. For example, the first group of processing devices 712a may include the processing devices A1 and A3, the second group of processing devices 712b may include the processing devices A5 and A7, the third group of processing devices 712c may include the processing devices A0 and A2, and the fourth group of processing devices 712d may include the processing devices A4 and A6.

FIG. 7A further illustrates first communication channels 730. As illustrated in FIG. 7A, each of the processing devices of the first group of processing devices 712a may be directly communicatively coupled with each of the processing devices of the third group of processing devices 712c via the first communication channels 730 and each of the processing devices of the second group of processing devices 712b may be directly communicatively coupled with each of the processing devices of the fourth group of processing devices 712d via the first communication channels 730.

FIG. 7B further illustrates second communication channels 740. As illustrated in FIG. 7B, each of the processing devices of the first group of processing devices 712a may be directly communicatively coupled with each of the processing devices of the fourth group of processing devices 712d via the second communication channels 740 and each of the processing devices of the second group of processing devices 712b may be directly communicatively coupled with each of the processing devices of the third group of processing devices 712c via the second communication channels 740.

In some embodiments, the first communication channels 730 may be used by the processing devices A0-A7 to distribute data of a first operation. During this first operation, data may only be transmitted between the processing devices A0-A7 using the first communication channels 730. In these and other embodiments, the second communication channels 740 may be used by the processing devices A0-A7 to distribute data of a second operation. During the second operation, data may only be transmitted between the processing devices A0-A7 using the second communication channels 740 and not the first communication channels 730. In some embodiments, the first operation and the second operation may be sub-operations of an operation being performed by the tensor parallel group 700. For example, the tensor parallel group 700 may be performing a tensor multiplication. In these and other embodiments, the first operation may be a data gather operation and the second operation may be a data reduction operation. As a result, when the tensor parallel group 700 performs a tensor multiplication, data for a data combination operation, such as a data reduction or gather operation, may only be transmitted between the processing devices A0-A7 using the first communication channels 730 and data for a data reduction operation may only be transmitted between the processing devices A0-A7 using the second communication channels 740.

In some embodiments, the configuration of the first communication channels 730 between the groups of the processing device 712 is such that when a first processing device receives data during an operation specific to the first communication channels 730 from a second processing device, if the data is to be retransmitted to another processing device, the data is always retransmitted over the same communication channel. As a result, the first communication channels 730 may be such that received data if retransmitted to another processing device may always be transmitted to the same processing device. For example, if the processing device A0 obtains data from the processing device A3 during the first process and the data is to be transmitted during the first process, the data may only be transmitted to the processing device A1. In these and other embodiments, the configuration of the second communication channels 740 between the groups of the processing device 712 may be similar to the configuration of the first communication channels 730 between the groups of the processing device 712.

In some embodiments, the processing devices A0-A7 may be configured to receive and/or transmit data over the first communication channels 730 and receive and/or transmit data over the second communication channels 740. Thus, in the event that the first and second operations are being performed during overlapping time periods, the processing devices A0-A7 may receive and/or transmit data for both operations during overlapping time periods.

In some embodiments, the processing devices A0-A7 may also be configured to transmit a portion of data to be received before all data is received. For example, the first processing device A0 may be transmitting data to the third processing device A2 via the second processing device A1. In these and other embodiments, the second processing device A1 may begin receiving data from the first processing device A0. The second processing device A1 may send the received data to the third processing device A2 before all the data from the first processing device A0 is received.

As noted previously, the fixed topology described in this disclosure may be used to reduce data sharing between the processing devices A0-A7 and thereby help to reduce a processing time for the tensor operations performed by a tensor parallel group 700. In some embodiments, the tensor parallel group 700 may be configured to perform the tensor operations described with respect to FIGS. 3-5. In these and other embodiments, the tensors on which the tensor operations are to be performed may be divided amongst the processing devices A0-A7 to perform the operations.

Figure 8:
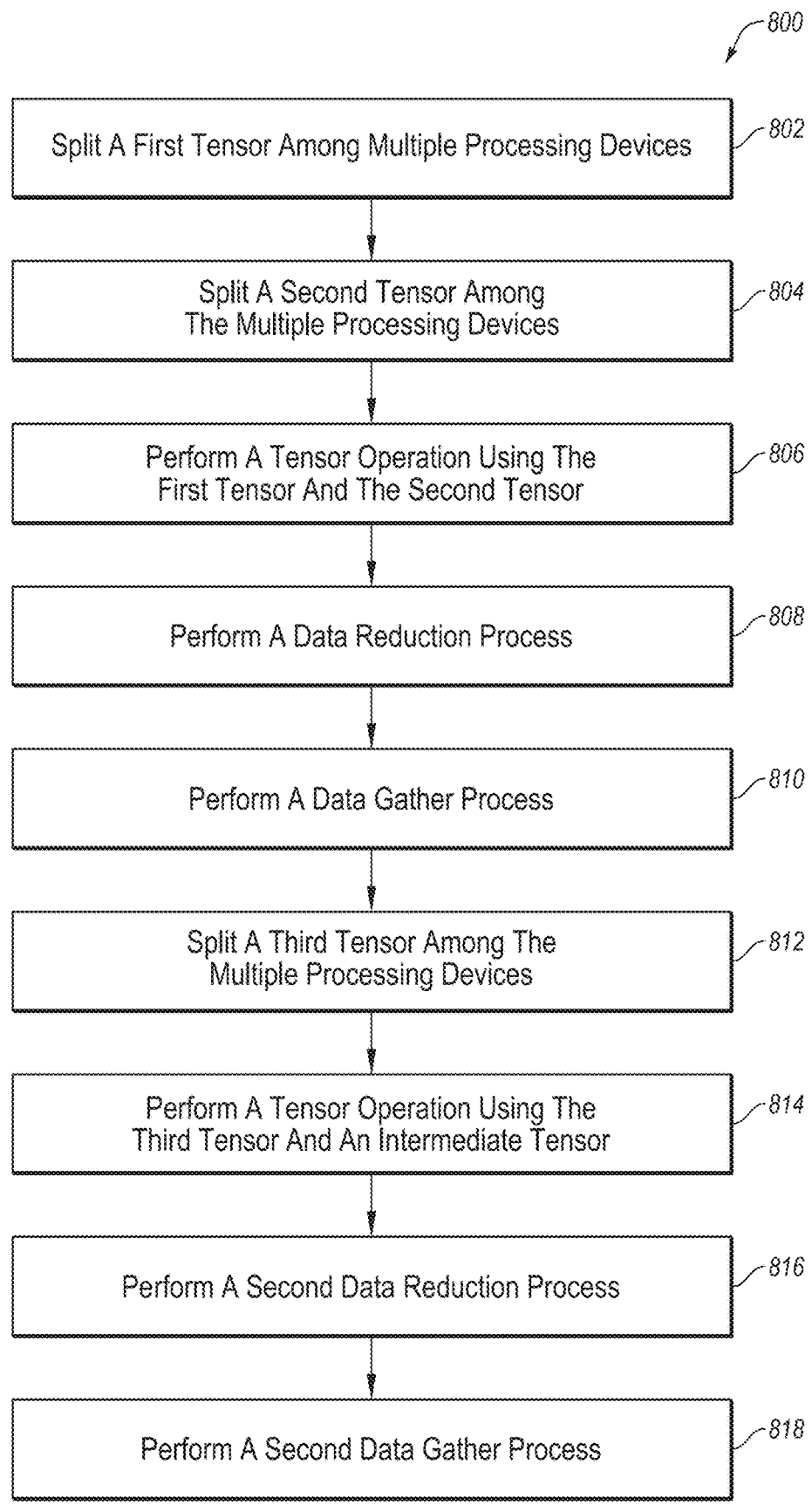
FIG. 8 illustrates an example method of tensor operations performed using the topology of the tensor parallel group of FIGS. 7A and 7B.

FIG. 8 illustrates an example method 800 of tensor operations performed using the topology of the tensor parallel group 700 and illustrates how the tensors may be divided amongst the processing device A0-A7. In some embodiments, the method 800 may be arranged in accordance with at least one embodiment described in the present disclosure. One or more operations of the method 800 may be performed, in some embodiments, by a device or system, such as the tensor parallel group 700 or another device or combination of devices. Although illustrated as discrete blocks, various blocks may be split into additional blocks, combined into fewer blocks, or eliminated, depending on the desired implementation. In some embodiments, the tensor operations of the method 800 may be tensor operations to compute $X \times U \times V$.

The method 800 may begin at block 802, where a first tensor may be split among multiple processing devices. For example, the first tensor may be X The first tensor may have a shape (b×d) and may be split into a first tile X0 and a second tile X1, each with the shape (b×d/2). As a result, the first tile X0 may include all the rows and a first half of the columns, and the second tile X1 may include all of the rows and a second half of the columns. Each tile of the first tensor X may be provided to half of the processing devices A0-A7.

For example, as illustrated below, the first box below may represent the first tile X0 and illustrates the first tile X0 being on processing devices A0, A1, A2, A3 and the second box below may represent the second tile X1 and illustrates the second tile X1 being on the processing devices A4, A5, A6, A7.

| A0, A1, A2, A3 | A4, A5, A6, A7 |
|---|---|

At block 804, a second tensor may be split among the multiple processing devices. For example, the second tensor may be U. The second tensor may be equally split and each of the processing devices A0-A7 may obtain an equal number of the tensor tiles of the second tensor. As an example, the second tensor may have a shape (d×4d) and may be split into 32 tensor tiles each with a shape (d/2×4d/16). As a result, each tile of the second tensor may include $\frac{1}{16}^{th}$ of the columns of the second tensor U and each of the tiles of the second tensor includes half of the rows. Each of the processing devices A0-A7 may obtain four of the tensor tiles of the second tensor. For example, the tiles of the second tensor may be organized in a shape of a matrix with dimensions (2×16) as illustrated below and be numbered U(0,0) to U(1,15), with the first row numbering U(0,0) to U(0,15) and the second row numbering U(1,0) to U(1,15). The tiles of the second tensor may be distributed to the processing device indicated below. For example, the tile U(0,0) may be found in processing device A0 and the tile U(1,4) may be found in processing device A4. As illustrated, the processing devices A0-A3 may include the tensor tiles U(0,0) to U(0,15) from the top half of the second tensor and the processing devices A4-A7 may include the tensor tiles U(1,0) to U(1,15) from the bottom half of the second tensor.

| A0 | A0 | A0 | A0 | A1 | A1 | A1 | A1 | A2 | A2 | A2 | A2 | A3 | A3 | A3 | A3 |
|---|---|---|---|---|---|---|---|---|---|---|---|---|---|---|---|
| A5 | A5 | A7 | A7 | A4 | A4 | A6 | A6 | A5 | A5 | A7 | A7 | A4 | A4 | A6 | A6 |

At block 806, each of the processing devices A0-A7 may perform a multiplication operation of the elements of the first tensor X with the elements of the second tensor U based on the tensor tiles that each of the processing devices A0-A7 includes. As a result, 32 multiplication operation results may occur, one for each tile of the second tensor U and each of the processing devices A0-A7 may include four multiplication operation results as indicated below, where the multiplication operation results are illustrated by concatenating a tile of the first tensor X and a tile of the second tensor U. For example, the multiplication operation results of the first tile $X_0$ and tile $U_{0\ 0}$ that are both in the processing device A0 may be illustrated as $X_0U_{0\ 0}$. The multiplication operation results of a tile of the first tensor X and a tile of the second tensor U may form a tile that may be labeled as the multiplication operation results.

A0: $X_0U_{0\ 0}$, $X_0U_{0\ 1}$, $X_0U_{0\ 2}$, $X_0U_{0\ 3}$
A1: $X_0U_{0\ 4}$, $X_0U_{0\ 5}$, $X_0U_{0\ 6}$, $X_0U_{0\ 7}$
A2: $X_0U_{0\ 8}$, $X_0U_{0\ 9}$, $X_0U_{0\ 10}$, $X_0U_{0\ 11}$
A3: $X_0U_{0\ 12}$, $X_0U_{0\ 13}$, $X_0U_{0\ 14}$, $X_0U_{0\ 15}$
A4: $X_1U_{1\ 4}$, $X_1U_{1\ 5}$, $X_1U_{1\ 12}$, $X_1U_{1\ 13}$
A5: $X_1U_{1\ 0}$, $X_1U_{1\ 1}$, $X_1U_{1\ 8}$, $X_1U_{1\ 9}$
A6: $X_1U_{1\ 6}$, $X_1U_{1\ 7}$, $X_1U_{1\ 14}$, $X_1U_{1\ 15}$
A7: $X_1U_{1\ 2}$, $X_1U_{1\ 3}$, $X_1U_{1\ 10}$, $X_1U_{1\ 11}$

At block 808, a data reduction process may be performed. The data reduction process may be performed to obtain the elements of an intermediate tensor. During the data reduction process, the processing devices A0-A7 may share data therebetween using the second communication channels 740 and sum the data to obtain the intermediate tensor from the multiplication operation results. In these and other embodiments, the tile $X_iU_{ij}$ may be added with the tile $X_{1-i}U_{1-i\ j}$. Note that all tile pairs that are to be added together are split between connected ones of the processing devices A0-A7. To perform the data reduction process, each of the processing devices A0-A7 performs two summations of two tiles. To perform the summations, each of the processing devices A0-A7 may send two tiles with multiplication operation results to another one of the processing devices A0-A7 and may receive two tile with dot-product results. Each of the processing devices A0-A7 may sum the received tiles with the tiles the processing devices A0-A7 maintained. For example, the processing device A0 may sends $X_0U_{0\ 1}$ to the processing device A5 and may send $X_0U_{0\ 3}$ to the processing device A7. The processing device A0 may also receive $X_1U_{1\ 0}$ and $X_1U_{1\ 2}$ and may sum $X_1U_{1\ 0}$ and $X_1U_{1\ 2}$ to $X_0U_{0\ 0}$ and $X_0U_{0\ 2}$ that the processing device A0 calculated. Each tile of the intermediate tensor may be denoted as $XU_i$ as follows:

A0: $X_0U_{0\ 0}+X_1U_{1\ 0}=XU_0$, $X_0U_{0\ 2}+X_1U_{1\ 2}=XU_2$
A1: $X_0U_{0\ 4}+X_1U_{1\ 4}=XU_4$, $X_0U_{0\ 6}+X_1U_{1\ 6}=XU_6$
A2: $X_0U_{0\ 8}+X_1U_{1\ 8}=XU_8$, $X_0U_{0\ 10}+X_1U_{1\ 10}=XU_{10}$
A3: $X_0U_{0\ 12}+X_1U_{1\ 12}=XU_{12}$, $X_0U_{0\ 14}+X_1U_{1\ 14}=XU_{14}$
A4: $X_1U_{1\ 5}+X_0U_{0\ 5}=XU_5$, $X_1U_{1\ 13}+X_0U_{0\ 13}=XU_{13}$
A5: $X_1U_{1\ 1}+X_0U_{0\ 1}=XU_1$, $X_1U_{1\ 9}+X_0U_{0\ 9}=XU_9$
A6: $X_1U_{1\ 7}+X_0U_{0\ 7}=XU_7$, $X_1U_{1\ 15}+X_0U_{0\ 15}=XU_{15}$
A7: $X_1U_{1\ 3}+X_0U_{0\ 3}=XU_3$, $X_1U_{1\ 11}+X_0U_{0\ 11}=XU_{11}$

As a result, each of the processing devices A0-A7 now includes two unique tiles of the intermediate tensor. Note that the dot-product results may have the same number of elements and each of the second communication channels 740 may be used twice, once in every direction. As a result, the same amount of data may be shared by each of the processing devices A0-A7 and a same amount of data may be shared across each of the second communication channels 740. Note that had the first and second tensors been split in unequal tiles, different amounts of data may be shared between the processing devices A0-A7 and on each of the second communication channels 740.

At block 810, a data gather process may be performed. During the data gather process, the processing devices A0-A7 may share data therebetween using the first communication channels 730. For example, each of the processing devices A0-A7 may direct the two tiles of the intermediate tensor to two different ones of the processing devices A0-A7 while also maintaining the two tiles of the intermediate tensor that the processing devices A0-A7 calculated. For example, the processing device A0 may send $XU_2$ to the processing device A1 and send $XU_0$ to the processing device A3. As a result, each of the processing devices A0-A7 may include the following tiles of the intermediate tensor:

A0: $XU_{14}$, $XU_0$, $XU_2$, $XU_4$
A1: $XU_2$, $XU_4$, $XU_6$, $XU_8$
A2: $XU_6$, $XU_8$, $XU_{10}$, $XU_{12}$
A3: $XU_{10}$, $XU_{12}$, $XU_{14}$, $XU_0$
A4: $XU_{11}$, $XU_5$, $XU_{13}$, $XU_1$
A5: $XU_{13}$, $XU_1$, $XU_9$, $XU_7$
A6: $XU_9$, $XU_7$, $XU_{15}$, $XU_3$
A7: $XU_{15}$, $XU_3$, $XU_{11}$, $XU_5$

Note that the tiles of the intermediate tensor may have the same number of elements and each of the first communication channels 730 may be used twice, once in every direction. As a result, the same amount of data may be shared by each of the processing devices A0-A7 and a same amount of data may be shared across each of the first communication channels 730. Note that had the first and second tensors been split in unequal tiles, different amounts of data may be shared between the processing devices A0-A7 and on each of the first communication channels 730.

In some embodiments, the intermediate tensor may be concatenated and relabeled as follows:

$Y_0$=concatenation of $XU_2$ and $XU_4$
$Y_1$=concatenation of $XU_6$ and $XU_8$
$Y_2$=concatenation of $XU_{10}$ and $XU_{12}$
$Y_3$=concatenation of $XU_{14}$ and $XU_0$
$Y_4$=concatenation of $XU_{13}$ and $XU_1$
$Y_5$=concatenation of $XU_9$ and $XU_7$.
$Y_6$=concatenation of $XU_{15}$ and $XU_3$
$Y_7$=concatenation of $XU_{11}$ and $XU_5$ Each Y tile of the intermediate tensor may have the shape of bxd/2 and may be found in the processing devices A0-A7 as follows where the first block is $Y_0$, the second block is $Y_1$, etc.

| A0, A1 | A1, A2 | A2, A3 | A3, A0 | A4, A5 | A5, A6 | A6, A7 | A7, A4 |
|---|---|---|---|---|---|---|---|

At block 812, a third tensor may be split among the multiple processing devices. For example, the third tensor may be V. The third tensor may be equally split and each of the processing devices A0-A7 may obtain an equal number of the tensor tiles of the third tensor. As an example, the third tensor may have a shape (4dxd) and may be split into 128 tiles each with the shape (4d/16xd/8). Each of the processing devices A0-A7 may obtain 16 of the tiles of the third tensor V. In some embodiments, the tiles may be split such that from the perspective of a single column of the third tensor V, the third tensor V may be split into only four tiles.

For example, the tiles of the third tensor may be organized in a shape of a matrix with dimensions (8x16) as illustrated below and be numbered V(0,0) to V(7,15), with the first row numbering V(0,0) to V(0,15) and the last row numbering V(7,0) to V(7,15). The tiles of the third tensor may be distributed to the processing devices A0-A7 indicated below. For example, the tile V(0,0) may be found in the processing device A0 and the tile V(4,4) may be found in the processing device A5.

| A0 | A0 | A0 | A0 | A0 | A0 | A0 | A0 | A1 | A1 | A1 | A1 | A1 | A1 | A1 | A1 |
|---|---|---|---|---|---|---|---|---|---|---|---|---|---|---|---|
| A2 | A2 | A2 | A2 | A2 | A2 | A2 | A2 | A1 | A1 | A1 | A1 | A1 | A1 | A1 | A1 |
| A2 | A2 | A2 | A2 | A2 | A2 | A2 | A2 | A3 | A3 | A3 | A3 | A3 | A3 | A3 | A3 |
| A0 | A0 | A0 | A0 | A0 | A0 | A0 | A0 | A3 | A3 | A3 | A3 | A3 | A3 | A3 | A3 |
| A5 | A5 | A5 | A5 | A5 | A5 | A5 | A5 | A4 | A4 | A4 | A4 | A4 | A4 | A4 | A4 |
| A5 | A5 | A5 | A5 | A5 | A5 | A5 | A5 | A6 | A6 | A6 | A6 | A6 | A6 | A6 | A6 |
| A7 | A7 | A7 | A7 | A7 | A7 | A7 | A7 | A6 | A6 | A6 | A6 | A6 | A6 | A6 | A6 |
| A7 | A7 | A7 | A7 | A7 | A7 | A7 | A7 | A4 | A4 | A4 | A4 | A4 | A4 | A4 | A4 |

At block 814, each of the processing devices A0-A7 may perform a multiplication operation of the elements of the intermediate tensor Y with the elements of the third tensor V based on the tensor tiles that each of the processing devices A0-A7 includes. As a result, 128 multiplication operation results may occur, one for each tile of the third tensor V and each of the processing devices A0-A7 may include sixteen multiplication operation results as indicated below, where the multiplication operation results are illustrated by concatenating a tile of the intermediate tensor Y and a tile of the third tensor V. For example, the multiplication operation result of the tile $Y_0$ and tile $V_{0\ 0}$ that are both in the processing device A0 may be illustrated as $Y_0V_{0\ 0}$. The multiplication operation result of a tile of the intermediate tensor Y and a tile of the third tensor V may form a tile that may be labeled as the multiplication operation result.

A0: $Y_0V_{0\ 0}$, $Y_3V_{3\ 0}$, $Y_0V_{0\ 1}$, $Y_3V_{3\ 1}$, $Y_0V_{0\ 2}$, $Y_3V_{3\ 2}$, $Y_0V_{0\ 3}$, $Y_3V_{3\ 3}$, $Y_0V_{0\ 4}$, $Y_3V_{3\ 4}$, $Y_0V_{0\ 5}$, $Y_3V_{3\ 5}$, $Y_0V_{0\ 6}$, $Y_3V_{3\ 6}$, $Y_0V_{0\ 7}$, $Y_3V_{3\ 7}$

A1: $Y_0V_{0\ 8}$, $Y_1V_{1\ 8}$, $Y_0V_{0\ 9}$, $Y_1V_{1\ 9}$, $Y_0V_{0\ 10}$, $Y_1V_{1\ 10}$, $Y_0V_{0\ 11}$, $Y_1V_{1\ 11}$, $Y_0V_{0\ 12}$, $Y_1V_{1\ 12}$, $Y_0V_{0\ 13}$, $Y_1V_{1\ 13}$, $Y_0V_{0\ 14}$, $Y_1V_{1\ 14}$, $Y_0V_{0\ 15}$, $Y_1V_{1\ 15}$

A2: $Y_1V_{1\ 0}$, $Y_2V_{2\ 0}$, $Y_1V_{1\ 1}$, $Y_2V_{2\ 1}$, $Y_1V_{1\ 2}$, $Y_2V_{2\ 2}$, $Y_1V_{1\ 3}$, $Y_2V_{2\ 3}$, $Y_1V_{1\ 4}$, $Y_2V_{2\ 4}$, $Y_1V_{1\ 5}$, $Y_2V_{2\ 5}$, $Y_1V_{1\ 6}$, $Y_2V_{2\ 6}$, $Y_1V_{1\ 7}$, $Y_2V_{2\ 7}$

A3: $Y_2V_{2\ 8}$, $Y_3V_{3\ 8}$, $Y_2V_{2\ 9}$, $Y_3V_{3\ 9}$, $Y_2V_{2\ 10}$, $Y_3V_{3\ 10}$, $Y_2V_{2\ 11}$, $Y_3V_{3\ 11}$, $Y_2V_{2\ 12}$, $Y_3V_{3\ 12}$, $Y_2V_{2\ 13}$, $Y_3V_{3\ 13}$, $Y_2V_{2\ 14}$, $Y_3V_{3\ 14}$, $Y_2V_{2\ 15}$, $Y_3V_{3\ 15}$

A4: $Y_4V_{4\ 8}$, $Y_7V_{7\ 8}$, $Y_4V_{4\ 9}$, $Y_7V_{7\ 9}$, $Y_4V_{4\ 10}$, $Y_7V_{7\ 10}$, $Y_4V_{4\ 11}$, $Y_7V_{7\ 11}$, $Y_4V_{4\ 12}$, $Y_7V_{7\ 12}$, $Y_4V_{4\ 13}$, $Y_7V_{7\ 13}$, $Y_4V_{4\ 14}$, $Y_7V_{7\ 14}$, $Y_4V_{4\ 15}$, $Y_7V_{7\ 15}$

A5: $Y_4V_{4\ 0}$, $Y_5V_{5\ 0}$, $Y_4V_{4\ 1}$, $Y_5V_{5\ 1}$, $Y_4V_{4\ 2}$, $Y_5V_{5\ 2}$, $Y_4V_{4\ 3}$, $Y_5V_{5\ 3}$, $Y_4V_{4\ 4}$, $Y_5V_{5\ 4}$, $Y_4V_{4\ 5}$, $Y_5V_{5\ 5}$, $Y_4V_{4\ 6}$, $Y_5V_{5\ 6}$, $Y_4V_{4\ 7}$, $Y_5V_{5\ 7}$

A6: $Y_5V_{5\ 8}$, $Y_6V_{6\ 8}$, $Y_5V_{5\ 9}$, $Y_6V_{6\ 9}$, $Y_5V_{5\ 10}$, $Y_6V_{6\ 10}$, $Y_5V_{5\ 11}$, $Y_6V_{6\ 11}$, $Y_5V_{5\ 12}$, $Y_6V_{6\ 12}$, $Y_5V_{5\ 13}$, $Y_6V_{6\ 13}$, $Y_5V_{5\ 14}$, $Y_6V_{6\ 14}$, $Y_5V_{5\ 15}$, $Y_6V_{6\ 15}$

A7: $Y_6V_{6\ 0}$, $Y_7V_{7\ 0}$, $Y_6V_{6\ 1}$, $Y_7V_{7\ 1}$, $Y_6V_{6\ 2}$, $Y_7V_{7\ 2}$, $Y_6V_{6\ 3}$, $Y_7V_{7\ 3}$, $Y_6V_{6\ 4}$, $Y_7V_{7\ 4}$, $Y_6V_{6\ 5}$, $Y_7V_{7\ 5}$, $Y_6V_{6\ 6}$, $Y_7V_{7\ 6}$, $Y_6V_{6\ 7}$, $Y_7V_{7\ 7}$

In some embodiments, the processing devices A0-A7 may include multiplication operation result tiles that may be combined together. The combination of the multiplication operation result tiles may be a summation. For example, the first processing devices A0 may include multiplication operation result tiles $Y_0V_{0\ 0}$ and $Y_3V_{3\ 0}$ which may be summed together. The summation that occurs in each of the processing devices A0-A7 without having to perform a data reduction process where multiplication operation result tiles are shared between the processing devices A0-A7 is illustrated below. Note that the summation may be implicit and performed by concatenating multiplicands together before performing a tensor multiplication.

A0: $Y_0V_{0\ 0}+Y_3V_{3\ 0}$, $Y_0V_{0\ 1}+Y_3V_{3\ 1}$, $Y_0V_{0\ 2}+Y_3V_{3\ 2}$, $Y_0V_{0\ 3}+Y_3V_{3\ 3}$, $Y_0V_{0\ 4}+Y_3V_{3\ 4}$, $Y_0V_{0\ 5}+Y_3V_{3\ 5}$, $Y_0V_{0\ 6}+Y_3V_{3\ 6}$, $Y_0V_{0\ 7}+Y_3V_{3\ 7}$

A1: $Y_0V_{0\ 8}+Y_1V_{1\ 8}$, $Y_0V_{0\ 9}+Y_1V_{1\ 9}$, $Y_0V_{0\ 10}+Y_1V_{1\ 10}$, $Y_0V_{0\ 11}+Y_1V_{1\ 11}$, $Y_0V_{0\ 12}+Y_1V_{1\ 12}$, $Y_0V_{0\ 13}+Y_1V_{1\ 13}$, $Y_0V_{0\ 14}+Y_1V_{1\ 14}$, $Y_0V_{0\ 15}+Y_1V_{1\ 15}$ A2: $Y_1V_{1\ 0}+Y_2V_{2\ 0}$, $Y_1V_{1\ 1}+Y_2V_{2\ 1}$, $Y_1V_{1\ 2}+Y_2V_{2\ 2}$, $Y_1V_{1\ 3}+Y_2V_{2\ 3}$, $Y_1V_{1\ 4}+Y_2V_{2\ 4}$, $Y_1V_{1\ 5}+Y_2V_{2\ 5}$, $Y_1V_{1\ 6}+Y_2V_{2\ 6}$, $Y_1V_{1\ 7}+Y_2V_{2\ 7}$

A3: $Y_2V_{2\ 8}+Y_3V_{3\ 8}$, $Y_2V_{2\ 9}+Y_3V_{3\ 9}$, $Y_2V_{2\ 10}+Y_3V_{3\ 10}$, $Y_2V_{2\ 11}+Y_3V_{3\ 11}$, $Y_2V_{2\ 12}+Y_3V_{3\ 12}$, $Y_2V_{2\ 13}+Y_3V_{3\ 13}$, $Y_2V_{2\ 14}+Y_3V_{3\ 14}$, $Y_2V_{2\ 15}+Y_3V_{3\ 15}$

A4: $Y_4V_{4\ 8}+Y_7V_{7\ 8}$, $Y_4V_{4\ 9}+Y_7V_{7\ 9}$, $Y_4V_{4\ 10}+Y_7V_{7\ 10}$, $Y_4V_{4\ 11}+Y_7V_{7\ 11}$, $Y_4V_{4\ 12}+Y_7V_{7\ 12}$, $Y_4V_{4\ 13}+Y_7V_{7\ 13}$, $Y_4V_{4\ 14}+Y_7V_{7\ 14}$, $Y_4V_{4\ 15}+Y_7V_{7\ 15}$

A5: $Y_4V_{4\ 0}+Y_5V_{5\ 0}$, $Y_4V_{4\ 1}+Y_5V_{5\ 1}$, $Y_4V_{4\ 2}+Y_5V_{5\ 2}$, $Y_4V_{4\ 3}+Y_5V_{5\ 3}$, $Y_4V_{4\ 4}+Y_5V_{5\ 4}$, $Y_4V_{4\ 5}+Y_5V_{5\ 5}$, $Y_4V_{4\ 6}+Y_5V_{5\ 6}$, $Y_4V_{4\ 7}+Y_5V_{5\ 7}$

A6: $Y_5V_{5\ 8}+Y_6V_{6\ 8}$, $Y_5V_{5\ 9}+Y_6V_{6\ 9}$, $Y_5V_{5\ 10}+Y_6V_{6\ 10}$, $Y_5V_{5\ 11}+Y_6V_{6\ 11}$, $Y_5V_{5\ 12}+Y_6V_{6\ 12}$, $Y_5V_{5\ 13}+Y_6V_{6\ 13}$, $Y_5V_{5\ 14}+Y_6V_{6\ 14}$, $Y_5V_{5\ 15}+Y_6V_{6\ 15}$

A7: $Y_6V_{6\ 0}+Y_7V_{7\ 0}$, $Y_6V_{6\ 1}+Y_7V_{7\ 1}$, $Y_6V_{6\ 2}+Y_7V_{7\ 2}$, $Y_6V_{6\ 3}+Y_7V_{7\ 3}$, $Y_6V_{6\ 4}+Y_7V_{7\ 4}$, $Y_6V_{6\ 5}+Y_7V_{7\ 5}$, $Y_6V_{6\ 6}+Y_7V_{7\ 6}$, $Y_6V_{6\ 7}+Y_7V_{7\ 7}$

At block 816, a second data reduction process may be performed. The second data reduction process may be performed to obtain the elements of a solution tensor.

During the second data reduction process, the processing devices A0-A7 may share data therebetween using the second communication channels 740 and sum the data to obtain the solution tensor from the multiplication operation results. As an example, each of the processing devices A0-A7 may share data with three of the other processing devices. For example, the processing devices A0-A7 may share summation dot-product tiles. For a first iteration each of the processing devices A0-A7 may share a summation dot-product tile the processing device calculated and may add a summation dot-product tile the processing device calculated with a first received summation dot-product tile that the processing device obtained from another processing device.

For example, A0 sends $Y_0V_{0\ 0}+Y_3V_{3\ 0}$ to A5 and $Y_0V_{0\ 1}+Y_3V_{3\ 1}$ to A7, A2 sends $Y_1V_{1\ 2}+Y_2V_{2\ 2}$ to A5 and $Y_1V_{1\ 3}+Y_2V_{2\ 3}$ to A7, A5 sends $Y_4V_{4\ 4}+Y_5V_{5\ 4}$ to A0 and $Y_4V_{4\ 5}+Y_5V_{5\ 5}$ to A2, A7 sends $Y_6V_{6\ 6}+Y_7V_{7\ 6}$ to A0 and $Y_6V_{6\ 7}+Y_7V_{7\ 7}$ to A2, A1 sends $Y_0V_{0\ 8}+Y_1V_{1\ 8}$ to A4 and $Y_0V_{0\ 9}+Y_1V_{1\ 9}$ to A6, A3 sends $Y_2V_{2\ 10}+Y_3V_{3\ 10}$ to A4 and $Y_2V_{2\ 11}+Y_3V_{3\ 11}$ to A6, A4 sends $Y_4V_{4\ 12}+Y_7V_{7\ 12}$ to A1 and $Y_4V_{4\ 13}+Y_7V_{7\ 13}$ to A3, and A6 sends $Y_5V_{5\ 14}+Y_6V_{6\ 14}$ to A1 and $Y_5V_{5\ 15}+Y_6V_{6\ 15}$ to A3. After sending the summation dot-product tiles and performing the summing, the following summation dot-product tiles may be found on each of the processing devices A0-A7:

A0: $Y_0V_{0\ 2}+Y_3V_{3\ 2}$, $Y_0V_{0\ 3}+Y_3V_{3\ 3}$, $Y_0V_{0\ 4}+Y_3V_{3\ 4}+Y_4V_{4\ 4}+Y_5V_{5\ 4}$, $Y_0V_{0\ 5}+Y_3V_{3\ 5}$, $Y_0V_{0\ 6}+Y_3V_{3\ 6}+Y_6V_{6\ 6}+Y_7V_{7\ 6}$, $Y_0V_{0\ 7}+Y_3V_{3\ 7}$

A1: $Y_0V_{0\ 10}+Y_1V_{1\ 10}$, $Y_0V_{0\ 11}+Y_1V_{1\ 11}$, $Y_0V_{0\ 12}+Y_1V_{1\ 12}+Y_4V_{4\ 12}+Y_7V_{7\ 12}$, $Y_0V_{0\ 13}+Y_1V_{1\ 13}$, $Y_0V_{0\ 14}+Y_1V_{1\ 14}+Y_5V_{5\ 14}+Y_6V_{6\ 14}$, $Y_0V_{0\ 15}+Y_1V_{1\ 15}$

A2: $Y_1V_{1\ 0}+Y_2V_{2\ 0}$, $Y_1V_{1\ 1}+Y_2V_{2\ 1}$, $Y_1V_{1\ 4}+Y_2V_{2\ 4}$, $Y_1V_{1\ 5}+Y_2V_{2\ 5}+Y_4V_{4\ 5}+Y_5V_{5\ 5}$, $Y_1V_{1\ 6}+Y_2V_{2\ 6}$, $Y_1V_{1\ 7}+Y_2V_{2\ 7}+Y_6V_{6\ 7}+Y_7V_{7\ 7}$

A3: $Y_2V_{2\ 8}+Y_3V_{3\ 8}$, $Y_2V_{2\ 9}+Y_3V_{3\ 9}$, $Y_2V_{2\ 12}+Y_3V_{3\ 12}$, $Y_2V_{2\ 13}+Y_3V_{3\ 13}+Y_4V_{4\ 13}+Y_7V_{7\ 13}$, $Y_2V_{2\ 14}+Y_3V_{3\ 14}$, $Y_2V_{2\ 15}+Y_3V_{3\ 15}+Y_5V_{5\ 15}+Y_6V_{6\ 15}$

A4: $Y_4V_{4\ 8}+Y_7V_{7\ 8}+Y_0V_{0\ 8}+Y_1V_{1\ 8}$, $Y_4V_{4\ 9}+Y_7V_{7\ 9}$, $Y_4V_{4\ 10}+Y_7V_{7\ 10}+Y_2V_{2\ 10}+Y_3V_{3\ 10}$, $Y_4V_{4\ 11}+Y_7V_{7\ 11}$, $Y_4V_{4\ 14}+Y_7V_{7\ 14}$, $Y_4V_{4\ 15}+Y_7V_{7\ 15}$

A5: $Y_4V_{4\ 0}+Y_5V_{5\ 0}+Y_0V_{0\ 0}+Y_3V_{3\ 0}$, $Y_4V_{4\ 1}+Y_5V_{5\ 1}$, $Y_4V_{4\ 2}+Y_5V_{5\ 2}+Y_1V_{1\ 2}+Y_2V_{2\ 2}$, $Y_4V_{4\ 3}+Y_5V_{5\ 3}$, $Y_4V_{4\ 6}+Y_5V_{5\ 6}$, $Y_4V_{4\ 7}+Y_5V_{5\ 7}$

A6: $Y_5V_{5\ 8}+Y_6V_{6\ 8}$, $Y_5V_{5\ 9}+Y_6V_{6\ 9}+Y_0V_{0\ 9}+Y_1V_{1\ 9}$, $Y_5V_{5\ 10}+Y_6V_{6\ 10}$, $Y_5V_{5\ 11}+Y_6V_{6\ 11}+Y_2V_{2\ 11}+Y_3V_{3\ 11}$, $Y_5V_{5\ 12}+Y_6V_{6\ 12}$, $Y_5V_{5\ 13}+Y_6V_{6\ 13}$

A7: $Y_6V_{6\ 0}+Y_7V_{7\ 0}$, $Y_6V_{6\ 1}+Y_7V_{7\ 1}+Y_0V_{0\ 1}+Y_3V_{3\ 1}$, $Y_6V_{6\ 2}+Y_7V_{7\ 2}$, $Y_6V_{6\ 3}+Y_7V_{7\ 3}+Y_1V_{1\ 3}+Y_2V_{2\ 3}$, $Y_6V_{6\ 4}+Y_7V_{7\ 4}$, $Y_6V_{6\ 5}+Y_7V_{7\ 5}$

At a second iteration, each of the processing devices A0-A7 may share the summation dot-product tile calculated in the first iteration and add a summation dot-product tile the processing device calculated with a second received summation dot-product tile that the processing device obtained. For example, A0 sends $Y_0V_{0\ 4}+Y_3V_{3\ 4}+Y_4V_{4\ 4}+Y_5V_{5\ 4}$ to A7 and $Y_0V_{0\ 6}+Y_3V_{3\ 6}+Y_6V_{6\ 6}+Y_7V_{7\ 6}$ to A5, A1 sends $Y_0V_{0\ 12}+Y_1V_{1\ 12}+Y_4V_{4\ 12}+Y_7V_{7\ 12}$ to A6 and $Y_0V_{0\ 14}+Y_1V_{1\ 14}+Y_5V_{5\ 14}+Y_6V_{6\ 14}$ to A4, A2 sends $Y_1V_{1\ 5}+Y_2V_{2\ 5}+Y_4V_{4\ 5}+Y_5V_{5\ 5}$ to A7 and $Y_1V_{1\ 7}+Y_2V_{2\ 7}+Y_6V_{6\ 7}+Y_7V_{7\ 7}$ to A5, A3 sends $Y_2V_{2\ 13}+Y_3V_{3\ 13}+Y_4V_{4\ 13}+Y_7V_{7\ 13}$ to A6 and $Y_2V_{2\ 15}+Y_3V_{3\ 15}+Y_5V_{5\ 15}+Y_6V_{6\ 15}$ to A4, A4 sends $Y_4V_{4\ 8}+Y_7V_{7\ 8}+Y_0V_{0\ 8}+Y_1V_{1\ 8}$ to A3 and $Y_4V_{4\ 10}+Y_7V_{7\ 10}+Y_2V_{2\ 10}+Y_3V_{3\ 10}$ to A1, A5 sends $Y_4V_{4\ 0}+Y_5V_{5\ 0}+Y_0V_{0\ 0}+Y_3V_{3\ 0}$ to A2 and $Y_4V_{4\ 2}+Y_5V_{5\ 2}+Y_1V_{1\ 2}+Y_2V_{2\ 2}$ to A0, A6 sends $Y_5V_{5\ 9}+Y_6V_{6\ 9}+Y_0V_{0\ 9}+Y_1V_{1\ 9}$ to A3 and $Y_5V_{5\ 11}+Y_6V_{6\ 11}+Y_2V_{2\ 11}+Y_3V_{3\ 11}$ to A1, and A7 sends $Y_6V_{6\ 1}+Y_7V_{7\ 1}+Y_0V_{0\ 1}+Y_3V_{3\ 1}$ to A2 and $Y_6V_{6\ 3}+Y_7V_{7\ 3}+Y_1V_{1\ 3}+Y_2V_{2\ 3}$ to A0. Thus, the following summation dot-product tiles may be found on each of the processing devices A0-A7:

A0: $Y_0V_{0\ 2}+Y_3V_{3\ 2}+Y_4V_{4\ 2}+Y_5V_{5\ 2}+Y_1V_{1\ 2}+Y_2V_{2\ 2}$, $Y_0V_{0\ 3}+Y_3V_{3\ 3}+Y_6V_{6\ 3}+Y_7V_{7\ 3}+Y_1V_{1\ 3}+Y_2V_{2\ 3}$, $Y_0V_{0\ 5}+Y_3V_{3\ 5}$, $Y_0V_{0\ 7}+Y_3V_{3\ 7}$

A1: $Y_0V_{0\ 10}+Y_1V_{1\ 10}+Y_4V_{4\ 10}+Y_7V_{7\ 10}+Y_2V_{2\ 10}+Y_3V_{3\ 10}$, $Y_0V_{0\ 11}+Y_1V_{1\ 11}+Y_5V_{5\ 11}+Y_6V_{6\ 11}+Y_2V_{2\ 11}+Y_3V_{3\ 11}$, $Y_0V_{0\ 13}+Y_1V_{1\ 13}$, $Y_0V_{0\ 15}+Y_1V_{1\ 15}$

A2: $Y_1V_{1\ 0}+Y_2V_{2\ 0}+Y_4V_{4\ 0}+Y_5V_{5\ 0}+Y_0V_{0\ 0}+Y_3V_{3\ 0}$, $Y_1V_{1\ 1}+Y_2V_{2\ 1}+Y_6V_{6\ 1}+Y_7V_{7\ 1}+Y_0V_{0\ 1}+Y_3V_{3\ 1}$, $Y_1V_{1\ 4}+Y_2V_{2\ 4}$, $Y_1V_{1\ 6}+Y_2V_{2\ 6}$

A3: $Y_2V_{2\ 8}+Y_3V_{3\ 8}+Y_4V_{4\ 8}+Y_7V_{7\ 8}+Y_0V_{0\ 8}+Y_1V_{1\ 8}$, $Y_2V_{2\ 9}+Y_3V_{3\ 9}+Y_5V_{5\ 9}+Y_6V_{6\ 9}+Y_0V_{0\ 9}+Y_1V_{1\ 9}$, $Y_2V_{2\ 12}+Y_3V_{3\ 12}$, $Y_2V_{2\ 14}+Y_3V_{3\ 14}$

A4: $Y_4V_{4\ 9}+Y_7V_{7\ 9}$, $Y_4V_{4\ 11}+Y_7V_{7\ 11}$, $Y_4V_{4\ 14}+Y_7V_{7\ 14}+Y_0V_{0\ 14}+Y_1V_{1\ 14}+Y_5V_{5\ 14}+Y_6V_{6\ 14}$, $Y_4V_{4\ 15}+Y_7V_{7\ 15}+Y_2V_{2\ 15}+Y_3V_{3\ 15}+Y_5V_{5\ 15}+Y_6V_{6\ 15}$

A5: $Y_4V_{4\ 1}+Y_5V_{5\ 1}$, $Y_4V_{4\ 3}+Y_5V_{5\ 3}$, $Y_4V_{4\ 6}+Y_5V_{5\ 6}+Y_0V_{0\ 6}+Y_3V_{3\ 6}+Y_6V_{6\ 6}+Y_7V_{7\ 6}$, $Y_4V_{4\ 7}+Y_5V_{5\ 7}+Y_1V_{1\ 7}+Y_2V_{2\ 7}+Y_6V_{6\ 7}+Y_7V_{7\ 7}$

A6: $Y_5V_{5\ 8}+Y_6V_{6\ 8}$, $Y_5V_{5\ 10}+Y_6V_{6\ 10}$, $Y_5V_{5\ 12}+Y_6V_{6\ 12}+Y_0V_{0\ 12}+Y_1V_{1\ 12}+Y_4V_{4\ 12}+Y_7V_{7\ 12}$, $Y_5V_{5\ 13}+Y_6V_{6\ 13}+Y_2V_{2\ 13}+Y_3V_{3\ 13}+Y_4V_{4\ 13}+Y_7V_{7\ 13}$

A7: $Y_6V_{6\ 0}+Y_7V_{7\ 0}$, $Y_6V_{6\ 2}+Y_7V_{7\ 2}$, $Y_6V_{6\ 4}+Y_7V_{7\ 4}+Y_0V_{0\ 4}+Y_3V_{3\ 4}+Y_4V_{4\ 4}+Y_5V_{5\ 4}$, $Y_6V_{6\ 5}+Y_7V_{7\ 5}+Y_1V_{1\ 5}+Y_2V_{2\ 5}+Y_4V_{4\ 5}+Y_5V_{5\ 5}$

At a third iteration, each of the processing devices may share the summation dot-product tile calculated in the second iteration and add the summation dot-product tile the processing device calculated with a third received summation dot-product tile that the processing device obtained. For example, A0 sends $Y_0V_{0\ 2}+Y_3V_{3\ 2}+Y_4V_{4\ 2}+Y_5V_{5\ 2}+Y_1V_{1\ 2}+Y_2V_{2\ 2}$ to A7 and $Y_0V_{0\ 3}+Y_3V_{3\ 3}+Y_6V_{6\ 3}+Y_7V_{7\ 3}+Y_1V_{1\ 3}+Y_2V_{2\ 3}$ to A5, A1 sends $Y_0V_{0\ 10}+Y_1V_{1\ 10}+Y_4V_{4\ 10}+Y_7V_{7\ 10}+Y_2V_{2\ 10}+Y_3V_{3\ 10}$ to A6 and $Y_0V_{0\ 11}+Y_1V_{1\ 11}+Y_5V_{5\ 11}+Y_6V_{6\ 11}+Y_2V_{2\ 11}+Y_3V_{3\ 11}$ to A4, A2 sends $Y_1V_{1\ 0}+Y_2V_{2\ 0}+Y_4V_{4\ 0}+Y_5V_{5\ 0}+Y_0V_{0\ 0}+Y_3V_{3\ 0}$ to A7 and $Y_1V_{1\ 1}+Y_2V_{2\ 1}+Y_6V_{6\ 1}+Y_7V_{7\ 1}+Y_0V_{0\ 1}+Y_3V_{3\ 1}$ to A5, A3 sends $Y_2V_{2\ 8}+Y_3V_{3\ 8}+Y_4V_{4\ 8}+Y_7V_{7\ 8}+Y_0V_{0\ 8}+Y_1V_{1\ 8}$ to A6 and $Y_2V_{2\ 9}+Y_3V_{3\ 9}+Y_5V_{5\ 9}+Y_6V_{6\ 9}+Y_0V_{0\ 9}+Y_1V_{1\ 9}$ to A4, A4 sends $Y_4V_{4\ 14}+Y_7V_{7\ 14}+Y_0V_{0\ 14}+Y_1V_{1\ 14}+Y_5V_{5\ 14}+Y_6V_{6\ 14}$ to A3 and $Y_4V_{4\ 15}+Y_7V_{7\ 15}+Y_2V_{2\ 15}+Y_3V_{3\ 15}+Y_5V_{5\ 15}+Y_6V_{6\ 15}$ to A1, A5 sends $Y_4V_{4\ 6}+Y_5V_{5\ 6}+Y_0V_{0\ 6}+Y_3V_{3\ 6}+Y_6V_{6\ 6}+Y_7V_{7\ 6}$ to A2 and $Y_4V_{4\ 7}+Y_5V_{5\ 7}+Y_1V_{1\ 7}+Y_2V_{2\ 7}+Y_6V_{6\ 7}+Y_7V_{7\ 7}$ to A0, A6 sends $Y_5V_{5\ 12}+Y_6V_{6\ 12}+Y_0V_{0\ 12}+Y_1V_{1\ 12}+Y_4V_{4\ 12}+Y_7V_{7\ 12}$ to A3 and $Y_5V_{5\ 13}+Y_6V_{6\ 13}+Y_2V_{2\ 13}+Y_3V_{3\ 13}+Y_4V_{4\ 13}+Y_7V_{7\ 13}$ to A1, and A7 sends $Y_6V_{6\ 4}+Y_7V_{7\ 4}+Y_0V_{0\ 4}+Y_3V_{3\ 4}+Y_4V_{4\ 4}+Y_5V_{5\ 4}$ to A2 and $Y_6V_{6\ 5}+Y_7V_{7\ 5}+Y_1V_{1\ 5}+Y_2V_{2\ 5}+Y_4V_{4\ 5}+Y_5V_{5\ 5}$ to A0.

After the last reduce operation, a solution tensor may result that is split into sixteen solution tiles may be found in the processing devices A0-A7. In these and other embodiments, each of the processing devices A0-A7 may include a single one of the sixteen solution tiles and each of the solution tiles may be different. Note that solution tiles may each has a same shape of (b×d/16) and each of the second communication channels 740 may be used four times, twice in every direction to generate the solution tiles. As a result, the same amount of data may be shared by each of the processing devices A0-A7 and a same amount of data may be shared across each of the second communication channels 740. Note that had the intermediate and third tensors been split in unequal tiles, different amounts of data may be shared between the processing devices A0-A7 and on each of the second communication channels 740.

The solution tensor may be relabeled as Z where each of the sixteen tile of the solution tensor may be labeled $Z_i$ where $Z_i=Y_0V_{0\ i}+Y_1V_{1\ i}+Y_2V_{2\ i}+Y_3V_{3\ i}+Y_4V_{4\ i}+Y_5V_{5\ i}+Y_6V_{6\ i}+Y_7V_{7\ i}$. The 16 tiles of the solution tensor may be found on the processing devices A0-A7 as follows:

A0: $Z_5$, $Z_7$
A1: $Z_{13}$, $Z_{15}$
A2: $Z_4$, $Z_6$
A3: $Z_{12}$, $Z_{14}$
A4: $Z_9$, $Z_{11}$
A5: $Z_1$, $Z_3$
A6: $Z_8$, $Z_{10}$
A7: $Z_0$, $Z_3$

At block 818, a second data gather process may be performed. During the second data gather process, the processing devices A0-A7 may share data therebetween using the first communication channels 730. For example, in the second data gather process, each solution tile in the processing devices A0-A3 may be shared with each of the processing devices A0-A3 and each solution tile in the processing devices A4-A7 may be shared with each of the processing device processing devices A4-A7. As a result, the solution tiles may be concatenated into half of the solution tensor, such that the solution tensor is split into two solution tiles. In these and other embodiments, the solution tensor may be split among the processing devices A0-A7 such that each processing device A0-A7 includes half of the solution tensor in a similar or same manner as the first tensor is split among the processing devices A0-A7.

For example, during the second data gather process A0 sends $Z_5$ to A3 which sends it to A2 which sends it to A1 and sends $Z_7$ to A1 to A2 to A3, A1 sends $Z_{13}$ to A0 to A3 to A2 and $Z_{15}$ to A2 to A3 to A0, A2 sends $Z_4$ to A1 to A0 to A3 and $Z_6$ to A3 to A0 to A1, A3 sends $Z_{12}$ to A2 to A1 to A0 and $Z_{14}$ to A0 to A1 to A2, A4 sends Z to A7 to A6 to A5 and $Z_{11}$ to A5 to A6 to A7, A5 sends $Z_1$ to A4 to A7 to A6 and $Z_3$ to A6 to A7 to A4, A6 sends $Z_8$ to A5 to A4 to A7 and $Z_{10}$ to A7 to A4 to A5, and A7 send $Z_0$ to A6 to A5 to A4 and $Z_3$ to A6 to A5 to A4. This leaves $Z_4$, $Z_5$, $Z_6$, $Z_7$, $Z_{12}$, $Z_{13}$, $Z_{14}$ and $Z_{15}$ on each of the processing devices A0-A3, and the other tiles of Zs on each of the processing devices A4-A7.

Note that the tiles of the solution tensor may have the same number of elements and each of the first communication channels 730 may be used four times, twice in every direction. As a result, the same amount of data may be shared by each of the processing devices A0-A7, and a same amount of data may be shared across each of the first communication channels 730.

Note that the blocks of the method 800 may be performed in overlapping time periods. For example, at block 806, each of the processing devices A0-A7 may perform a multiplication operation of the elements of the first tensor with the elements of the second tensor. The multiplication operation of some of the elements may be completed before the multiplication operation of other of the elements are completed. In these and other embodiments, the completed multiplication operation results may be sent to another processing device as part of the data reduction process of block 808. Similarly, the data reduction process of block 808 may be completed over a period of time and the summation of some elements may be completed before the summation of other elements. In these and other embodiments, the summed elements may be sent to other processing devices as part of the data gather process of block 810. A similar process may occur with respect to blocks 814, 816, and 818. Thus, the blocks of the method 800 may be performed in overlapping time periods.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 800 may further include additional operations. For example, between the blocks 808 and 810, the method 800 may include performing one or more activations on the tensor tiles. Activations may be operations to introduce non-linearity in the tensors. For example, the activation may include apply a Gaussian Error Linear Unit activation function to the tensor tiles. As another example, between the blocks 816 and 818, the method 800 may include performing one or more normalizations on the tiles. As another example, the splitting of the tensors may be performed at the beginning of the process. For example, the splitting of the weight tensors in blocks 802, 804, and 812 may be performed before block 802. In these and other embodiments, the split weight tensors may be provided to the processing devices during their respective blocks of operation.

Tensor Operations with AI Models

The tensor operations, such as the tensor operations described with respect to FIGS. 1-8 may be used across various fields due to the ability of tensor operations to efficiently manage multi-dimensional data. For example, physics may use tensors to describe phenomena such as spacetime curvature and electromagnetic fields. In engineering, tensors may aid in stress analysis and fluid dynamics, while in computer graphics and vision, tensors may handle 3D transformations and image processing. Medical imaging may rely on tensors for reconstructing MRI and CT data. Finance may use tensors for risk management and portfolio optimization, and data science for large-scale data analysis and recommendation systems. Tensors also may represent quantum states in quantum computing, analyze text in natural language processing, describe astrophysical phenomena, model kinematics in robotics, and analyze seismic data in geophysics. Tensor operations described in FIGS. 1-6 may be used to perform tensor operations in all the fields list above as well as in other situations. Alternately or additionally, the configuration of a processing system described in FIGS. 7-8 may be used to perform operations tensor operations in all the fields list above as well as in other situations.

In addition, tensor operations may be used in artificial intelligence (AI). AI is readily being adopted into society. For example, AI may be used in healthcare, finance, transportation, manufacturing, retail, customer service, and other sectors of society. Many AI applications involve the use of models which may be a computational representation of a system or a process that learns from data and/or experience to perform specific tasks or make predictions.

AI models may vary in size and complexity depending on the architecture, complexity, and the amount of data on which the models are trained. Training and running larger AI models may require a large amount of computational resources. For example, transformer models, which may be used for natural language processing, have grown to be large and complex. To assist in running larger AI models quickly, the computational operations for the AI models may use tensor parallelism that is run on systolic arrays of processing units, such as the tensor parallelism described in this disclosure. For example, tensor operations described in FIGS. 1-6 may be used to perform operations of AI models. Alternately or additionally, the configuration of a processing system described in FIGS. 7-8 may be used to perform operations of AI models.

A system and method may be provided by this disclosure that describes how the operations of an AI models may performed using tensor parallelism. In these and other embodiments, the tensor parallelism may allow computational operations of an AI model to be split across multiple processing devices in a manner that may reduce a processing time or a data bandwidth for a given processing time. Additionally, a system and method may be provided that describes how the operations of an AI model may be configured to use the tensor parallelism described in FIGS. 1-6 and/or the configuration of a processing system described in FIGS. 7-8.

Figure 9A:
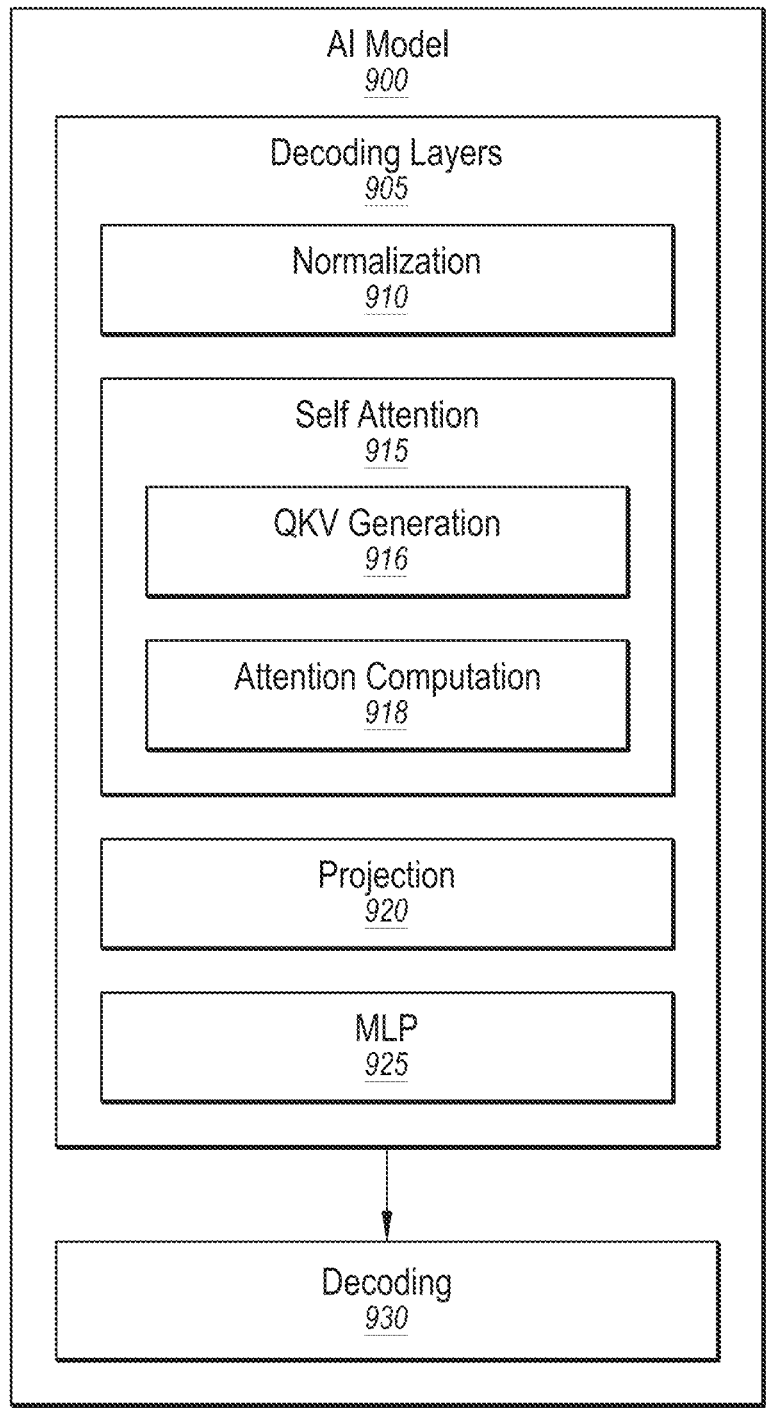
FIG. 9A illustrates an example AI model.

FIG. 9A illustrates an example AI model 900, arranged according to one or more embodiments of the present invention. The AI model 900 may be representative of a large language model or a transformer decoder. As a large language model, the AI model 900 may be configured to generate text by predicting a next group of characters that may occur after existing text generated by the AI model. In these and other embodiments, the AI model 900 may generate text based on an input, such as one or more words that is represented by multiple characters. The characters may be divided into tokens and each token may be converted into a multi-dimensional vector that provides an indication of the meaning of the token. A number of dimensions of the vector may be referred to as a depth of the AI model. For example, the number of dimensions may be 2000, 4000, 6000, 10,000, 12,000 or some other numbers. For example, some current AI models may include 12,288 dimensions.

In some embodiments, the AI model 900 may include multiple different processes configured to perform the operations of the AI model 900. Some of the operations may include decoding layers 905 of the AI model 900. The decoding layers 905 may take as an input a multi-dimension tensor that is the length of the depth of the AI model 900, which may be referred to as a row vector. Some of the decoding layers 905 may include a normalization layer 910, a self-attention layer 915, a projection layer 920, and a multi-layer perception layer (MLP) 925. In these and other embodiments, a majority of larger operations performed by the AI model 900 may be performed by the decoding layers 905. In these and other embodiments, a specific processing system, such as a tensor parallel group of FIG. 1 may be used to perform one or more of the operations of the decoding layers 905. In these and other embodiments, one or more of the layers may be used more often than other of the layers. For example, the normalization layer 910 may be used before the self-attention layer 915 and before the MLP layer 925.

In some embodiments, the normalization layer 910 may include operations that may assist in stabilizing the AI model 900. For example, the normalization layer 910 may obtain a row vector and apply an affine transformation so that the row vector has mean of 0 and a particular standard deviation. The normalization layer 910 may perform other operations as well.

In some embodiments, the self-attention layer 915 may be configured to apply multiple different weight tensors to a row vector. In these and other embodiments, the weight tensors may include a query weight tensor, a key weight tensor, and a values weight tensor. The largest dimension of the weight tensors may be equal to a depth of the AI model 900 and thus may have a similar size as the row vector. In these and other embodiments, a tensor multiplication may be performed by multiplying the row vector by the weight tensors. The self-attention layer 915 may include QKV generation 916, where an input tensor is multiplied by each of the query weight tensor, the key weight tensor, and the values weight tensor to generate a query tensor Q, a key tensor K, and value tensor V, respectively. The self-attention layer 915 may also include performing the attention computation 918. The attention computation 918 may include performing the operation of softmax $(Q*K^T)*V$.

In some embodiments, the self-attention layer 915 may include multiple heads. In these and other embodiments, each of the heads may include a separate query weight tensor, key weight tensor, and values weight tensor. The operations of the self-attention layer 915 may performed by each of the heads of the self-attention layer 915. For example, if a self-attention layer 915 includes 96 heads, 96 computations of a row vector multiplied by the different query weight tensor, key weight tensor, and values weight tensor may be performed. Alternately or additionally, each head may perform the softmax $(Q*K^T)*V$ operation.

In some embodiments, the projection layer 920 may follow the self-attention layer 915 and may be configured to apply a projection matrix to a tensor output by the self-attention layer 915. In these and other embodiments, the output of the self-attention layer 915 may be multiplied by the projection tensor. In these and other embodiments, the projection tensor may have a largest dimension that may be equal to a depth of the AI model 900 and thus may have a similar size as the row vector.

In some embodiments, the MLP layer 925 may follow the projection layer 920. The MLP layer 925 may be configured to perform a feedforward operation of the AI model 900. In these and other embodiments, the MLP layer 925 may be a type of an artificial neural network that includes at least three layers of nodes, an input layer, one or more hidden layers, and an output layer. In these and other embodiments, one or more of the hidden layers may apply one or more MLP weight tensors to a vector output by the projection layer 920. In these and other embodiments, the vector output may have a dimension equal to the depth of the AI model 900. The one or more MLP weight tensors may have a largest dimension that is greater than the depth of the AI model 900. For example, the one or more MLP weight tensors may have a largest dimension that is two, four, six, or more times greater than the depth of the AI model 900. In these and other embodiments, the operation of the MLP layer 925, namely the tensor multiplication of the vector by the one or more MLP weight tensors may result in the largest computations performed by the AI model 900.

As an example, the MLP calculations may result in computations that are four times greater than other computations performed by the AI model 900. For example, the MLP calculations may include the following tensor operation $P \times W_H \times W_O$, where P has a dimension of (b×d) where d is the depth of the AI model 900 and b is a batch size indicating a number of row vectors being processed in parallel by the hardware on which the AI model 900 is operating. Note that b may be smaller than d. $W_H$ may have a dimension of (d×4d) and $W_O$ may have a dimension of (4d×d). Thus, the intermediate matrix after the calculation of P×$W_H$ may have a dimension of (b×4d). The intermediate matrix may be multiplied by $W_O$ to generate an output matrix that may have a dimension of (b×d), the same as the tensor P.

In some embodiments, the decoding layers 905 may be repeated. For example, the normalization layer 910, the self-attention layer 915, the projection layer 920, and the MLP layer 925 may be repeated multiple times for a single token. After the operations of the decoding layers 905 are completed, the AI model 900 may perform decoding 930. In these and other embodiments, the decoding 930 may include the AI model 900 selecting a token for outputting as the next token in the sequence.

Modifications, additions, or omissions may be made to the AI model 900 without departing from the scope of the present disclosure. For example, in some embodiments, the AI model 900 may include additional layers or modules. Alternately or additionally, the AI model 900 may include different layers than those described. For example, the AI model 900 may be a neural network and include different layers than those described for a transformer model.

Figure 9B:
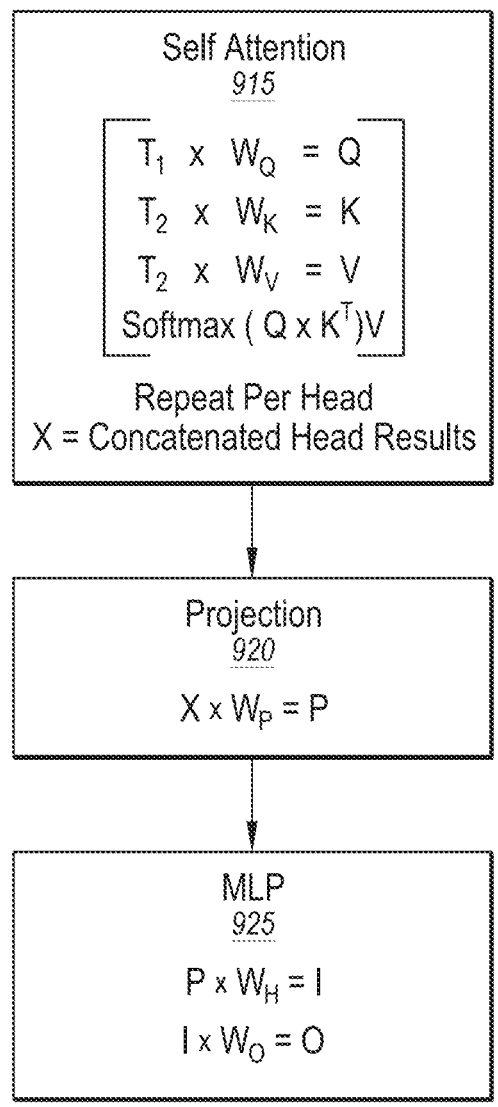
FIG. 9B illustrates some example tensor operations in an AI model.

FIG. 9B illustrates some tensor operations that may be performed in various layers of the AI model 900. In particular, FIG. 9B illustrates operations that may be performed by the self-attention layer 915, the projection layer 920, and the multi-layer perception layer MLP 925. In these and other embodiments, the self-attention layer 915, the projection layer 920, and the multi-layer perception layer MLP 925 may be the layers during which the most resource intensive operations of the AI model 900 may occur.

In some embodiments, in the self-attention layer 915, each head of the self-attention layer 915 may perform tensor multiplication operations. For example, each head of the self-attention layer 915 may multiple one or more tensors by a query weight tensor $W_Q$, a key weight tensor $W_K$, and a value weight tensor $W_V$, referred to collectively as the attention weight tensors. For example, in each attention head, a first tensor T1 based a current row vector may be multiplied by the query weight tensor $W_Q$ and a second tensor T2 based on a current and previous row vectors may be multiplied by the key weight tensor $W_K$ and the values weight tensor $W_V$.

In some embodiments, one or more tensor operations of the self-attention layer 915 may be performed by a tensor parallel group that includes multiple processing devices. An example of the tensor parallel group may include the tensor parallel group 100 of FIG. 1. In these and other embodiments, each of the first tensor T1 and the second tensor T2 may be an input to the self-attention layer 915. In these and other embodiments, each of the first tensor T1 and the second tensor T2 may be split into tiles. In some embodiments, each of the tiles of the first tensor T1 and the second tensor T2 may be a unique set of elements. For example, the elements in a first tile of the first tensor T1 may not be found in any of the other tiles of the first tensor T1. Alternately or additionally, each of the tiles of the first tensor T1 and the second tensor T2 may not be a unique set of elements. In some embodiments, some or all the tiles of the first tensor T1 may include a same dimension or different dimensions and some or all the tiles of the second tensor T2 may include a same dimension or different dimensions.

In some embodiments, the tiles of the first tensor T1 and the second tensor T2 may be distributed among the processing devices for performing the tensor operations with the attention weight tensors. In these and other embodiments, the tiles of the first tensor T1 and the second tensor T2 may be distributed according to a first distribution. For example, in the first distribution manner, the tiles of the first tensor T1 and the second tensor T2 may be distributed such that each of the processing devices does not include an entirety of the tiles of the first tensor T1 or an entirety of the tiles of the second tensor T2. In these and other embodiments, the tiles of the first tensor T1 and the second tensor T2 may be distributed such that duplication of the tiles exists among the processing devices. For example, a first tile of the first tensor T1 may be distributed to multiple of the processing devices.

In some embodiments, the attention weight tensors may also be split into tiles and distributed among the processing devices for performing tensor operations. In some embodiments, the tiles of the attention weight tensors may be distributed according to a second distribution. In these and other embodiments, each of the tiles attention weight tensors may be a unique set of elements and may include a same dimension or different dimension. In these and other embodiments, in the second distribution manner, the tiles of the attention weight tensors may be distributed among the processing devices for performing the tensor operations with the tiles of the first tensor T1 and the second tensor T2. For example, the tiles of the attention weight tensors may be distributed such that each of the processing devices does not include an entirety of the tiles of the attention weight tensors. In these and other embodiments, the tiles of the attention weight tensors may be distributed such that no duplication of the tiles exists among the processing devices.

In some embodiments, after splitting and distribution of the first tensor T1 and the query weight tensor $W_O$, the first tensor T1 may be multiplied by the query weight tensor $W_O$ to generate a self-attention tensor Q. Alternately or additionally, after splitting and distribution of the second tensor T2 and the query key weight tensor $W_k$, the second tensor T2 may be multiplied by the key weight tensor $W_k$ to generate a self-attention tensor K. Alternately or additionally, after splitting and distribution of the second tensor T2 and the value weight tensor $W_V$, the second tensor T2 may be multiplied by the value weight tensor $W_V$ to generate a self-attention tensor V. Each of the self-attention tensors Q, K, and V may be split into tiles and be distributed among the processing devices as a result of the tensor multiplication according to a third distribution that is different than the first and second distributions. In these and other embodiments, in the third distribution, each of the self-attention tensors Q, K, and V may be split into tiles and be distributed among the processing devices as a result of the multiplication such that each of the processing devices includes a different sub-set of each of the self-attention tensors Q, K, and V and no duplication of the tiles of the self-attention tensors Q, K, and V exists among the processing devices.

In some embodiments, other operations may be performed by the self-attention layer 915 on the self-attention tensors Q, K, and V. For example, a transpose may be taken of self-attention tensor K. The transpose of the self-attention tensor K may be multiplied by the self-attention tensor Q to generate an intermediate tensor. A softmax operation may be performed on the intermediate tensor. The result of the softmax operation may be multiplied by the self-attention tensor V. In these and other embodiments, the operations performed by the self-attention layer 915 may be performed on the individual tiles of the self-attention tensors Q, K, and V and intermediate tensors by different ones of the processing devices without rejoining the tiles of the self-attention tensors Q, K, and V on a single processing device. As a result, operations performed on the tile may be performed by different ones of the processing devices. For example, the tiles of the self-attention tensor V may not be rejoined such that a single processing device includes all the tiles of the self-attention tensor V for performing operations with respect to the self-attention tensor V. For example, for a first tile of the self-attention tensor V a first processing device may perform all the operations in the self-attention layer 915 for the first tile without the first processing device include all the tiles of the self-attention tensor V. Thus, once the input tensors and the attention weight tensors are split among the processing devices for performing tensor operations, the resulting tensors may be split among the processing devices and maintained split among the processing devices for operations of the self-attention layer 915.

In some embodiments, the self-attention layer 915 may generate an output tensor X. The output tensor X may be a concatenation of the results from each of the heads of the self-attention layer 915. For example, the result of a head of the self-attention layer 915 may be based on the softmax $(Q*K^T)*V$ operation. In these and other embodiments, the output tensor X of the self-attention layer 915 may be split into tiles and distributed among the processing devices. In these and other embodiments, the output tensor X of the self-attention layer 915 may be split and distributed in a same manner as the input to the self-attention layer 915 is split and distributed among the processing devices, namely via the first distribution. In these and other embodiments, a partial gather process may be performed among the processing devices such that the output tensor X has the first distribution.

In some embodiments, the output tensor X of the self-attention layer 915 may be provided to the projection layer 920. The projection layer 920 may perform a tensor multiplication operation. For example, the projection layer 920 may multiple the output tensor X by a projection weight tensor $W_P$ to generate a projection tensor P.

In some embodiments, one or more tensor operations of the projection layer 920 may be performed by the tensor parallel group. In these and other embodiments, the output tensor X may be maintained in the first distribution. As a result, the projection layer 920 may not gather the tiles of the output tensor X to perform the operations of the projection layer 920. In these and other embodiments, the projection weight tensor $W_P$ may also be split into tiles and distributed among the processing devices for performing the tensor operation. In some embodiments, each of the tiles projection weight tensor $W_P$ may be a unique set of elements and may include a same dimension. In some embodiments, the tiles of the projection weight tensor $W_P$ may be distributed such that each of the processing devices does not include an entirety of the tiles of the projection weight tensor $W_P$. In these and other embodiments, the tiles of the projection weight tensor $W_P$ may be distributed such that no duplication of the tiles exists among the processing devices. In some embodiments, the tiles of the projection weight tensor $W_P$ may be distributed according to the second distribution in the same manner as the attention weight tensors are distributed.

In some embodiments, after splitting and distribution of the projection weight tensor $W_P$, the output tensor X may be multiplied by the projection weight tensor $W_P$ by the processing devices to generate a projection tensor P. As a result of the multiplication operation, the projection tensor P may be split into tiles and distributed among the processing devices according to the third distribution which is the same as the distribution of the self-attention tensors Q, K, and V. In these and other embodiments, a partial gather may be performed on the projection tensor P such that the projection tensor P may be split into tiles and distributed according to the first distribution and in the same manner as the input to the projection layer 920 is split into tiles and distributed among the processing devices. The projection tensor P may be provided to the multi-layer perception layer MLP 925.

In some embodiments, the multi-layer perception layer MLP 925 may perform multiple tensor multiplication operations. For example, the multi-layer perception layer MLP 925 may multiple the projection tensor P by a hidden weight tensor $W_H$ to generate an intermediate tensor I, which may be multiplied by an output weight tensor $W_O$ to generate an output tensor O. In these and other embodiments, the output tensor O may be the basis for an input to the self-attention layer 915 during another iteration of the decoding layers 905.

In some embodiments, one or more tensor operations of the multi-layer perception layer MLP 925 may be performed by the tensor parallel group. In these and other embodiments, the projection tensor P may be maintained in the tiles and distribution among the processing devices. In these and other embodiments, the multi-layer perception layer MLP 925 may not gather the tiles of the projection tensor P to perform the operations of the multi-layer perception layer MLP 925. Rather, the projection tensor P may be maintained in the separated and distributed manner as provided by the projection layer 920.

In these and other embodiments, the hidden weight tensor $W_H$ may also be split into tiles and distributed among the processing devices for performing the tensor operation. In some embodiments, each of the tiles of the hidden weight tensor $W_H$ may be a unique set of elements and may include a same dimension. In some embodiments, the tiles of the hidden weight tensor $W_H$ may be distributed such that each of the processing devices does not include an entirety of the tiles of the hidden weight tensor $W_H$. In these and other embodiments, the tiles of the hidden weight tensor $W_H$ may be distributed such that no duplication of the tiles exists among the processing devices. In these and other embodiments, the tiles of the hidden weight tensor $W_H$ may be distributed in the second distribution manner, which is same manner as the distribution of the attention weight tensors and the projection weight tensor $W_P$.

In some embodiments, after splitting and distribution of the hidden weight tensor $W_H$, the projection tensor P may be multiplied by the hidden weight tensor $W_H$ by the processing devices to generate the intermediate tensor I. As a result of the multiplication operation, the intermediate tensor I may be split into tiles and distributed according to the third distribution the same as the self-attention tensors Q, K, and V and the projection tensor P. In these and other embodiments, a partial gather may be performed on the intermediate tensor I such that the intermediate tensor I may be split into tiles and distributed among the processing devices according to a fourth distribution. In the fourth distribution, none of the processing devices may include an entirety of the intermediate tensor I. The fourth distribution may be different than any distribution of previous tensors among the processing devices. For example, the fourth distribution may be similar to the distribution explained with respect to block 308 of FIG. 3.

In some embodiments, the output weight tensor $W_O$ may also be split into tiles and distributed among the processing devices for performing the tensor operation. In some embodiments, each of the tiles of the output weight tensor $W_O$ may be a unique set of elements and may include a same dimension. In some embodiments, the tiles of the output weight tensor $W_O$ may be distributed such that each of the processing devices does not include an entirety of the tiles of the output weight tensor $W_O$. In these and other embodiments, the tiles of the output weight tensor $W_O$ may be distributed such that no duplication of the tiles exists among the processing devices. In these and other embodiments, the tiles of the output weight tensor $W_O$ may be distributed in a fifth distribution manner that is different than the other distributions. For example, the output weight tensor $W_O$ may be split into more tiles than the hidden weight tensor $W_H$, the projection weight tensor $W_P$, or the attenuation weight tensors. For example, the fifth distribution may be similar to the distribution explained with respect to block 310 of FIG. 3.

In some embodiments, after splitting and distribution of the output weight tensor $W_O$, the intermediate tensor I may be multiplied by the output weight tensor $W_O$ by the processing devices to generate the output tensor O. As a result of the multiplication operation, the output tensor O may be split into tiles and distributed among the processing devices. In these and other embodiments, a partial gather may be performed on the output tensor O such that the output tensor O may be split into tiles and distributed according to the first distribution and the same as the input to the multi-layer perception layer MLP 925 is split into tiles and distributed among the processing devices. The output tensor O may be provided to the self-attention layer 915 as the first tensor T1. In these and other embodiments, the first tensor T1 may not be gathered. Rather, the first tensor T1 may be maintained in the split and distributed manner for the self-attention layer 915.

As a result, for a first iteration of the decoding layers 905, an input tensor may be split and distributed among the processing devices. After this initial split, the tensors used during the decoding layers 905 may remain split and distributed among the processing devices such that no one processing device may include the entirety of a tensor during the tensor operations performed by the decoding layers 905. The split and the distribution of the tensors among the processing devices may change during the operations performed by the decoding layers 905. In these and other embodiments, however, the same split and distribution may occur when a tensor is passed between the different layers of the decoding layers 905. However, during operations of a single layer of the decoding layers 905, different splits and distribution may occur without any of the processing devices including an entirety of one of the tensors during any operations of the decoding layers 905.

Figure 10:
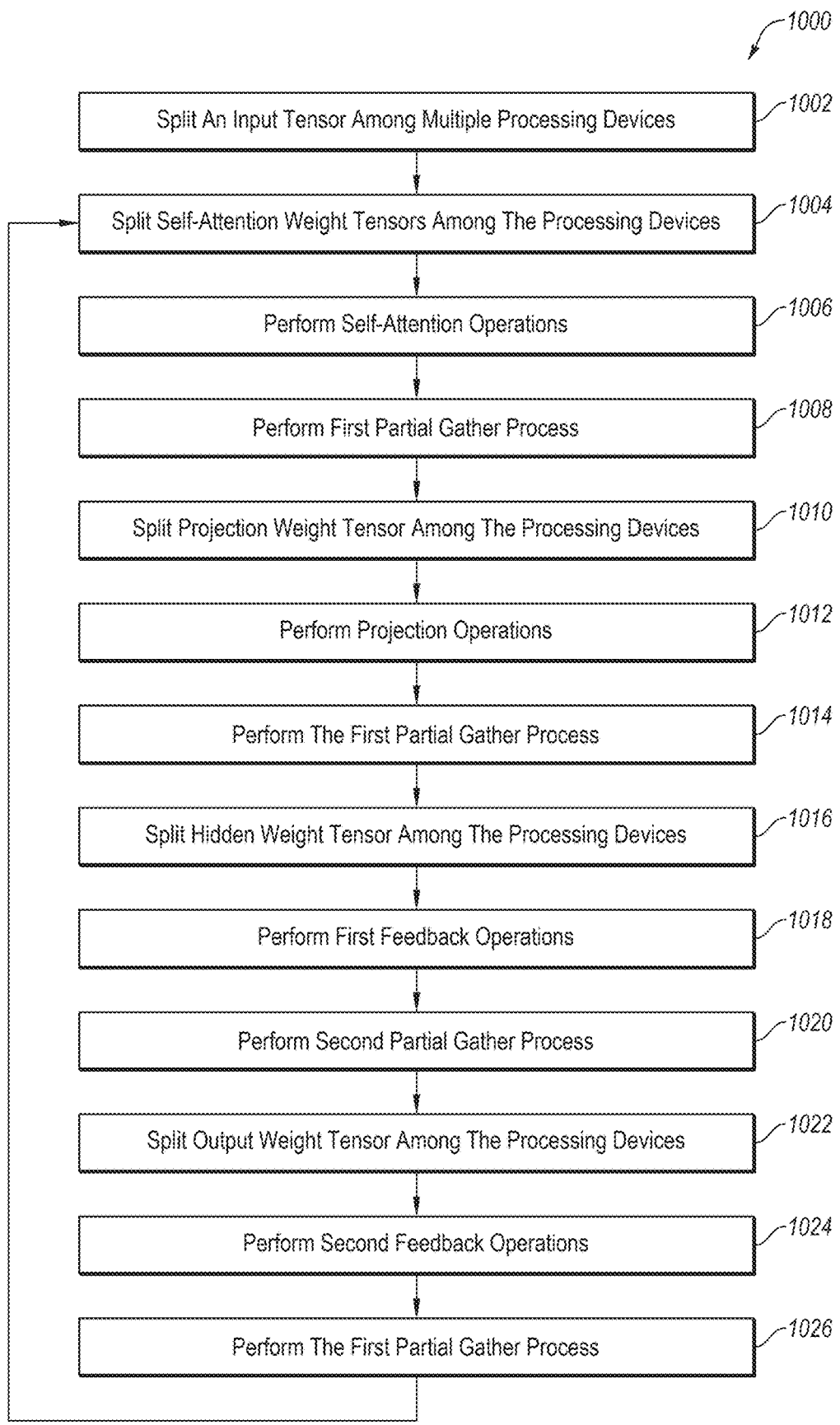
FIG. 10 illustrates a flowchart of example method to perform computations for artificial intelligence models.

FIG. 10 illustrates a flowchart of an example method 1000 to perform tensor operations for an artificial intelligence model. The method 1000 may be arranged in accordance with at least one embodiment described in the present disclosure. One or more operations of the method 1000 may be performed, in some embodiments, by a device or system, such as the tensor parallel group of FIG. 1 or another device or combination of devices. In these and other embodiments, the method 1000 may be performed based on the execution of instructions stored on one or more non-transitory computer-readable media. Although illustrated as discrete blocks, various blocks may be split into additional blocks, combined into fewer blocks, or eliminated, depending on the desired implementation.

The method 1000 may be configured to perform tensor operations for AI models using tensor parallelism among multiple processing devices. In particular, the method 1000 may be configured to be perform tensor operations of a decoding portion of an AI model. The method 1000 may begin at block 1002, where an input tensor of a decoding portion of an AI model may be split and distributed among the processing devices. The input may be an output of a normalization layer of the decoding portion of the AI model.

In some embodiments, the input tensor may be split such that none of the processing devices includes the full input tensor. In some embodiments, the input tensor may be split into less tiles than there are processing devices such that copies of the tiles of the input tensor may be divided among the processing devices. As a result, duplication of the tiles of the input tensor may exist among the processing devices. How the input tensor is split and distributed among the processing devices may be referred to as a first tensor distribution.

For example, for eight processing devices A0-A7, the input tensor may be split into two tiles T0 and T1 and four of the processing devices may receive one of the tiles and the other four of the processing devices may receive the other one of the tiles. For example, as illustrated below, the first box below may represent the first tile T0 and illustrates the first tile T0 being on processing devices A0, A1, A2, A3 and the second box below may represent the second tile T1 and illustrates the second tile T1 being on the processing devices A4, A5, A6, A7.

| A0, A1, A2, A3 | A4, A5, A6, A7 |
|---|---|

At block 1004, self-attention weight tensors may be split and distributed among the processing devices. In these and other embodiments, the self-attention weight tensors may be split such that none of the processing devices include the full self-attention weight tensors. In some embodiments, the self-attention weight tensors may be split into a number of tiles where the number of tiles is equal to or greater than a number of the processing devices. The tiles of the self-attention weight tensors may be distributed among the processing device such that no duplication of the tiles of the second tensor exists among the processing devices. As such, the self-attention weight tensors may be split in a different manner than the input tensor. How the self-attention weight tensors are split and distributed among the processing devices may be referred to as a second tensor distribution. In some embodiments, an example of the second tensor distribution is described with respect to block 804 of FIG. 8.

At block 1006, self-attention operations may be performed. Self-attention operations may include performing tensor operations between the input tensors and the self-attention weight tensors to generate self-attention tensors. For example, the self-attention tensors may include self-attention tensors Q, K, and V. As a result of the tensor operations, the self-attention tensors may be split such that none of the processing devices include the full self-attention weight tensors. In these and other embodiments, the self-attention weight tensors may be split into a number of tiles where the number of tiles is equal to a number of the processing devices. For example, for eight processing devices A0-A7, the self-attention tensors may be split into eight tiles and each of the tiles may be found on one of the processing devices A0-A7. For example, each of the tiles of a self-attention weight tensor may be represented by a block below and may be found in the processing device illustrated in the block. How the self-attention tensors are split and distributed among the processing devices may be referred to as a third tensor distribution.

| A0 | A1 | A2 | A3, | A4 | A5 | A6 | A7 |
|---|---|---|---|---|---|---|---|

In some embodiments, the tensor operations performed between the input tensors and the self-attention weight tensors may include a tensor multiplication. In these and other embodiments, the dot-product operation may be performed by the processing blocks to obtain dot-product results. The operation may further include a partial reduce operation. In these and other embodiments, in the partial reduce operation, the processing devices may share dot-product results amongst the processing devices and sum the dot-product results to obtain the self-attention tensors. The partial reduce operation may result in the third tensor distribution that is different than the first and second tensor distributions. The partial reduce operation may be performed in a first reduce manner. The first reduce manner may describe a number of tiles being shared between all the processing devices, how tiles are shared between each of the processing devices, and/or which processing devices share tiles with which of the other processing devices. For example, an example of the first reduce manner of a partial reduce operation is described with respect to block 808 of FIG. 8.

In some embodiments, other self-attention operations may be performed using the self-attention tensors. In these and other embodiments, the tiles of the self-attention tensors and other tensors that result from operations of the self-attention operations may be maintained split among the processing devices during the self-attention operations. The self-attention operations may generate a self-attention output tensor.

At block 1008, after the self-attention operations, a first partial gather process may be performed. The first partial gather process may be configured to share tiles among the processing devices such that the tiles of the self-attention output tensor are split and distributed according to the first tensor distribution. For example, the self-attention output tensor may be split and distributed in the same manner as the input tensor.

At block 1010, a projection weight tensor may be split and distributed among the processing devices. In these and other embodiments, the projection weight tensor may be split such that none of the processing devices include the full projection weight tensor. In some embodiments, the projection weight tensor may be split and distributed according to the second tensor distribution, such as how the self-attention weight tensors are split and distributed among the processing devices.

At block 1012, projection operations may be performed. In some embodiments, projections operations may include performing tensor operations between the self-attention output tensor and the projection weight tensor to generate a projection tensor. As a result of the tensor operations, the projection tensor may be split such that none of the processing devices include the full projection tensor. In some embodiments, the projection tensor may be split and distributed among the processing devices according to the third tensor distribution, such as how the self-attention tensors are split and distributed among the processing devices.

In some embodiments, the tensor operations performed between the self-attention output tensor and the projection weight tensor may include a tensor multiplication. In these and other embodiments, the dot-product operation may be performed by the processing blocks to obtain dot-product results. The operation may further include a partial reduce operation. In some embodiments, the partial reduce operation may be performed in the first reduce manner, such as how the self-reduction is performed during the operation of the input tensors and the self-attention weight tensors.

At block 1014, the first partial gather process may be performed. The first partial gather process may be configured to share the tiles of the projection tensor among the processing devices such that the tiles of the projection tensor are split and distributed according to the first tensor distribution. For example, the projection tensor may be split and distributed in the same manner as the input tensor and the self-attention output tensor.

At block 1016, a hidden weight tensor may be split and distributed among the processing devices. In these and other embodiments, the hidden weight tensor may be split such that none of the processing devices include the full hidden weight tensor. In some embodiments, the hidden weight tensor may be split and distributed according to the second tensor distribution, such as how the self-attention weight tensors and the projection weight tensor are split and distributed among the processing devices.

At block 1018, first feedforward operations may be performed. In some embodiments, the first feedback operations may include performing tensor operations between the projection tensor and the hidden weight tensor to generate an intermediate tensor. As a result of the tensor operations, the intermediate tensor may be split such that none of the processing devices include the full intermediate tensor. In some embodiments, the intermediate tensor may be split and distributed among the processing devices according to the third tensor distribution, such as how the self-attention tensors and the projection tensor are split and distributed among the processing devices.

In some embodiments, the tensor operations performed between the projection tensor and the hidden weight tensor may include a tensor multiplication. In these and other embodiments, the dot-product operation may be performed by the processing blocks to obtain dot-product results. The operation may further include a partial reduce operation. In some embodiments, the partial reduce operation may be performed in the first reduce manner, such as how the self-reduction is performed during the self-attention and projection operations.

At block 1020, a second partial gather process may be performed. The second partial gather process may be configured to share tiles among the processing devices such that the tiles of the intermediate tensor are split and distributed across the processing devices. In these and other embodiments, the tiles of the intermediate tensor may be distributed such that there is duplication of the tiles of the intermediate tensor among the processing devices. For example, the intermediate tensor may be distributed such that each tile of the intermediate tensor is found on a number of the processing devices where the number is equal to the number of tiles into which the first tensor is split. For example, the intermediate tensor may be distributed such that each tile of the intermediate tensor is found on two of the processing devices. In these and other embodiments, the intermediate tensor may be distributed such that no processing device includes the entire intermediate tensor. In some embodiments, the second partial gather process may result in the intermediate tensor being split and distributed among the processing devices according to a fourth tensor distribution that is different than the first, second, and third tensor distributions. For example, an example of second partial gather process is described with respect to block 810 of FIG. 8.

At block 1022, the output weight tensor may be split and distributed among the processing devices. In some embodiments, the output weight tensor may be split such that none of the processing devices includes the full additional tensor.

In some embodiments, the output weight tensor may be split into a number of tiles where the number of tiles is equal to or greater than a number of the processing devices. The tiles of the output weight tensor may be distributed among the processing device such that no duplication of the tiles of the additional tensor exists among the processing devices. In some embodiments, the output weight tensor may be split and distributed among the processing devices according to a fifth tensor distribution that is different than the first, second, third, and fourth tensor distributions. For example, an example of the split of the output weight tensor is described with respect to block 812 of FIG. 8.

At block 1024, second feedback operations may be performed. In some embodiments, the second feedback operations may include performing tensor operations between the intermediate tensor and the output weight tensor to generate an output tensor. As a result of the tensor operations, the output tensor may be split such that none of the processing devices include the full output tensor. In some embodiments, the output tensor may be split and distributed among the processing devices according to the third tensor distribution, such as how the self-attention tensors and the projection tensor are split and distributed among the processing devices.

In some embodiments, the tensor operations performed between the projection tensor and the hidden weight tensor may include a tensor multiplication. In these and other embodiments, a dot-product operation may be performed by the processing blocks to obtain dot-product results. The operation may further include a partial reduce operation. The partial reduce operation may result in the third tensor distribution. The partial reduce operation may be performed in a second reduce manner that is different than the first reduce manner. For example, an example of the second reduce manner is described with respect to block 816 of FIG. 8.

At block 1026, the first partial gather process may be performed. The first partial gather process may be configured to share the tiles of the output tensor among the processing devices such that the tiles of the output tensor are split and distributed according to the first tensor distribution. For example, the output tensor may be split and distributed in the same manner as the input tensor and the self-attention output tensor, and projection tensor.

In some embodiments, the method may proceed back to block 1004. In these and other embodiments, the output tensor may be used as the input tensor in the self-attention operations. Alternately or additionally, the method may include additional operations performed by an AI model.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the method 1000 may further include selecting a word for output by the artificial intelligence model based on the multiple second result blocks.

As another example, the splitting of the tensors may be performed at the beginning of the process. For example, the splitting of the weight tensors in blocks 1004, 1010, 1016, and 1022 may be performed before block 1002. In these and other embodiments, the split weight tensors may be provided to the processing devices during their respective blocks.

Figure 11:
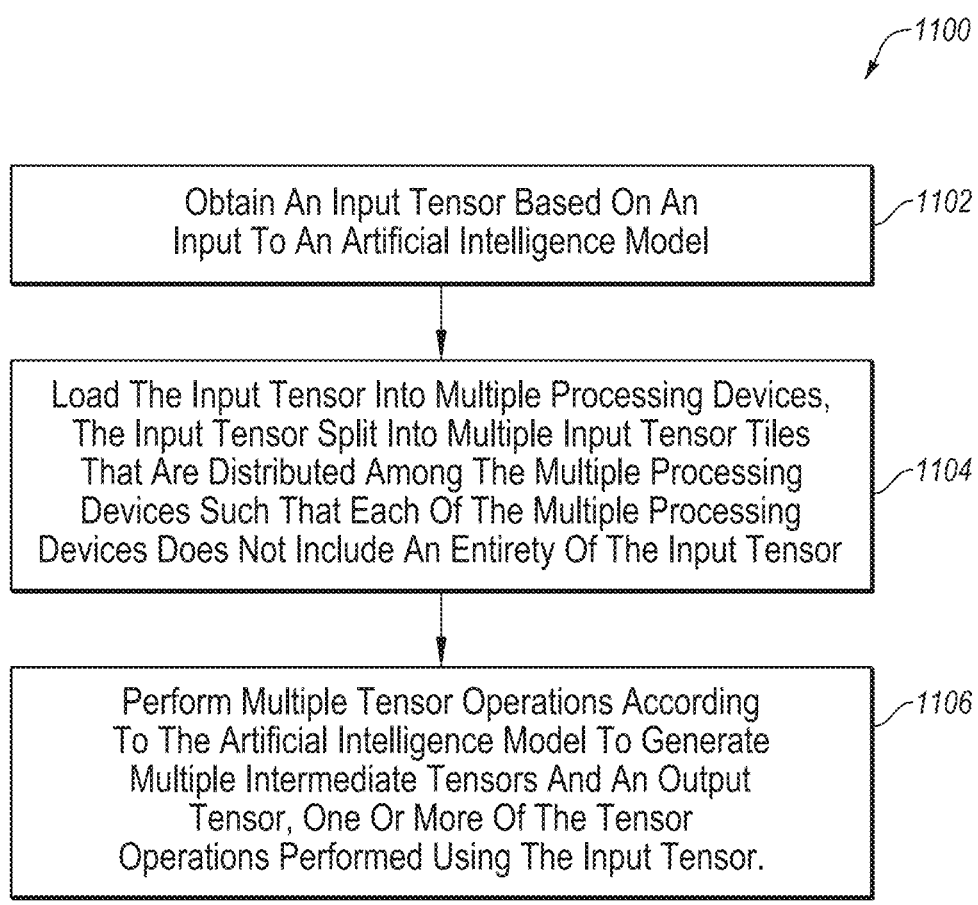
FIG. 11 illustrates a flowchart of another example method to perform computations for artificial intelligence models.

FIG. 11 illustrates a flowchart of another example method 1100 to perform tensor operations for an artificial intelligence model. The method 1100 may be arranged in accordance with at least one embodiment described in the present disclosure. One or more operations of the method 1100 may be performed, in some embodiments, by a device or system, such as the tensor parallel group of FIG. 1 or another device or combination of devices. In these and other embodiments, the method 1100 may be performed based on the execution of instructions stored on one or more non-transitory computer-readable media. Although illustrated as discrete blocks, various blocks may be split into additional blocks, combined into fewer blocks, or eliminated, depending on the desired implementation.

The T method 1100 may begin at block 1102, where an input tensor based on an input to an artificial intelligence model may be obtained.

At block 1104, the input tensor may be loaded into multiple processing devices. In some embodiments, the input tensor may be split into multiple input tensor tiles that are distributed among the processing devices such that each of the processing devices does not include an entirety of the input tensor. In these and other embodiments, the input tensor tiles may be distributed among the processing devices such that half of the processing devices each include half of the input tensor tiles.

At block 1106, multiple tensor operations may be performed according to the artificial intelligence model to generate multiple intermediate tensors and an output tensor. In some embodiments, one or more of the multiple tensor operations may be performed using the input tensor.

In some embodiments, each of the multiple intermediate tensors may be split into tensor tiles distributed among the multiple processing devices such that each of the processing devices does not include an entirety of the intermediate tensors during any of the tensor operations. In these and other embodiments, the distribution of the tensor tiles of the one or more of the intermediate tensors among the processing devices is different than the distribution of the input tensor tiles among the processing devices.

Alternately or additionally, the output tensor may be split into tensor tiles distributed among the processing devices such that each of the processing devices does not include an entirety of the output tensor.

In some embodiments, the artificial intelligence model may implement a transformer architecture. In these and other embodiments, the intermediate tensors may include a self-attention tensor and the self-attention tensor may be split into multiple intermediate tensor tiles and distributed among the processing devices such that each of the processing devices includes a different sub-set of the intermediate tensor tiles and no duplication of the intermediate tensor tiles exists among the processing devices. In these and other embodiments, the intermediate tensors include a projection tensor that is split into multiple projection tensor tiles and distributed among the processing devices in the same manner as the input tensor is distributed among the processing devices. Alternately or additionally, the distribution of the input tensor among the processing devices may be different than the distribution of the self-attention tensor among the processing devices.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the method 1100 may further include iteratively performing the method 1100, wherein the input tensor for a subsequent iteration is the output tensor from a previous iteration.

FIGS. 9, 10, and 11 discussion tensor operations for AI models. As mentioned, some AI models may include a feedforward operation, such as a transformer model. Typically, in transformer models the number of elements involved in a computation for inferring the next token is equal to a depth of the transformer model. However, during the feedforward operation, the number of elements involved in a specific computation may be four times the depth of the transformer model. As a result, the processing time for the feedforward operation may be much larger than for other operations and/or a data bandwidth required to maintain a processing time for the feedforward operation may be increased.

In some embodiments, the present disclosure provides a system and/or method that is configured to divide the first weight matrix among multiple processing devices such that transferring of data may occur between the multiplication processes of the feedforward operation. For example, in some embodiments, one or more of a data reduction operation and a data gather operation may be performed after the first multiplication operation and before the second multiplication operation.

Figure 12:
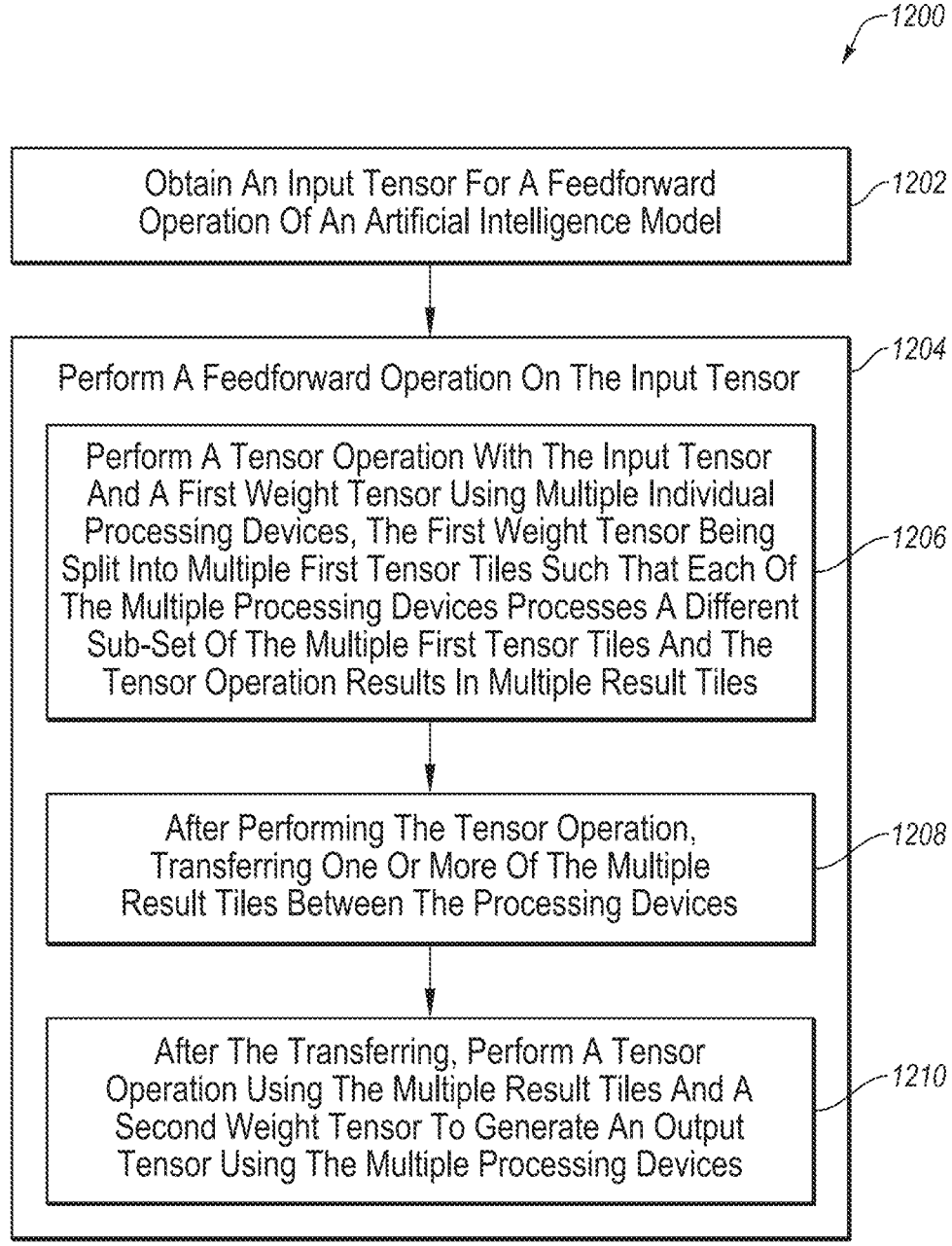
FIG. 12 illustrates a flowchart of another example method to perform computations for artificial intelligence models.

FIG. 12 illustrates a flowchart of an example method 1200 to perform tensor operations for an artificial intelligence model direct to the concept of one or more of a data reduction operation and a data gather operation being performed after the first multiplication operation and before the second multiplication operation. The method 1200 may be arranged in accordance with at least one embodiment described in the present disclosure. One or more operations of the method 1200 may be performed, in some embodiments, by a device or system, such as the tensor parallel group 100 of FIG. 1 or another device or combination of devices. In these and other embodiments, the method 1200 or part of the method 1200 may be performed based on the execution of instructions stored on one or more non-transitory computer-readable media. Although illustrated as discrete blocks, various blocks may be split into additional blocks, combined into fewer blocks, or eliminated, depending on the desired implementation.

The method 1200 may begin at block 1202 where an input tensor for a feedforward operation of an artificial intelligence model may be obtained. The feedforward operations may be performed during a MLP layer of an AI model.

At block 1204, the feedforward operation on the input tensor may be performed. In some embodiments, the performing may include blocks 1206, 1208, and 1210.

At block 1206, a tensor operation may be performed with the input tensor and a first weight tensor using multiple individual processing devices. In these and other embodiments, the first weight tensor may be split into multiple first tensor tiles such that each of the multiple processing devices processes a different sub-set of the multiple first tensor tiles and the tensor operation results in multiple result tiles. In some embodiments, the first weight tensor and the second weight tensor may each include a dimension that is four times a size of a depth of the artificial intelligence model.

For example, the processes described in blocks 802, 804, 806, and/or 808 of FIG. 8 may be an example of the process performed in block 1206.

At block 1208, after performing the tensor operation, one or more of the multiple result tiles are transferred between the multiple processing devices. In some embodiments, the transferring may occur as part of a data gather process or data reduction process between the processing devices. For example, the processes described in block 808 or 810 of FIG. 8 may be an example of the process performed in block 1208.

At block 1210, after the transferring, a tensor operation may be performed using the multiple result tiles and a second weight tensor to generate an output tensor using the multiple processing devices. In some embodiments, the second weight tensor may be split into multiple second tensor tiles such that each of the multiple individual processing devices processes a different sub-set of the multiple second tensor tiles during the multiplying by the second weight tensor. In these and other embodiments, the first weight tensor may be split into the multiple first tensor tiles in a first manner and the second weight tensor may be split into the multiple second tensor tiles in a second manner that is different than the first manner. In some embodiments, the multiple first tensor tiles may be equal in size and each larger than the multiple second tensor tiles. For example, the operations performed in blocks 812, 814, and/or 816 may be examples of the operations performed at block 1210.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the method 1200 may further include selecting a word for output by the artificial intelligence model based on the second result tiles.

Figure 13:
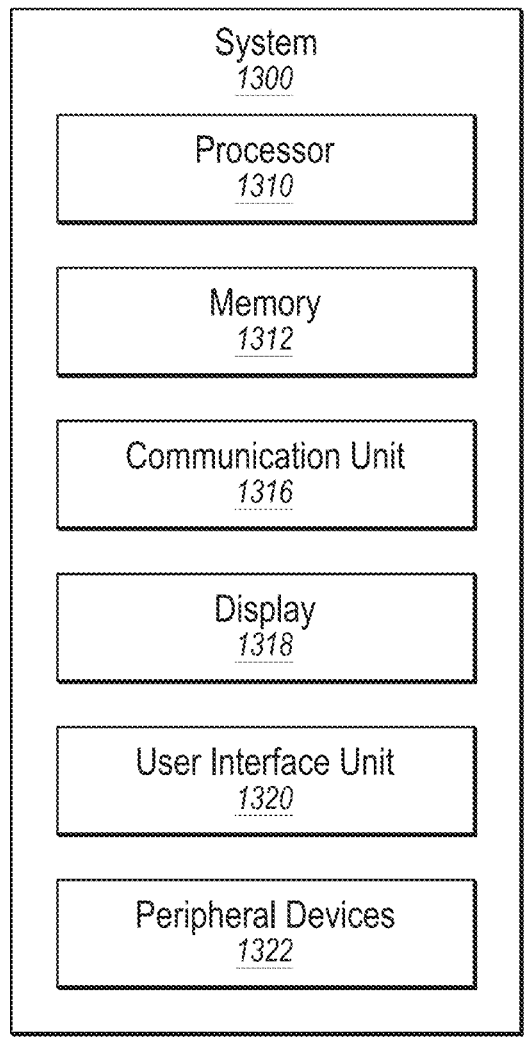
FIG. 13 illustrates an example system that may be used during tensor operations.

FIG. 13 illustrates an example system 1300 that may be used during the performance of tensor operations. The system 1300 may be arranged in accordance with at least one embodiment described in the present disclosure. The system 1300 may include a processor 1310, memory 1312, a communication unit 1316, a display 1318, a user interface unit 1320, and a peripheral device 1322, which all may be communicatively coupled. In some embodiments, the system 1300 may be part of any of the systems or devices described in this disclosure.

For example, the system 1300 may be part of the processing system 610 or the host 602 of FIG. 6 and may be configured to perform one or more of the tasks described above with respect to the FIG. 6.

Generally, the processor 1310 may include any suitable special-purpose or general-purpose computer, computing entity, or processing device including various computer hardware or software modules and may be configured to execute instructions stored on any applicable computer-readable storage media. For example, the processor 1310 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 13, it is understood that the processor 1310 may include any number of processors distributed across any number of networks or physical locations that are configured to perform individually or collectively any number of operations described herein. In some embodiments, the processor 1310 may interpret and/or execute program instructions and/or process data stored in the memory 1312. In some embodiments, the processor 1310 may execute the program instructions stored in the memory 1312.

For example, in some embodiments, the processor 1310 may execute program instructions stored in the memory 1312 that are related to the performance of tensor operations such that the system 1300 may perform or direct the performance of the operations associated therewith as directed by the instructions. In these and other embodiments, the instructions may be used to perform one or more operations of the methods 300, 400, 500, 800, 1000, 1100, or 1200.

The memory 1312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1310.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 1310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 1316 may include any component, device, system, or combination thereof that is configured to transmit or receive information over a network. In some embodiments, the communication unit 1316 may communicate with other devices at other locations, the same location, or even other components within the same system. For example, the communication unit 1316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 1316 may permit data to be exchanged with a network and/or any other devices or systems described in the present disclosure.

The display 1318 may be configured as one or more displays, like an LCD, LED, Braille terminal, or other type of display. The display 1318 may be configured to present video, text captions, user interfaces, and other data as directed by the processor 1310.

The user interface unit 1320 may include any device to allow a user to interface with the system 1300. For example, the user interface unit 1320 may include a mouse, a track pad, a keyboard, buttons, camera, and/or a touchscreen, among other devices. The user interface unit 1320 may receive input from a user and provide the input to the processor 1310. In some embodiments, the user interface unit 1320 and the display 1318 may be combined.

The peripheral devices 1322 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 1300 or otherwise generated by the system 1300.

Modifications, additions, or omissions may be made to the system 1300 without departing from the scope of the present disclosure. For example, in some embodiments, the system 1300 may include any number of other components that may not be explicitly illustrated or described. Further, depending on certain implementations, the system 1300 may not include one or more of the components illustrated and described.

As indicated above, the embodiments described herein may include the use of a special purpose or general-purpose computer (e.g., the processor 1310 of FIG. 13) including various computer hardware or software modules, as discussed in greater detail below. Further, as indicated above, embodiments described herein may be implemented using computer-readable media (e.g., the memory 1312 of FIG. 13) for carrying or having computer-executable instructions or data structures stored thereon.

The subject technology of the present disclosure is illustrated, for example, according to various aspects described below. Various examples of aspects of the subject technology are described as numbered examples (1, 2, 3, etc.) and sub examples (1.1, 1.2, 1.3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. As another example, one or more aspects of sub example 1.1 below may be omitted, substituted for one or more aspects of another sub example (e.g., example 1.2) or examples, or combined with aspects of another example The following is a non-limiting summary of some example implementations presented herein.

Example 1 may include method of performing tensor operations. Example 1.1 may include a method comprising:
 loading a first tensor into a plurality of processing devices, the first tensor split into a plurality of first tensor tiles that are distributed among the plurality of processing devices, the plurality of processing devices further including portions of a second tensor split into a plurality of second tensor tiles that are distributed among the plurality of processing devices;

performing a tensor operation with the first tensor and the second tensor using the plurality of processing devices to generate an intermediate tensor that is split in a plurality of intermediate tensor tiles distributed among the plurality of processing devices;

after performing the tensor operation with the first tensor and the second tensor, transferring one or more of the plurality of intermediate tensor tiles amongst one or more of the plurality of processing devices without any of the plurality of processing devices including the entire intermediate tensor; and after transferring the one or more of the plurality of intermediate tensor tiles, performing, using the plurality of processing devices, a tensor operation with the intermediate tensor and a third tensor, which is split into a plurality of third tensor tiles that are distributed among the plurality of processing devices, to generate a fourth tensor.

Example 1.2: The method of example 1.1 wherein the fourth tensor is a solution tensor, the method further comprising:

obtaining a plurality of additional tensors;

after performing the tensor operation with the intermediate tensor and the third tensor, transferring one or more of a plurality of solution tensor tiles of the solution tensor amongst one or more of the plurality of processing devices without any of the plurality of processing devices including the entire solution tensor;

after the transferring, performing, using the plurality of processing devices, another tensor operation with the solution tensor and one of the plurality of additional tensors, which is split into a plurality of tensor tiles that are distributed among the plurality of processing devices, to generate another solution tensor; and repeating the steps of transferring and performing the other tensor operation for each tensor remaining in the plurality of additional tensors.

Example 1.3: The method of example 1.1, wherein each tensor tile of the plurality of first tensor tiles is a unique set of elements of the first tensor, each tensor tile of the plurality of second tensor tiles is a unique set of elements of the second tensor, each tensor tile of the plurality of intermediate tensor tiles is a unique set of elements of the intermediate tensor, and each tensor tile of the plurality of third tensor tiles is a unique set of elements of the third tensor.

Example 1.4: The method of example 1.1, wherein the tensor operation with the first tensor and the second tensor is a tensor multiplication and includes:

multiplying, by the plurality of processing devices, elements of the first tensor with elements of the second tensor to generate a plurality of products; and a reducing operation that includes:

transferring one or more of the plurality of products amongst one or more of the plurality of processing devices; and after the transfer, performing an operation with one or more of the plurality of products with another of the plurality of products to generate an element of the intermediate tensor.

Example 1.5: The method of example 1.4, wherein the performing an operation with the one or more of the plurality of products with another of the plurality of products to generate an element of the intermediate tensor includes two or more of the products on which the operation is performed being generated by different processing devices of the plurality of processing devices.

Example 1.6: The method of example 1.1, wherein after the tensor operation with the first tensor and the second tensor, the plurality of intermediate tensor tiles are distributed among the plurality of processing devices such that each of the plurality of processing devices includes a unique sub-set of the plurality of intermediate tensor tiles and the plurality of intermediate tensor tiles are equally distributed among the plurality of processing devices.

Example 1.7: The method of example 1.1, wherein the plurality of first tensor tiles are distributed among the plurality of processing devices such that each of the plurality of processing devices includes a different sub-set of the plurality of first tensor tiles and no duplication of the plurality of first tensor tiles exists among the plurality of processing devices.

Example 1.8: The method of example 1.1, wherein the plurality of second tensor tiles that are distributed among the plurality of processing devices such that half of the plurality of processing devices each include half of the plurality of second tensor tiles.

Example 1.9: The method of example 1.1, wherein the plurality of third tensor tiles that are distributed among the plurality of processing devices such that each of the plurality of processing devices includes a different sub-set of the plurality of third tensor tiles and no duplication of the plurality of third tensor tiles exists among the plurality of processing devices.

Example 1.10: The method of example 1.1, wherein a number of the plurality of third tensor tiles is greater than a number of the plurality of first tensor tiles.

Example 1.11: The method of example 1.10, wherein the number of the plurality of third tensor tiles is four times the number of the plurality of first tensor tiles.

Example 1.12: The method of example 1.1, wherein the one or more of the plurality of intermediate tensor tiles are distributed amongst one or more of the plurality of processing devices such that each of the plurality of intermediate tensor tiles is included in two or more of the plurality of processing devices.

Example 1.13. The method of example 1.1, wherein the fourth tensor is split in a plurality of fourth tensor tiles distributed among the plurality of processing devices and the method further comprising after performing the tensor operation with the intermediate tensor and the third tensor, transferring one or more of the plurality of fourth tensor tiles amongst one or more of the plurality of processing devices such that the plurality of fourth tensor tiles are distributed amongst the plurality of processing devices in a same manner as the plurality of second tensor tiles are distributed among the plurality of processing devices.

Example 1.14. A method of performing tensor operations, the method comprising:

loading two of a plurality of tensors into a plurality of processing devices, the two of the plurality of tensors each split into a plurality of tensor tiles that are distributed among the plurality of processing devices;

performing a first tensor operation with the two of the plurality of tensors using the plurality of processing devices to generate a solution tensor that is split in a plurality of solution tensor tiles distributed among the plurality of processing devices;

after performing the first tensor operation, transferring one or more of the plurality of solution tensor tiles amongst one or more of the plurality of processing devices without any of the plurality of processing devices including the entire solution tensor;

after the transferring, performing, using the plurality of processing devices, a second tensor operation with the solution tensor and another of the plurality of tensors, which is split into a plurality of tensor tiles that are distributed among the plurality of processing devices, to generate another solution tensor; and repeating the steps of transferring and performing the second tensor operation for each tensor remaining in the plurality of tensors.

Example 1.15. The method of example 1.14, wherein the transferring the one or more of the plurality of solution tensor tiles amongst the one or more of the plurality of processing devices occurs via a first process for a first portion of the plurality of tensors and via a second process for a second portion of the plurality of tensors, the second process being different from the first process.

Example 1.16. The method of example 1.15, wherein the first portion of the plurality of tensors are used during odd numbered iterations of the second tensor operation and the second portion of the plurality of tensors are used during even numbered iterations of the second tensor operation.

Example 1.17. The method of example 1.15, wherein during the first process each of the plurality of solution tensor tiles is included in two or more of the plurality of processing devices and during the second process each of the plurality of solution tensor tiles are distributed among the plurality of processing devices in a same manner as a distribution of tiles of a first tensor for which operations are performed.

Example 1.18. The method of example 1.14, wherein for odd numbered iterations of the second tensor operation the other of the plurality of tensors is split into the plurality of tensor tiles that are distributed among the plurality of processing devices in a first manner and for even numbered iterations of the second tensor operation the other of the plurality of tensors is split into the plurality of tensor tiles that are distributed among the plurality of processing devices in a second manner that is different than the first manner.

Example 1.19. A system comprising:
one or more memory devices configured to store a plurality of tensors; and
a plurality of processing devices coupled to the one or more memory devices and configured to perform tensor operations on the plurality of tensors,
the system configured to execute instructions to cause the system to perform operations, the operations comprising:
loading two of the plurality of tensors into the plurality of processing devices, the two of the plurality of tensors each split into a plurality of tensor tiles that are distributed among the plurality of processing devices;
performing, using the plurality of processing devices, a first tensor operation with the two of the plurality of tensors to generate a solution tensor that is split in a plurality of solution tensor tiles distributed among the plurality of processing devices;
after performing the first tensor operation, transferring one or more of the plurality of solution tensor tiles amongst one or more of the plurality of processing devices without any of the plurality of processing devices including the entire solution tensor;
after the transferring, performing, using the plurality of processing devices, a second tensor operation with the solution tensor and another of the plurality of tensors, which is split into a plurality of tensor tiles that are distributed among the plurality of processing devices, to generate another solution tensor; and
repeating the steps of transferring and performing the second tensor operation for each tensor remaining in the plurality of tensors.

Example 1.20. The system of example 1.19, wherein the transferring the one or more of the plurality of solution tensor tiles amongst the one or more of the plurality of processing devices occurs via a first process for a first portion of the plurality of tensors and via a second process for a second portion of the plurality of tensors, the second process being different from the first process.

Example 1.21. The system of example 1.19, wherein for odd numbered iterations of the second tensor operation the other of the plurality of tensors is split into the plurality of tensor tiles that are distributed among the plurality of processing devices in a first manner and for even numbered iterations of the second tensor operation the other of the plurality of tensors is split into the plurality of tensor tiles that are distributed among the plurality of processing devices in a second manner that is different than the first manner.

Example 1.22. The system of example 1.19, wherein each of the processing devices includes a systolic array of data processing units.

Example 2 may include a tensor parallel group. Example 2.1 may include a tensor parallel group comprising:
a plurality of processing devices separated into a first set of two or more of the plurality of processing devices and a second set of two or more of the plurality of processing devices; and
a plurality of communication channels to directly communicatively couple every processing device in the first set of the plurality of processing devices with every processing device in the second set of the plurality of processing devices without communicatively coupling any of the plurality of processing devices in the same set of the plurality of processing devices,
wherein the plurality of processing devices are configured such that each of the plurality of processing devices is able to communicate with any of the other of the plurality of processing devices through at most one other of the plurality of processing devices.

Example 2.2. The tensor parallel group of example 2.1, wherein there is no intersection of processing devices between the first set and the second set.

Example 2.3. The tensor parallel group of example 2.1, wherein each of the plurality of processing devices are communicatively coupled to a same number of the plurality of processing devices.

Example 2.4. The tensor parallel group of example 2.1, wherein each of the plurality of processing devices is coupled to a same number of communication channels.

Example 2.5. The tensor parallel group of example 2.1, wherein each of the plurality of communication channels is configured for a same data bandwidth.

Example 2.6. The tensor parallel group of example 2.1, wherein each of the plurality of processing devices is configured to simultaneously transmit data and receive data over different ones of the plurality of communication channels.

Example 2.7. The tensor parallel group of example 2.1, wherein each of the processing devices includes a systolic array of data processing units.

Example 2.8. The tensor parallel group of example 2.1, wherein the plurality of communication channels are separated into a first subset of communication channels and a second subset of communication channels and each of the plurality of processing devices are coupled to at least one communication channel of the first subset of communication channels and at least one communication channel of the second subset of communication channels.

Example 2.9. The tensor parallel group of example 2.8, wherein the plurality of processing devices are configured to perform an operation that includes a first sub-operation and a second sub-operation, wherein data transfer for the first sub-operation occurs only via the first subset of communication channels and data transfer for the second sub-operation occurs only via the second subset of communication channels.

Example 2.10. The tensor parallel group of example 2.9, wherein the operation is a matrix multiplication.

Example 2.11. The tensor parallel group of example 2.10, wherein the first sub-operation is a reduction operation and the second sub-operation is a gather operation.

Example 2.12. The tensor parallel group of example 2.1, wherein a number of the plurality of processing devices is a multiple of two.

Example 2.13. The tensor parallel group of example 2.12, wherein a number of the plurality of processing devices is eight.

Example 2.14. A system comprising:
a plurality of tensor parallel groups, each of the tensor parallel groups comprising:
a plurality of processing devices separated into a first set of two or more of the plurality of processing devices and a second set of two or more of the plurality of processing devices; and
a plurality of communication channels to directly communicatively couple every processing device in the first set of the plurality of processing devices with every processing device in the second set of the plurality of processing devices without communicatively coupling any of the plurality of processing devices in the same set of the plurality of processing devices,
wherein the plurality of processing devices are configured such that each of the plurality of processing devices is able to communicate with any of the other of the plurality of processing devices through at most one other of the plurality of processing devices.

Example 2.15. The system of example 2.14, wherein two or more of the plurality of tensor parallel groups are arranged in a parallel pipeline configuration.

Example 2.16. The system of example 2.14, wherein the plurality of processing devices groups are configured to process data in parallel.

Example 2.17. The system of example 2.14, wherein the plurality of processing devices groups are configured to process data in parallel and two or more of the plurality of tensor parallel groups are arranged in a parallel pipeline configuration.

Example 2.18. A tensor parallel group comprising:
a plurality of processing devices separated into a first set of two or more of the plurality of processing devices that includes a first group of processing devices and a second group of processing devices and a second set of two or more of the plurality of processing devices that includes a third group of processing devices and a fourth group of processing devices;
a plurality of first communication channels to directly communicatively couple every processing device in the first group of processing devices to every processing device in the third group of processing devices and to directly communicatively couple every processing device in the second group of processing devices to every processing device in the fourth group of processing devices; and
a plurality of second communication channels to directly communicatively couple every processing device in the first group of processing devices to every processing device in the fourth group of processing devices and to directly communicatively couple every processing device in the second group of processing devices to every processing device in the third group of processing devices,
wherein the plurality of processing devices are configured to perform an operation that includes a first sub-operation and a second sub-operation, wherein data transfer for the first sub-operation occurs only via the plurality of first communication channels and data transfer for the second sub-operation occurs only via the plurality of second communication channels.

Example 2.19. The tensor parallel group of example 2.18, wherein the plurality of first and second communication channels directly communicatively couple every processing device in the first set of the plurality of processing devices with every processing device in the second set of the plurality of processing devices without communicatively coupling any of the plurality of processing devices in the same set of the plurality of processing devices.

Example 2.20. The tensor parallel group of example 2.18, wherein each of the plurality of processing devices is coupled to a first number of the plurality of first communication channels and a second number of the plurality of second communication channels.

Example 2.21. The tensor parallel group of example 2.20, wherein the first number and the second number are the same.

Example 2.22. The tensor parallel group of example 2.18, wherein the plurality of processing devices are configured such that each of the plurality of processing devices is able to communicate with any of the other of the plurality of processing devices through at most one other of the plurality of processing devices.

Example 2.23. The tensor parallel group of example 2.18, the operation is a matrix multiplication, the first sub-operation is a reduction operation, and the second sub-operation is a gather operation.

Example 3 may include method of performing computations for artificial intelligence models. Example 3.1 may a method comprising:
obtaining an input tensor based on an input to an artificial intelligence model;
loading the input tensor into a plurality of processing devices, the input tensor split into a plurality of input tensor tiles that are distributed among the plurality of processing devices such that each of the plurality of processing devices does not include an entirety of the input tensor; and
performing a plurality of tensor operations according to the artificial intelligence model to generate a plurality of intermediate tensors and an output tensor, one or more of the plurality of tensor operations performed using the input tensor.

Example 3.2 The method of example 3.1, further comprising iteratively performing the method of claim 1, wherein the input tensor for a subsequent iteration is the output tensor from a previous iteration.

Example 3.3. The method of example 3.1, wherein each of the plurality of intermediate tensors are split into tensor tiles distributed among the plurality of processing devices such that each of the plurality of processing devices does not include an entirety of the plurality of intermediate tensors during any of the plurality of tensor operations.

Example 3.4. The method of example 3.3, wherein the distribution of the tensor tiles of the one or more of the plurality of intermediate tensors among the plurality of processing devices is different than the distribution of the plurality of input tensor tiles among the plurality of processing devices.

Example 3.5. The method of example 3.1, wherein the output tensor is split into tensor tiles distributed among the plurality of processing devices such that each of the plurality of processing devices does not include an entirety of the output tensor.

Example 3.6. The method of example 3.1, wherein the plurality of input tensor tiles are distributed among the plurality of processing devices such that half of the plurality of processing devices each include half of the plurality of input tensor tiles.

Example 3.7. The method of example 3.1, wherein the artificial intelligence model implements a transformer architecture.

Example 3.8. The method of example 3.7, wherein the plurality of intermediate tensors include a self-attention tensor, and the self-attention tensor is split into a plurality of intermediate tensor tiles and distributed among the plurality of processing devices such that each of the plurality of processing devices includes a different sub-set of the plurality of intermediate tensor tiles and no duplication of the plurality of intermediate tensor tiles exists among the plurality of processing devices.

Example 3.9. The method of example 3.8, wherein the plurality of intermediate tensors includes a projection tensor that is split into a plurality of projection tensor tiles and distributed among the plurality of processing devices in the same manner as the input tensor is distributed among the plurality of processing devices.

Example 3.10. The method of example 3.9, wherein the distribution of the input tensor among the plurality of processing devices is different than the distribution of the self-attention tensor among the plurality of processing devices.

Example 3.11. A system comprising:
one or more memory devices configured to store a plurality of tensors; and
a plurality of processing devices coupled to the one or more memory devices and configured to perform tensor operations on the plurality of tensors,
the system configured to execute instructions to cause the system to perform operations, the operations comprising:
obtaining an input tensor based on an input to an artificial intelligence model;
loading the input tensor into the plurality of processing devices, the input tensor split into a plurality of input tensor tiles that are distributed among the plurality of processing devices such that each of the plurality of processing devices does not include an entirety of the input tensor; and
performing, using the plurality of processing devices, a plurality of tensor operations according to the artificial intelligence model to generate a plurality of intermediate tensors and an output tensor, one or more of the plurality of tensor operations performed using the input tensor.

Example 3.12. The system of example 3.11, wherein the operations further comprise iteratively performing the operations with the input tensor for a subsequent iteration being the output tensor from a previous iteration.

Example 3.13. The system of example 3.11, wherein each of the plurality of intermediate tensors are split into tensor tiles distributed among the plurality of processing devices such that each of the plurality of processing devices does not include an entirety of the plurality of intermediate tensors during any of the plurality of tensor operations.

Example 3.14. The system of example 3.13, wherein the distribution of the tensor tiles of the one or more of the plurality of intermediate tensors among the plurality of processing devices is different than the distribution of the plurality of input tensor tiles among the plurality of processing devices.

Example 3.15. The system of example 3.11, wherein the output tensor is split into tensor tiles distributed among the plurality of processing devices such that each of the plurality of processing devices does not include an entirety of the output tensor.

Example 3.16. The system of example 3.11, wherein the plurality of input tensor tiles are distributed among the plurality of processing devices such that half of the plurality of processing devices each include half of the plurality of input tensor tiles.

Example 3.17. The system of example 3.11, wherein the artificial intelligence model implements a transformer architecture.

Example 3.18. The system of example 3.17, wherein the plurality of intermediate tensors include a self-attention tensor, and the self-attention tensor is split into a plurality of intermediate tensor tiles and distributed among the plurality of processing devices such that each of the plurality of processing devices includes a different sub-set of the plurality of intermediate tensor tiles and no duplication of the plurality of intermediate tensor tiles exists among the plurality of processing devices.

Example 3.19. The system of example 3.18, wherein the plurality of intermediate tensors includes a projection tensor that is split into a plurality of projection tensor tiles and distributed among the plurality of processing devices in the same manner as the input tensor is distributed among the plurality of processing devices.

Example 3.20. The system of example 3.19, wherein the distribution of the input tensor among the plurality of processing devices is different than the distribution of the self-attention tensor among the plurality of processing devices.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method of performing computations for artificial intelligence models, the method comprising:
   obtaining an input tensor based on an input to an artificial intelligence model;
   loading the input tensor into a plurality of processing devices, the input tensor split into a plurality of input tensor tiles that are distributed among the plurality of processing devices such that each of the plurality of processing devices does not include an entirety of the input tensor; and
   performing a plurality of tensor operations according to the artificial intelligence model to generate a plurality of intermediate tensors and an output tensor, one or more of the plurality of tensor operations performed using the input tensor and each of the plurality of intermediate tensors being split into tensor tiles distributed among the plurality of processing devices such that each of the plurality of processing devices does not include an entirety of the plurality of intermediate tensors during any of the plurality of tensor operations.

2. The method of claim 1, further comprising iteratively performing the steps of obtaining, loading, and performing, wherein the input tensor for a subsequent iteration is the output tensor from a previous iteration.

3. The method of claim 1, wherein the distribution of the tensor tiles of the one or more of the plurality of intermediate tensors among the plurality of processing devices is different than the distribution of the plurality of input tensor tiles among the plurality of processing devices.

4. The method of claim 1, wherein the output tensor is split into tensor tiles distributed among the plurality of processing devices such that each of the plurality of processing devices does not include an entirety of the output tensor.

5. The method of claim 1, wherein the plurality of input tensor tiles are distributed among the plurality of processing devices such that half of the plurality of processing devices each include half of the plurality of input tensor tiles.

6. The method of claim 1, wherein the artificial intelligence model implements a transformer architecture.

7. The method of claim 6, wherein the plurality of intermediate tensors include a self-attention tensor, and the self-attention tensor is split into a plurality of intermediate tensor tiles and distributed among the plurality of processing devices such that each of the plurality of processing devices includes a different sub-set of the plurality of intermediate tensor tiles and no duplication of the plurality of intermediate tensor tiles exists among the plurality of processing devices.

8. The method of claim 7, wherein the plurality of intermediate tensors includes a projection tensor that is split into a plurality of projection tensor tiles and distributed among the plurality of processing devices in the same manner as the input tensor is distributed among the plurality of processing devices.

9. The method of claim 8, wherein the distribution of the input tensor among the plurality of processing devices is different than the distribution of the self-attention tensor among the plurality of processing devices.

10. A system comprising:
    one or more memory devices configured to store a plurality of tensors; and
    a plurality of processing devices coupled to the one or more memory devices and configured to perform tensor operations on the plurality of tensors, the system configured to execute instructions to cause the system to perform operations, the operations comprising:

obtaining an input tensor based on an input to an artificial intelligence model;

loading the input tensor into the plurality of processing devices, the input tensor split into a plurality of input tensor tiles that are distributed among the plurality of processing devices such that each of the plurality of processing devices does not include an entirety of the input tensor; and performing, using the plurality of processing devices, a plurality of tensor operations according to the artificial intelligence model to generate a plurality of intermediate tensors and an output tensor, one or more of the plurality of tensor operations performed using the input tensor and each of the plurality of intermediate tensors being split into tensor tiles distributed among the plurality of processing devices such that each of the plurality of processing devices does not include an entirety of the plurality of intermediate tensors during any of the plurality of tensor operations.

11. The system of claim 10, wherein the operations further comprise iteratively performing the operations with the input tensor for a subsequent iteration being the output tensor from a previous iteration.

12. The system of claim 10, wherein the distribution of the tensor tiles of the one or more of the plurality of intermediate tensors among the plurality of processing devices is different than the distribution of the plurality of input tensor tiles among the plurality of processing devices.

13. The system of claim 10, wherein the output tensor is split into tensor tiles distributed among the plurality of processing devices such that each of the plurality of processing devices does not include an entirety of the output tensor.

14. The system of claim 10, wherein the plurality of input tensor tiles are distributed among the plurality of processing devices such that half of the plurality of processing devices each include half of the plurality of input tensor tiles.

15. The system of claim 10, wherein the artificial intelligence model implements a transformer architecture.

16. The system of claim 15, wherein the plurality of intermediate tensors include a self-attention tensor, and the self-attention tensor is split into a plurality of intermediate tensor tiles and distributed among the plurality of processing devices such that each of the plurality of processing devices includes a different sub-set of the plurality of intermediate tensor tiles and no duplication of the plurality of intermediate tensor tiles exists among the plurality of processing devices.

17. The system of claim 16, wherein the plurality of intermediate tensors includes a projection tensor that is split into a plurality of projection tensor tiles and distributed among the plurality of processing devices in the same manner as the input tensor is distributed among the plurality of processing devices.

18. The system of claim 17, wherein the distribution of the input tensor among the plurality of processing devices is different than the distribution of the self-attention tensor among the plurality of processing devices.

19. A method of performing computations for artificial intelligence models, the method comprising:

obtaining an input tensor based on an input to an artificial intelligence model;

loading the input tensor into a plurality of separate processing devices, the input tensor split into a plurality of input tensor tiles that are distributed among the plurality of separate processing devices such that each of the plurality of separate processing devices includes a portion of the plurality of input tensor tiles but does not include an entirety of the input tensor; and performing a plurality of tensor operations according to the artificial intelligence model to generate a plurality of intermediate tensors and an output tensor, one or more of the plurality of tensor operations performed using the input tensor.

20. The method of claim 19, wherein at least one of the plurality of intermediate tensors is split into a plurality of intermediate tensor tiles and distributed among the plurality of separate processing devices and the distribution of the input tensor among the plurality of separate processing devices is different than the distribution of the at least one of the plurality of intermediate tensors among the plurality of separate processing devices.

21. The method of claim 20, wherein the artificial intelligence model implements a transformer architecture and the at least one of the plurality of intermediate tensors includes a self-attention tensor.

* * * * *